(12) United States Patent
Akao et al.

(10) Patent No.: US 6,376,057 B1
(45) Date of Patent: Apr. 23, 2002

(54) PACKAGING MATERIAL FOR PHOTOGRAPHIC PHOTOSENSITIVE MATERIAL

(75) Inventors: Mutsuo Akao; Hideyuki Sugimoto; Masaaki Fujiyama, all of Kanagawa (JP)

(73) Assignee: Fuji Photo Film, Co., Ltd., Kanagawa (JP)

( * ) Notice: Subject to any disclaimer, the term of this patent is extended or adjusted under 35 U.S.C. 154(b) by 0 days.

(21) Appl. No.: 09/444,574

(22) Filed: Nov. 19, 1999

(30) Foreign Application Priority Data

| Nov. 19, 1998 | (JP) | ............................................. | 10-329981 |
| Nov. 25, 1998 | (JP) | ............................................. | 10-333950 |
| Apr. 1, 1999 | (JP) | ............................................. | 11-000151 |

(51) Int. Cl.$^7$ ................................................. B32B 7/02
(52) U.S. Cl. ........................ 428/215; 428/220; 428/323; 428/334; 428/335; 428/336; 428/408; 428/512; 428/513; 428/516; 428/517; 428/924

(58) Field of Search .................................. 428/34.3, 219, 428/220, 323, 334, 335, 336, 408, 511, 512, 513, 516, 517, 922, 924, 213, 215

(56) References Cited

U.S. PATENT DOCUMENTS 5,492,741 A * 2/1996 Akao et al. ................. 428/35.2

* cited by examiner

Primary Examiner—D. S. Nakarani
(74) Attorney, Agent, or Firm—Sughrue Mion, PLLC

(57) ABSTRACT

This invention provides a packaging material for a photographic photosensitive material having a conductive light-shielding thermoplastic resin film layer which comprises a resin composition comprising 3 to 49 wt. % of a thermoplastic elastomer having a crystallinity of 40% or less measured by the X-ray diffraction method, 0.01 to 10 wt. % of lubricant, and 1 to 70 wt. % of carbon black which is acetylene carbon black or furnace carbon black, which is excellent in the dispersion of carbon black to improve light-shielding ability and rare generation of lumps and microgrits, heat sealing properties, small degradation of physical strength, film moldability, etc.

16 Claims, 9 Drawing Sheets

PACKAGING MATERIAL FOR PHOTOGRAPHIC PHOTOSENSITIVE MATERIAL

BACKGROUND OF THE INVENTION

This invention relates to a packaging material for a photographic photosensitive material.

Packaging materials for photographic photosensitive material require various properties as well as complete light-shielding ability, such as slitting ability, gas barrier, moistureproofness, rigidity, physical strength (rupture strength, tear strength, impact puncture strength, Gelbo test strength, resistance to abrasion, etc.), heat sealing properties (heat seal strength, slitting sealability, hot tack properties, sealability with other materials, etc.), antistatic ability, flatness, lubricity, and the like.

On the other hand, complete sealing transparent packaging materials with a print are used for the packages using an injection molded article having complete light-shielding ability, such as light-shielding magazine or light-shielding cartridge. Examples of such a package are photographic films placed in a cartridge, photographic film units with a lens, advanced photo system films, and the like.

Heretofore, various packaging materials were developed for packaging photographic photosensitive material, such as photographic film. For example, a film for packaging photosensitive material disclosed in Japanese Patent KOKOKU 2-2700 comprises a light-shielding film containing 50 wt. % or more of L-LDPE resin and 1 wt. % or more of light-shielding material.

A packaging material for photographic photosensitive material disclosed in Japanese Patent KOKOKU 4-80372 is formed of a polyolefin resin composition comprising 50 to 95 wt. % L-LDPE resin and 5 to 49.5 wt. % HDPE resin and further containing 0.1 to 10 wt. % carbon black and 0.01 to 10 wt. % lubricant.

A packaging material for photographic photosensitive material disclosed in Japanese Patent KOKOKU 4-80373 is a coextruded double layer inflation film consisting of a HDPE resin layer or polypropylene resin layer and an L-LDPE resin layer.

A package of photographic roll film of the size 120 or 220 provided with bar code at a bonding tape which can be read automatically by a camera to know its sensitivity, etc. is disclosed in Japanese Patent KOKAI 9-80695. The package uses a light-shielding paper composed of a paper 75 to 80 $\mu$m in thickness, 80 g/m as areal weight of a mixed pulp of 30% softwood pulp and 70% hardwood pulp made by a Fourdrinier paper machine, as a flexible sheet layer, a light-shielding LDPE resin inflation film 20 $\mu$m in thickness containing 18 wt. % acetylene black laminated to one side of the paper through a polyurethane dry laminating adhesive layer, and a printing layer and a protection layer provided on the other side.

A packaging material disclosed in Japanese Patent 2676258 is a laminate comprising a coextruded multilayer film, wherein 0.03 to 0.6 wt. % a surfactant antistatic agent is incorporated into the surface layer.

However, the above conventional packaging materials are insufficient in the dispersion of light-shielding material, such as carbon black, and the generation of lumps and microgrits becomes a problem. Especially, in the case of high speed photographic photosensitive materials having an ISO photographic speed 100 or more, scuff marks, abrasion marks, pressure marks or the like generate by contacting the packaging material which contains lumps, microgrits, etc. with a photosensitive layer of the photographic photosensitive material, and they induce mortal troubles for photographic photosensitive materials. Furthermore, when the amount of light-shielding material is great, physical strength and heat sealing properties are degraded.

Besides, in order to pass the recent waste treatment of containers and packaging materials law, it is difficult to ensure antistatic properties or light-shielding ability by using a metal foil or a metallized flexible sheet layer provided with a deposited metal membrane. A means of solving the problem is to incorporate a large quantity, e.g. 10 wt. % or more, of conductive carbon black or graphite. However, the dispersion of them becomes further insufficient to generate lumps, microgrits or the like abundantly, and mortal troubles against photographic photosensitive materials frequently occur. Furthermore, the degradation of film moldability, pinholes or rupture also occurs, rendering to ensure light-shielding difficult. Moreover, heat sealing properties and physical strength are degraded. As mentioned above, the conventional packaging materials have problems as a packaging material for photographic photosensitive material and a package of photographic photosensitive material which is a precision chemical product, and an improvement is desired. Although it can be considered to use various rubbers which require crosslinking with sulfur, photographic properties of photographic photosensitive materials are affected adversely thereby.

SUMMARY OF THE INVENTION

An object of the invention is to solve the above problems, and to provide a packaging material for a photographic photosensitive material having good dispersion of carbon black, no generation of lumps and microgrits, good heat sealing properties and physical strength.

The present invention provides a packaging material for a photographic photosensitive material having a conductive light-shielding thermoplastic resin film layer which comprises a resin composition comprising 3 to 49 wt. % of a thermoplastic elastomer having a crystallinity of 40% or less measured by the X-ray diffraction method, 0.01 to 10 wt. % of lubricant, and 1 to 70 wt. % of carbon black which is acetylene carbon black or furnace carbon black.

In the above packaging material, by incorporating the thermoplastic elastomer having a crystallinity of 40% or less measured by the X-ray diffraction method in an amount of 5 wt. % or more, the dispersibility of carbon black is improved to prevent the generation of lumps and microgrits, and the degradation of physical strength and heat sealing properties are prevented, without affecting adversely photographic properties of photographic photosensitive materials.

Figure 1:
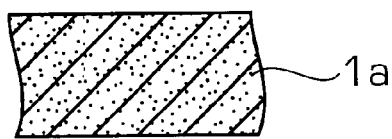
FIGS. 1 through 7 are partial sectional views illustrating layer construction of the packaging material for photographic photosensitive material of the invention, respectively.

1a . . . Conductive light-shielding thermoplastic resin film layer
2, 2a . . . Thermoplastic resin film layer
3, 3a . . . Flexible sheet layer
4, 4a . . . Adhesive layer
5, 5a . . . Young's modulus thermoplastic resin film layer
6, 6a . . . Deposited membrane
7 . . . Intermediate layer
8, 8a . . . Intermediate thermoplastic resin layer
10 . . . Light-shielding bag
11 . . . Heat sealed portion
I, Ia . . . Deposited thermoplastic resin film layer
IIa . . . Coextruded light-shielding double layer film
IIIa . . . Coextruded light-shielding triple layer film
   a . . . having light-shielding ability (containing light-shielding material, printing layer, deposited membrane layer, etc.)
A . . . Packaging material as shown in FIGS. 19–26.

DETAILED DESCRIPTION OF THE INVENTION

The thermoplastic elastomer used for the conductive light-shielding thermoplastic resin film layer of the invention has a crystallinity measured by the X-ray diffraction method of 40% or less, preferably 30% or less, more preferably 25% or less, further more preferably 20% or less, still further more preferably 15% or less, the most preferably 10% or less. When the crystallinity exceeds 40%, physical strength is degraded, and it is difficult to improve the dispersibility of carbon black, etc. efficiently.

A suitable content of the thermoplastic elastomer having a crystallinity of 40% or less is 3 wt. % or more, preferably 5 wt. % or more, more preferably 10 wt. % or more, further more preferably 15 wt. % or more, still further more preferably 20 wt. % or more, the most preferably 25 wt. % or more, and 49 wt. % or less, preferably 45 wt. % or less, further more preferably 40 wt. % or less. When the content is less than 5 wt. %, it is difficult to improve the dispersion of carbon black, etc.

The thermoplastic elastomer (TPE) can be roughly divided into styrene-based thermoplastic elastomer (SBC), ester-based thermoplastic elastomer (TPEE), olefin-based thermoplastic elastomer (TPO), vinyl chloride-based thermoplastic elastomer (TPVC), amide-based thermoplastic elastomer (TPAE), crystalline 1,2-polybutadien-based thermoplastic elastomer (RB), ionomer-based thermoplastic elastomer, fluorine-based thermoplastic elastomer (F-TPE), urethane-based thermoplastic elastomer (TPU), isoprene-based thermoplastic elastomer, chlorinated polyethylene-based thermoplastic elastomer, polyfluorocarbon-based thermoplastic elastomer, and the like. Examples of the hard phase and soft phase of thermoplastic elastomers are tabulated in Table 1.

TABLE 1

| Type | Hard Phase | Soft Phase |
|---|---|---|
| SBC | PS | BR,IR or hydrogenated IR |
| TPO | PE or PP | I,IIR or EPDM |
| TPVC | crystalline PVC, etc. | noncrystalline PVC |
| TPU | urethane structure | polyester or polyether |
| TPEE | polyester | polyether |
| TPAE | polyamide | polyether or polyester |
| Others | syndiotactic 2 BR | noncrystalline BR |
| | trans-1,4-IR | noncrystalline IR |
| | metal carboxylate ion cluster | noncrystalline PE |
| | crystalline PE | EVA or EEA |
| | crystalline PE | chlorinated PE |
| | fluoro resin | fluoro rubber |

Among them, preferred ones are polyolefin-elastomers, particularly those having an α-olefin unit content other than ethylene and propylene of 16 mol % or more, preferably 18 mol % or more, more preferably 20 mol % or more, further more preferably 25 mol % or more, the most preferably 30 mol % or more.

A suitable α-olefin has a number of carbon atoms of 3 to 20, preferably 3 to 17, more preferably 3 to 15, further more preferably 3 to 12, the most preferably 3 to 9. Illustrative of the α-olefins are propylene, butene-1, hexene-1, 4-methylpentene-1, heptene-1, octene-1, nonene-1, decene-1, dodecene-1, pentadecene-1, hexadecene-1, octadecene-1, eicosene-1, etc.

Preferable olefin-based thermoplastic elastomers have a melt flow rate (ASTM D-1238-88, condition E at 190° C. at a piston load of 2.16 kgf) of 0.5 to 20 g/10 minutes, a density (ASTM D 1505) of 0.87 to 0.91 g/cm$^3$ and a Shore hardness (ASTM D 2240) of 50 to 95A.

The conductive light-shielding thermoplastic resin film layers of the invention contains acetylene carbon black and/or furnace carbon black in an amount of 1 to 70 wt. %, preferably 1 to 60 wt. %, more preferably 1 to 50 wt. %, further more preferably 1 to 40 wt. %, still further more preferably 2 to 30 wt. %, the most preferably 3 to 20 wt. %. In the range of the carbon black content of less than 1 wt. %, it is difficult to ensure light-shielding ability sufficiently, unless the layer thickness is made 300 µm or more. In the range of more than 70 wt. %, lumps and the like are liable to generate, and physical strength and heat sealing properties are also degraded. As a result, it is difficult to ensure complete light-shielding ability and sealability.

Carbon blacks are divided into gas black, furnace black, channel black, anthracene black, acetylene black, Ketjen carbon black, thermal black, lamp black, vegetable black and animal black according to their origin.

Among the above carbon blacks, channel black which is manufactured by contacting flame of natural gas or gaseous or vaporized hydrocarbon with incomplete combustion with the back of a channel steel to deposit carbon black, is unfavorable, because of inferior photographic properties and contamination of atmosphere in its manufacture, although tinting strength is great. Preferable carbon blacks are acetylene black and furnace black which is manufactured by partial combustion or pyrolysis of natural gas, hydrocarbon oil or a mixture of them in a furnace at 1200 to 1700° C., usually 1250 to 1600° C.

In the invention, furnace carbon black is preferable in terms of light-shielding character, low cost, improvement in physical strength and no adverse affect upon photographic propeties. On the other hand, since acetylene black, and Ketjen carbon black which is modified by-produced carbon black have an antistatic character, they are also preferable, although they are expensive. Particularly, furnace black and acetylene black having a sulfur content (ASTM D-1619) of 0.1% or less are preferable for high speed photographic photosensitive materials (ISO photographic speed of 400 or more). Optionally, it is preferable to mix them.

Conductive carbon blacks which are particularly preferred include acetylene black, conductive furnace black (CF), super conductive furnace black (SCF), extra conductive furnace black (XCF), conductive channel black (CC) and the furnace black and channel black heat-treated at a high temperature, such as about 1500° C. A particularly preferable carbon black is acetylene black, because of excellent in conductivity due to its developed secondary structure as well as a small impurity content. Moreover, Ketjen carbon black is also preferable, because of exhibiting excellent conductivity even with a small blending amount due to its excellent specific surface area. A suitable blending amount of conductive carbon black is 3 to 100 parts by weight, preferably 5 to 60 parts by weight, more preferably 10 to 50 parts by weight, the most preferably 15 to 40 parts by weight, against 100 parts by weight of the aforementioned thermoplastic resin component. In the range of the blending amount of less than 3 parts by weight, there are cases of not obtaining desired conductivity. In the range of the blending amount of more than 100 parts by weight, there are cases of degrading physical strength of molded films, resin fluidity and moldability.

It is preferable to incorporate conductive carbon black into the conductive light-shielding thermoplastic resin film layer to impart conductivity thereto so as not to generate static marks nor to add shock to users. A preferable volume resistivity (20° C., 60% RH) of the conductive light-shielding thermoplastic resin film layer is $1 \times 10^{12}$ $\Omega$·cm or less, more preferably $1 \times 10^{10}$ $\Omega$·cm or less further more preferably $1 \times 10^{7}$ $\Omega$·cm or less, the most preferably $1 \times 10^{5}$ $\Omega$·cm or less. When the volume resistivity (20° C., 60% RH) exceeds $1 \times 10^{12}$ $\Omega$·cm, it is difficult to ensure sufficient antistatic ability, and static marks are liable to occur on photographic photosensitive materials. The volume resistivity is a kind of electric resistance of a material exhibited by the interior of a sample. That is, it is a conversion of volume resistance to a value per unit volume, and regulated by JIS K 6911.

A representative light-shielding resin film is in a thickness of 50 μm formed of a resin composition consisting of 20 wt. % of ethylene-propylene copolymer resin having a crystallinity of 15% measured by the X-ray diffraction method, 66.8 wt. % of homopolyethylene resin having a crystallinity of 67%, a MFR (ASTM D 1238, condition E) of 2.5 g/10 minutes and a density of 0.925 g/cm³, 2 wt. % of antistatic agent masterbatch ("Electmaster LL-10", Kao Corp.), 0.1 wt. % of calcium stearate and 0.05 wt. % of bisfatty amide as lubricant, 0.05 wt. % of hindered phenol antioxidant ("Irganox 1010", Ciba-Geigy), 1 wt. % of A type zeolite which is adsorbent for volatile gases (hydrogen cyanide, aldehydes, sulfur, etc.) which adversely affect photographic properties of photographic photosensitive materials, and 10 wt. % of the following conductive carbon black.

The volume specific resistances of the above film using the following conductive carbon blacks are as follows:

| Conductive carbon black | Volume resistivity |
| --- | --- |
| Ketjen black EC | $1.6 \times 10^{2} \Omega \cdot cm$ |
| Ketjen black EC 600 JD | $4.5 \times 10^{1} \Omega \cdot cm$ |
| Acetylene black | $2.3 \times 10^{6} \Omega \cdot cm$ |
| Vulcan XC-72 | $1.2 \times 10^{6} \Omega \cdot cm$ |

The above light-shielding resin film is excellent in conductivity, photographic properties, film moldability, heat sealing properties, and the like.

Light-shielding resin films having almost similar favorable properties can be obtained by using polyolefin resin containing at least one of high density homopolyethylene resin, ethylene-α-olefin copolymer resin, propylene-α-olefin copolymer resin, homopolypropylene resin, acid-modified polyolefin resin, ethylene-acrylic acid copolymer resin, ethylene-ethyl acrylate copolymer resin, ethylene-methyl acrylate copolymer resin or ethylene-vinyl acetate copolymer resin instead of the low density homopolyethylene resin.

As to other examples, a blend film of 100 parts by weight of high density polyethylene resin having a MFR of 0.3 g/10 minutes and a density of 0.958 g/cm³ has a volume resistivity resistance (measured in an air conditioned room at 20° C., at 60% RH) of $2 \times 10^{2}$ $\Omega$·cm by blending 10 parts by weight of Ketjen black EC, $6 \times 10^{1}$ $\Omega$·cm by blending 10 parts by weight of Ketjen black EC600JD, $3.1 \times 10^{6}$ $\Omega$·cm by blending 10 parts by weight of acetylene black, $1.6 \times 10^{6}$ $\Omega$·cm by blending 10 parts by weight of Vulcan XC-72 (Cabot).

Particularly preferable carbon blacks for the packaging material for a photographic photosensitive material have a pH (JIS K 6221) of 6 to 9, a mean particle size (measured by an electron microscope) of 10 to 120 nm (mμ), preferably 10 to 80 nm (m μ), particularly preferably 12 to 50 nm (m μ), and an ash content of 1.0% or less in view of no occurrence of fogging, rare occurrence of photosensitivity deviation, great light-shielding ability, and rare occurrence of matters generating pinholes, such as lumps of carbon black and fish eyes. Among them, the most preferred one is furnace carbon black having a volatile component content (JIS K 6221) of not more than 2.0 wt. %, and a DBP oil absorption value (ASTM D-2414) of not less than 50 ml/100 g, preferably not less than 100 ml/100 g, in view of no adverse influence on photographic properties, the improvement in light-shielding ability and dispersibility and less degradation of physical properties.

Unless the sulfur content measured by ASTM D 1619-60 of the packaging material is 0.9 wt. % or less, preferably 0.7 wt. % or less, more preferably 0.5 wt. % or less, further more preferably 0.2 wt. % or less, particularly preferably 0.1 wt. % or less, photographic properties of photographic photosensitive materials are adversely affected, such as increase of fog, abnormal sensitivity and abnormal color development. Particularly, free sulfur component content, which adversely affects photographic properties of photographic photosensitive materials directly and greatly, is 0.1 wt. % or less, preferably 0.05 wt. % or less, particularly preferably 0.01 wt. % or less, the most preferably 0.001 wt. % or less. The free sulfur component content is measured as follows: Each sample is cooled to solidify by liquid nitrogen, and ground. 100 g of the ground sample is put in a Soxhlet oxtractor, and extracted with chloroform at 60° C. for 8 hours followed by cooling. The total volume of the extract is made 100 ml. 10 ml of the extract solution is injected into a high speed liquid chromatograph, and sulfur is determined. As the separation conditions of the high speed liquid chromatograph are, column:ODS silica column (4.6 mm φ×150 mm), carrier solution: methanol:water is 95:5 containing 0.1% acetic acid and 0.1% triethylamine, flow rate: 1 ml/min., detection wavelength: 254 nm, determination: absolute calibration curve method.

In order not to affect photographic properties of photographic photosensitive materials, the sulfur content (ASTM D-1619) of carbon black is preferably 0.6 wt. % or less, more preferably 0.3 wt. % or less, particularly preferably 0.1 wt. % or less. For that purpose, selection of raw materials is important.

| Raw oil | Sulfur content of raw oil |
|---|---|
| creosote oil (raw material: coal) | 0.3–0.6% |
| Ethylene bottom oil (raw material: naphtha) | 0.05–0.1% |
| Ethylene bottom oil (raw material: light oil) | 0.2–1.5% |
| Fluidized catalysis residual oil | 0.2–4.0% |

Accordingly, preferable raw oils are creosote oil and ethylene bottom oil, and the ethylene bottom oil (raw material: naphtha) is the most preferable as the raw material of carbon black, because the sulfur content of carbon black can be made 0.1 wt. % or less. Particularly, free sulfur content (JIS K 6350) of carbon black, which especially affects adversely photographic properties, is 100 ppm or less, preferably 50 ppm or less, more preferably 20 ppm or less, the most preferably 10 ppm or less. In view of less free sulfur content, the most preferable carbon black is produced from the ethylene bottom oil using naphtha as a raw material.

The cyanide content of carbon black which degrades photographic properties is 100 ppm or less, preferably 50 ppm or less, more preferably 20 ppm or less, further more preferably 10 ppm or less, particularly preferably 5 ppm or less, the most preferably 1 ppm or less. The cyanide content is determined as hydrogen cyanide by the 4-pyridine carboxylic acid pyrazolone absorption spectrophotometry, and the hydrogen cyanide content is converted to ppm unit per light-shielding material weight. Particularly, in the case of the chemically sensitized, such as gold-sensitized or dye-sensitized photographic photosensitive materials, unless the cyanide content is made 5 ppm or less, desensitization is great. It is effective to add a scavenger therefor.

The scavenger is a compound converting hydrogen cyanide to a photographically inactive material, and not releasing an adversely affecting material against silver halide photosensitive material as a result of scavenging hydrogen cyanide gas. Suitable hydrogen cyanide gas scavenger can be selected from inorganic or organic compounds of noble metals. Particularly preferable compounds are those of palladium (II or IV; indicating oxidized state) and platinum (II or IV). The compounds of gold (I or III) are also preferable. The compounds of rhodium (III), iridium (III or IV), and osmium (II, III or IV) are also effective, but more quantity is necessary for obtaining equal effect. Illustrative of effective inorganic or organic noble metal compounds are described, for example, in Gmelin Handbook, and marketing materials, synthetic materials and in situ synthetic materials, having a purity not affecting photographic photosensitive materials adversely can be served.

Preferable palladium compounds are palladium chloride (II), palladium bromide (II), palladium hydroxide (II), palladium sulfate (II), palladium thiocyanate (II), tetrachloropalladium (II) acid salt (sodium salt, potassium salt, ammonium salt), hexachloropalladium (IV) acid salt, tetrabromopalladium (II) acid salt, hexabromopalladium (IV) acid salt, bis(salicylato) palladium (II) acid salt, bis (dithiooxalato-S,S') palladium (II) acid salt, trans-dichlorobis (thioether) palladium (II), tetraamine palladium (II) salt, dichlorodiammine palladium (II), dibromodiammine palladium (II), oxalatodiammine palladium (II), dinitrodiamunine palladium (II), bis (ethylenediamine) palladium (II) salt, dichloroethylenediamine palladium (II), bis (2,2'-piperidine) palladium (II) salt, bis (1,10-phenanthroline) palladium (II) salt, tetranitropalladium (II) acid salt, bis (glycinato) palladium (II), tetrakis (thiocyanato) palladium (II) acid salt, dichlorobis (phosphine) palladium (II) acid salt, di-$\mu$-chloro-bis [chloro (phosphine)palladium (II)], di-$\mu$-chloro-bis [chloro(arsine) palladium (II)], dinitrobis (arsine) palladium and the like.

Preferable platinum compounds are platinum chloride (II) acid salt, platinum chloride (IV), hexafluoroplatinum (IV) acid salt, tetrachloroplatinum (II) acid salt, hexachloroplatinum (IV) acid salt, trichlorotrifluoroplatinum (IV) acid salt, tetrabromoplatinum (II) acid salt, hexabromoplatinum (IV) acid salt, dibromodichloroplatinum (II) acid salt, hexahydroxoplatinum (IV) acid salt, bis (oxalato) platinum (II) acid salt, dichlorobis (oxalato) platinum (IV) acid salt, bis (thiooxalato)platinum (II) acid salt, bis (acetylacetonato) platinum (II), bis (1,1,1,5,5,5-hexafluoro-2,4-pentanedionato) platinum (II), bis (1,1,1-trifluoro-2,4-pentanedionato) platinum (II), tetrakis (thiocyanato) platinum (II) acid salt, hexakis (thiocyanato) platinum (IV) acid salt, bis {(Z)-1,2-dicyanoethylene-1,2-dithiolato} platinum (II) acid salt, dichlorobis (diethylsulfido) platinum (II), tetrachlorobis (diethyl sulfido) platinum (IV), bis (glycinato) platinum (II), dichloroglycinato platinum (II) acid salt, dichlorobis(triethylphosphine) platinum (II), chlorohydridobis(triethylphosphine) platinum (II), tetraammine platinum (II) salt, tetrachloro platinum (II) salt, dichlorodiammine platinum (II), trichloroammine platinum (II) salt, hexaammine platinum (IV) salt, chloropentaammine platinum (IV) salt, tetrachlorodiammine platinum (IV), dinitrodiammine platinum (II), dichlorotetrakis(methylamine) platinum (IV) salt, dichloro(ethylenediamine) platinum (II), bis(ethyenediamine) platinum (II) salt, tris (Ethylenediamine) platinum (IV) salt, dichlorobis (ethylenediamine) platinum (IV) salt, dichlorodihydroxo (ethylenediamine) patinum (IV), tetrakis(pyrimidien) platinum (II) salt, dichlorobis(pyridine) platinum (II), bis(2, 2'-piperidine) platinum (II) salt, tetranitroplatinum (II) acid salt, chlororinitro platinum (II) acid salt, dichlorodinitro platinum (II) acid salt, dibromodinitro platinum (II) acid salt, hexanitro platinum (IV) acid salt, chloropentanitro platinum (IV) acid salt, dichlorotetranitro platinum (IV) acid salt, trichlororinitro platinum (IV) acid salt, tetrachlorodinitro platinum (IV) acid salt, dibromodichlorodinitro platinum (IV) acid salt, trichloro(ethylene platinum (II) acid salt, di-$\mu$-chlorobis(chlorolethylene) platinum (II), trans-dichloro (ethylen)(pyridine) platinum (III), bis[bis($\beta$-mercaptoethylamine) nickel (II)-S,S"-platinum (II) salt, dichlorodicarbonyl platinum (II) and the like.

The compounds of gold (I or III, rhodium (III), iridium (III or IV)or osmium (II, III or IV) are similar to the above ones, and illustrative of them are potassium tetrachloro aurate (III), rhodium (III) chloride, potassium hexachloro iridate (IV), potassium tetrachloro iridate, potassium hexachloro osmate (IV) and the like. The inorganic or organic noble metal compound are not restricted to the above examples but include other compounds so far as exhibiting scavenging action.

The iodine adsorption amount (JIS K 6221) carbon black is 20 mg/g or more, preferably 30 mg/g or more, more preferably 50 mg/g or more, particularly preferably 80 mg/g or more, and a dibutylphthalate (DBP) oil absorption value (JIS K 6221) of carbon black is 50 ml/100 g or more, preferably 60 ml/100 g or more, particularly preferably 70 ml/100 g or more, the most preferably 100 ml/100 g or more. The aldehyde compound content by the iodine method is 0.1 wt. % or less, more preferably 0.05 wt. % or less, the most preferably 0.01 wt. % or less.

To the light-shielding resin film layer, a lubricant is blended. By blending a lubricant, handling and lubricity of film improved to prevent wrinkling and streaks. Even loading photosensitive material, blocking does not occur. Furthermore, in the case of using the film as a packaging bag, etc., abrasion and static mark do not occur by the friction with photographic photosensitive material. Moreover, resin fluidity and moldability are improved.

A suitable blending amount of the lubricant is different according to the type of the lubricant. In the case of the lubricants having a small lubricity used so as not to degrade photographic performance of photographic photosensitive materials, such as fatty acid metal salt, a suitable blending amount is 0.01 to 5 wt. %, preferably 0.03 to 3 wt. %, more preferably 0.05 to 1.5 wt. % particularly preferably 0.07 to 1.0 wt. %. The blending amount of less than 0.0 wt. % results in insufficient blending effect. When the blending amount exceeds 5 wt. % foaming, white smoke and die lip streaks are liable to occur. Slip between the molten resin and the screw of an extruder, occurs to vary discharge of resin. Moreover, greasiness and bleedout with time are liable to occur to influence photographic photosensitive materials adversely. Moreover, elapsed heat seal strength, sealability, moistureproofness and oxygen barrier are degraded. In the case of the lubricants having a great lubricity, tending to bleedout, and affecting photographic photosensitive materials, such as fatty amide lubricant and bisfatty amide lubricant, a suitable blending amount is 0.01 to 1 wt. %, preferably 0.03 to 0.5 wt. %, particularly preferably 0.05 to 0.3 wt. %. The blending amount of less than 0.0 1 wt. % results in insufficient blending effect. When the blending amount exceeds 1 wt. %, slip between the molten resin and the screw of an extruder, occur to vary discharge of resin. Moreover, greasiness and bleedout with time are liable to occur. The lubricant bled out is transferred to the photographic photosensitive layer to inhibit development, and quality troubles, such as uneven development and uneven coloring occur.

Examples of the lubricant are as follows:

(I) Fatty acid amide lubricants (1) Saturated fatty acid amide lubricants:
① Behenic acid amide lubricants
② Stearic acid amide lubricants (2) Hydroxystearic acid amide lubricants:
① Palmitic acid amide lubricants
② Lauric acid amide lubricants (3) Unsaturated fatty acid amide lubricants:
① Erucic acid amide lubricants
② Oleic acid amide lubricants (4) Bisfatty acid amide lubricants
① Methylenebisbehenic acid amide lubricants
② Methylenebisstearic acid amide lubricants
③ Methylenebisoleic acid amide lubricants
④ Ethylenebisstearic acid amide lubricants
⑤ Hexamethylenebisstearic acid amide lubricants
⑥ Hexamethylenebisoleic acid amide lubricants (II) Nonionic surfactant lubricants (III) Hydrocarbon lubricants: liquid paraffin, natural paraffin, microwax, synthetic paraffin ($C_{16}$–$C_{49}$, preferably $C_{20}$–$C_{30}$), polyethylene wax (number average molecular weight less than 10,000, preferably less than 8,000, particularly preferably less than 6,000), polypropylene wax (number average molecular weight less than 10,000, preferably less than 8,000, particularly preferably less than 6,000), chlorinated hydrocarbon, fluorocarbon, etc.

(IV) Fatty acid lubricants: higher fatty acids (preferably $C_{12}$–$C_{35}$, such as caproic acid stearic acid, oleic acid, erucic acid and palmitic acid), hydroxy fatty acids, etc.

(V) Ester lubricants: fatty acid lower alcohol esters, fatty acid polyol esters, fatty acid polyglycol esters, fatty acid fatty alcohol esters, etc.

(VI) Alcohol lubricants: polyols, polyglycols, polyglycerols, etc.

(VII) Fatty acid metal salts (metal soap): compounds of metal, such as Li, Na, Mg, Ca, Sr, Ba, Zn, Cd, Al, Sn, Pb with a fatty acid having a number of carbon atoms of 6 to 50 preferably 10 to 40, particularly preferably 10 to 30, such as caproic acid, caprylic acid, capric acid, myristic acid, lauric acid, stearic acid, succinic acid, behenic acid, linolic acid, stearyl lactic acid, lactic acid, phthalic acid, benzoic acid, hydroxystearic acid, montanic acid, ricinoleic acid, naphthenic acid, oleic acid, palmitic acid or erucic acid. Preferred are magnesium stearate, calcium stearate, zinc stearate, magnesium oleate, etc.

(VIII) Particularly saponified montanate esters:

(IX) Silicone lubricants: Dimethylpolysiloxanes and modified versions thereof in various grades (Shin-Etsu Silicone, Toray Silicone).

Particularly, various silicone oils are preferable, because of not only exhibiting the improvement in resin fluidity, lubricity, etc. but also, when they are used together with a light-shielding material, exhibiting unexpected effects, such as the improvement in the dispersibility of light-shielding material and the increase of haze (ASTM D-1003) by rendering resin turbid resulting in the improvement in coloring power and light-shielding ability.

The above silicone oil has preferably a viscosity at ordinary temperature (25° C.) of 50 to 100,000 centistokes, preferably 1,000 to 60,000 centistokes, more preferably 5,000 to 30,000. When the viscosity is less than 50 centistokes, the silone oil adversely affects photographic properties, and bleeding out becomes a problem. When the viscosity exceeds 100,000 centistokes, difficulty occurs in handling because of too viscous.

Examples of silicones and modified versions thereof are those having modified siloxane bonds such as polydimethylsiloxane and polymethylphenylsiloxane, olefin-modified silicone, amide-modified silicone, amino-modified silicone, dimethylpolysiloxane, amino-modified silicone, carboxyl-modified silicone, α-methylstyrene-modified silicone, polyether-modified silicone modified with polyethylene glycol, polypropylene glycol, etc., olefin/polyether-modified silicone, epoxy-modified silicone, alcohol-modified silicone, etc. Among them, olefin-modified silicone, polyether-modified silicone dimethylpolysiloxane, amide-modified silicone, and olefin/polyether-modified silicone are preferable for packaging materials for a photographic photosensitive material because of rare adverse affects upon photographic properties and a great lubricating and light-shielding effects.

The silicone oil improves friction coefficient of a molding material, such as a resin sheet in heated conditions, decreases sliding resistance generated during hot plate sealing in an automatic packaging machine and prevents the occurrence of wrinkling. Thereby, the silicone oil provides a resin film which has a beautiful appearance, a high sealability, and adhesion to an article to be packaged without sagging. It also prevents the degradation of gloss by sliding to form a fine sealed portion. In the case of using silicone oil, friction coefficient at high temperature can be not more than 1.4 for sliding heat seal.

The blending effects of the silicone oil are as follows:

① Upon using together with fibrous filler, non-fibrous light-shielding material or pigment, their surface is coated with the silicone oil to improve dispersibility.

② Improvement in resin fluidity, decrease of motor load for screw, prevention of melt fracture.

③ Ensuring of lubricity without fatty acid amide lubricant which bleeds out to generate white powder.

④ Reduction of friction coefficient of packaging material, improvement in automatic bag-making ability, prevention of the degradation of gloss caused by wrinkling or sliding upon heat sealing to obtain a beautiful sealed portion.

⑤ Upon using together with light-shielding material, thermoplastic resin is made turbid, as well as the dispersibility of the light-shielding material is improved, to increase haze, resulting in the improvement in coloring power and light-shielding ability. As a result, light-shielding ability can be ensured, even reducing the blending amount of light-shielding material which degrades properties.

To the light-shielding polyolefin resin film layer, an antioxidant can be blended. By blending an antioxidant, it is possible to prevent thermal degradation and thermal decomposition of thermoplastic resin and additives, such as fatty acid, lubricant, organic nucleating agent and surfactant, and to prevent the great variation of fluidity and the occurrence of lumps of the resin composition, furthermore, it is also possible to prevent the generation of thermal decomposition products (aldehydes, etc.) which adversely affect photographic photosensitive materials. It is preferable to add various known compounds (e.g. hydantoin compounds, hydrazine compounds, urea compounds which stabilize thermal decomposition products (aldehydes etc.) by decreasing, reacting or adsorbing them to the degree not to affect adversely photographic photosensitive materials. The photographic properties can be maintained by decreasing the formaldehyde content, measured by the acetylacetone method, of the packaging material for a photographic photosensitive material to 500 ppm or less, preferably 300 ppm or less, more preferably 150 ppm or less, the most preferably 75 ppm or less.

A suitable blending amount of one or more of the antioxidant is 0.001 to 1.5 wt. %, preferably 0.005 to 0.7 wt. %, more preferably 0.01 to 0.45 wt. %. When the blending amount is less than 0.001 wt. %, blending affect is insufficient. When the blending amount is more than 1 wt. %, the antioxidant affects adversely photographic properties of photographic photosensitive materials which utilize oxidation-reduction reaction, and bleed out of the surface of molded articles to degrade appearance.

Examples of the antioxidant are as follows:

Phenolic Antioxidants:

vitamin E (tocopherol), tocopherol dimer (α-tocopherol, β-tocopherol, 5,7-dimethyl tocopherol), 6-t-butyl-3-methylphenol derivatives, 2,6-di-t-butyl-p-cresol, 2,6-di-t-butyl-phenol, 2,6-di-t-butyl-α-dimethylamino-p-cresol, 2,6-di-t-butyl-p-ethylphenol, 2,6-di-t-butyl-p-cresol (BHT), 2,2'-methylenebis-(4-ethyl-6-t-butylphenol), 4,4'-butylidenebis(6-t-butyl-m-cresol), 4,4'-thiobis(6-t-butyl-m-cresol), 4,4-dihydroxydiphenylcyclohexane, butylated hydroxyanisole, alkyl group-induced bisphenol, styrene group-induced phenol, 2,6-di-t-butyl-4-methylphenol, n-octadecyl-3-(3',5'-di-t-butyl-4'-hydroxyphenyl) propionate, 2,2'-methylenebis(4-methyl-6-t-butylphenol), 4,4'-thiobis(3-methyl-6-t-butylphenol, 4,4'-butylidenebis(3-methyl-6-t-butylphenol), stearyl-β-(3,5-di-4-butyl-4-hydroxyphenyl) propionate, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis [methylene-3-(3', 5'-di-t-butyl-4'-hydroxyphenyl)propionate]methane, etc.

Ketone-Amine Condensate Antioxidants:

6-ethoxy-2,2,4-trimethyl-1,2-dihydroquinoline, polymers of 2,2,4-trimethyl-1,2-dihydroquinoline, trimethyldihydroquinoline derivatives, etc.

Arylamine Antioxidants:

Phenyl-α-naphthylamine, N-phenyl-β-naphthylamine, N-phenyl-N'-isopropyl-p-phenylenediamine, N,N'-diphenyl-p-phenylenediamine, N,N'-di-β-naphthyl-p-phenylenediamine, N-(3'-hydroxybutylidene)-1-naphthylamine, etc.

Imidazole Antioxidants:

2-mercaptobenzomidazole, zinc salt of 2-mercaptobenzomidazole, 2-mercaptomethylbenzoimidazole, etc.

Phosphite Antioxidants:

Alkyl-induced arylphosphite, tris (mono and/or dinonylphenyl) phosphite, cyclic neopentanetetraylbis (2,6-di-t-butyl-4-methylphenyl) phosphite, diphenylisodecylphosphite, socium phosphite salt of tris (nonylphenyl) phosphite, 2,7-methylenebis (4,6-di-t-butylphenyl) octylphosphite, tris (2,4-di-t-butylphenyl) phosphite, trinonylphenylphosphite, triphenylphosphite, etc.

Thiourea Antioxidants:

Thiourea derivatives, 1,3-bis(dimethylaminopropyl)-2-thiourea, etc.

Other Antioxidants:

Those useful for air oxidation, such as dilauryl thiodipropionate, metal deactivators, etc.

Particularly preferable antioxidants are hindered phenolic antioxidants because of rare adverse affect upon photographic properties of photographic photosensitive materials. The hindered phenolic antioxidants are 1,3,5-trimethyl-2,4, 6-tris(3,5-di-tert-butyl-4-hydroxybenzyl)benzene, tetrakis [methylene(3,5-di-tert-butyl-4-hydoxy-hydrocinnamate) methane], octadecyl-3,5-di-tert-butyl-4-hydroxy-hydrocinnamate, 2,2',2'-tris (3,5-di-tert-butyl-4-hydroxyphenyl)propionyloxy ethylisocyanulate, 1,3,5-tris (4-tert-butyl-3-hydroxy-2,6-dimethylbenzyl) isocyanulate, tetrakis(2,4-di-tert-butylphenyl)-4,4'-biphenylene diphosphite ester, tetrakis[methylene-3-(3,5-di-tert-butyl-4-hydroxyphenyl)propionate]methane, 4,4'-triobis-(6-tert-butyl-o-cresol), 2,2'-thiobis-(6-tert-butyl-4-methylphenol), tris-(2-methyl-4-hydroxy-5-tert-btuylphenyl)butane, 2,2'-methylene-bis-(4-methyl-6-tert-butylphenol), 4,4'-methylene-bis-(2,6-di-tert-butylphenol), 4,4'-butylidenebis-(3-methyl-6-tert-butylphenol), 2,6-di-tert-butyl-4-methylphenol, 4-hydroxymethyl-2,6-di-tert-butylphenol, 2,6-di-tert-4-n-butylphenol, 2,6-bis(2'-hydroxy-3'-tert-butyl-5'-methylbenzyl)-4-methylphenol, 4,4'-methylene-bis-(6-tert-butyl-o-cresol), 4,4'-butylidene-bis-(6-tert-butyl-m-cresol, 3.9-bis {1.1-dimethyl-2-[β-(3-t-butyl-4-hydrox-5-methylphenyl)propionyloxy] ethyl} 2,4.8,10-tetraoxospiro [5,5]undecane, and the like. Preferable antioxidants have a melting point of 100° C. or more, particularly preferably 120° C. or more, in view of small bleeding out, small thermal decomposition, and small adverse affect upon photographic photosensitive materials. Moreover, it is effective to combine a phosphorous-containing antioxidant with the hindered phenolic antioxidant. To combine a phosphorus-containing antioxidant and a hydrous double salt (hydrotalcite compound is particularly preferred.) with the hindered phenolic antioxidant is particularly preferable.

In the case of containing at least one type of phosphorus-containing antioxidant, since phosphorous acid produced by thermal decomposition greatly affects adversely photographic photosensitive materials to generate fog, it is preferable to add hydrotalcite compound in a content of 0.01 to 5 wt. %, preferably 0.05 to 3 wt. % which neutralizes phosphorous acid.

Preferable antioxidants are phenolic antioxidants, and particularly effective antioxidants are BHT, low volatile high molecular weight phenolic antioxidants, phosphorus-containing antioxidant, such as dilaurylthiodipropionate, distearylthiodipropionate, tris(2,4-di-tert-butylphenyl) phosphite, dialkyiphosphate, etc. Two or more antioxidants may be combined.

The above vitamin E (tocopherol) and tocopherol dimers color the polyolefin resin film yellow, as well as exhibit excellent oxidation inhibition. When they are combined with a light-shielding material, such as carbon black, light-shielding ability of the light-shielding material is improved due to their color and improvement in dispensability of the light-shielding material. As a result, molded articles having equivalent light-shielding ability can be obtained, even if the blending amount of the light-shielding material is decreased by 10% or more. Thereupon, various advantages can be obtained, such as prevention of photographic properties degradation, improvement in physical strength, improvement in appearance, and reduction of manufacturing cost due to the decrease of material cost.

Particularly, it is preferable to combine at least one of the above hindered phenolic antioxidants having a melting point of 100° C. or more, preferably 120° C. or more which are representative radical chain terminator, and at least one of phosphorus-containing antioxidants which are peroxide decomposer, because of improving prevention of thermal degradation of resin and additives without degrading photographic properties. The must preferable combination is 0.01 to 1.5 wt. % in the total of one or more of phosphorus-containing antioxidants and one or more of hindered phenolic antioxidants and 0.01 to 5 wt. % of hydrotalcite compound.

Particularly preferable antioxidants are the hindered phenolic antioxidant having a molecular weight of 200 or more, preferably 300 or more, more preferably 400 or more, the most preferably 500 or more, because of exhibiting various excellent properties, such as small adverse effects on photographic properties of photographic photosensitive materials, small thermal decomposition at a melting temperature of resin (130 to 400° C.) and small bleedout with time.

The most preferable antioxidants for the packaging material for a photographic photosensitive material of the invention are tetrakis[methylene-3-(3,5-di-t-butyl-4-hydroxyphenyl) propionate]methane, n-octadecyl-3-(4'-hydroxy-3',5'-d-t-butylphenol)propionate and tris-(2,4-di-t-butylphenyl)phosphite.

To the light-shielding resin film layer, an antistatic agent can be blended. By blending an antistatic agent, it is possible to prevent or inhibit the generation of static electricity caused by the friction with a photographic photosensitive material to prevent static mark troubles.

A suitable blending amount of the antistatic agent is 0.01 wt. % or more, preferably 0.05 wt. % or more, particularly preferably 0.1 wt. % or more, and 10 wt. % or less, preferably 7 wt. % or less, more preferably 5 wt. % or less, further more preferably 3 wt. % or less, the most preferably 1.5 wt. % or less. When the blending amount is less than 0.01 wt. %, the blending effects are insufficient. When the blending amount exceeds 10 wt. %, slip between molten resin and a screw of an extruder is liable to occur resulting in the variation of ejected resin amount. Moreover, greasiness and bleedout tend to occur with time.

As the antistatic agent, various surfactants are usable which can be divided into nonionic surfactant, anionic surfactant, cationic surfactant and amphoretic surfactant.
Nonionic surfactants:

Polyethylene glycol fatty acid ester, polyoxyethylene sorbitan fatty acid ester, polyoxyethylene alkylamine, polyoxyethylene alkylamine fatty acid ester, polyoxyethylene fatty alcohol ether, polyoxyethylene alkylphenyl ether, polyoxyethylene glycerine fatty acid ester, polyoxyethylene fatty amine, sorbitan monofatty acid ester, fatty acid pentaerythritol, fatty alcohol-ethylene oxide adduct, fatty acid-ethylene oxide adduct, fatty amino acid or fatty amide-ethylene oxide adduct, alkyl phenol-ethylene oxide adduct, alkyl naphthol-ethylene oxide adduct, partial fatty ester of polyol-ethylene oxide adduct, polyoxyethylene alkylamide, alkylamine derivatives, various other nonionic antioxidants disclosed in Japanese Patent KOKOKU No. 63-26697 at page 120, etc.
Anionic surfactsnts:

Sodium salt of ficinoleic acid sulfate ester, various fatty acid metal salts, sodium salt of ricinoleate ester sulfate ester, sulfated oleic acid ethylaniline, sulfate ester salt of olefin, sodium salt of oleil alcohol sulfate ester, alkyl sulfate ester salt, fatty acid ethyl sulfonic acid salt, alkyl sulfate, alkyl phosphate, alkyl sulfonic acid salt, alkyl naphthalene sulfonic acid salt, alkyl benzene sulfonic acid salt, succinic acid ester sulfonic acid salt, phosphate ester salt, etc.
Cationic surfactants:

Primary amine salts, tertiary amine salt, quaternary ammonium salt, trialkylbenzyl ammonium salts pyridine derivatives,
Amphoretic surfactants:

Carboxylic acid derivatives, imidazoline derivatives, betaine derivatives, such as alkyl betaine and alkyl imidazolium betaine.

To the conductive light-shielding thermoplastic resin film layer, other conductive materials may be added. The other conductive materials are various inorganic salts, such as sodium chloride, potassium chloride, lithium chloride, sodium aluminate, sodium phosphate, calcium chloride, magnesium chloride and sodium sulfate, organic acid salts, such as potassium formate and sodium oxalate, surfactants, such as fatty acid metal salts (soaps), phosphates and carboxylates, polymer electrolytes, such as quaternary ammonium salts, polyacrylate salts, salts of styrene-maleic acid copolymer resin and polystyrene sulfonate salts, inorganic conductive materials, such as silica, alumina and montmorillonite, surfactants, alkyl amine derivatives, surface coated pigments with metal, metal powders, carbon fiber, metal fibers, conductive inorganic pigments, conductive fibrous materials (fibers and whiskers), metal fillers, etc.

By incorporating the various advantages can be obtained, such as the improvement in antistatic ability, lubricity, dripproofing ability, blending ability of light-shielding material and additives, resin fluidity, and the inhibition of bleed-out of lubricant and blocking.

As the conductive fibrous material, there are carbon fiber, alumina fiber, nickel fiber, surface-metallized (Al coating, Ni coating, Ag coating, etc.) fiber, and whiskers (microfiber shaped single crystal) such as tungsten whisker, nickel whisker, chromium whisker, iron whisker, copper whisker, alumina whisker, potassium titanate whisker, silicon carbide whisker, silicon nitride whisker, etc. Particularly preferred ones are carbon fiber, surface-metallized fiber and potassium titanate whisker.

As the metal filler, there are metal powders, such as those of aluminum, zinc, tin, iron, copper, nickel, silver, stainless steel and leed, and metal flakes, such as these of aluminum, zinc, copper, nickel, silver and stainless steel, described in the light-shielding material, and metal ribbons, such as those of aluminum, zinc, iron, copper and nickel, crystalline metal oxides, such as $ZnO$, $TiO_2$, $SnO_2$, $Al_2O_3$, $In_2O_3$, $SiO_2$, $MgO$, $BaO$, $MoO_2$ and $V_2O_5$, and composit oxides thereof.

The surfactant antistatic agent described previously can also be used as the conductive material.

By blending the surfactant antistatic agent, it is possible to prevent static mark troubles, film molding troubles, and to improve dispersion of the conductive material. Aluminum powder including aluminum paste is excellent in light-shielding ability, antistatic ability, moistureproofness and physical strength, due to its flake-shape and small generation of microgrits. It is preferable to combine the aluminum powder with spherical or powder-shaped carbon black, white carbon, Titanium Yellow, titanium oxide, lithopone or hypefine calcium carbonate, which tends to generate microgrits, because the dispersion of all pigments is good to improve light-shielding ability and physical strength. In this case, it is preferable to make the blending amount of flake-shaped pigment, such as aluminum powder, aluminum paste or mica, greater than the spherical or powder-shaped pigment, in terms of the improvement in appearance, light-shielding ability and moistureproofness.

Various known antistatic agents can be used in the invention by selecting type, adjusting blending amount or combining other additive(s) so as not to affect adversely photographic properties of photographic photosensitive materials. For example, they can be selected from various antistatic agents disclosed on pages 381 to 388 of "Compounding Ingredients for Rubbers and Plastics, Revised 2nd Ed.", Rubber Digest Co., 1993, pages 64 to 104, 236 to 266 of "Antistatic Agents-Surface Reforming of Polymers-, Enlarged Supplement", pages 117 to 153 of "Plastic Additives Data Collection, Separated Ed, of Kagaku Kogyo", The Chemical Daily Co., 1968, pages 123 to 151 of "Plastic Data Collection", the Chemical Daily Co., pages 776 to 778 of "Plastic Data Handbook", Kogyo Chosakai.

Among them, nonionic antistatic agent are particularly preferred, because adverse affects upon photographic properties and human body are small, and static marks can be prevented remarkably. It is also preferable to blend with commercial antistatic masterbatch pellets ELESTMASTER LL-10, HE-110, HE-510, 1215, 326 of Kao in an amount of 0.1 to 10 wt. %, preferably 0.2 to 8 wt. %, more preferably 0.3 to 6 wt. %, further more preferably 0.4 to 4.5 wt. %, the most preferably 0.5 to 3 wt. %.

By adding antiblocking material, blocking, static marks, abrasion, and adhesion of photographic photosensitive material to the packaging material of the invention can be prevented, as well as the prevention of blocking.

A suitable blending amount is 0.01 to 5 wt. %, preferably 0.02 to 4 wt. %, more preferably 0.03 to 3 wt. %, particularly preferably 0.04 to 2 wt. %. When the blending amount is less than 0.01 wt. % antiblocking effect is insufficient. When the blending amount exceeds 5 wt. %, not only lumps increases to generate pressure marks and abrasions on a photographic photosensitive material, but also physical strength and heat sealing properties of the resin film degrade.

As the antiblocking material there are silica including natural silica and synthetic silica, zeolite, calcium carbonate, talc (magnesium silicate), aluminum silicate, calcium silicate, fatty acid amide lubricant, higher fatty acid polyvinyl ester, n-octadecylurea, N,N'-dioleyloxamide, N'-ethanolstearic amide, dicarboxylic acid ester amide, etc., and zeolite and silica are preferred. Synthetic zeolite and synthetic silica are particularly preferable, and synthetic zeolite which adsorb harmful substances to photographic properties to render harmless is the most preferable. Preferable silica has a mean particle size of 0.3 to 20 $\mu$m, more preferable 0.5 to 15 $\mu$m. When the mean particle size is less than 0.3 $\mu$m, aggregation is liable to occur to generate lumps frequently, and antiblocking effect is small. When the mean particle size is more than 20 $\mu$m, the film surface is rough by exposing silica particles, and abrasion is liable to occur on the surface of photographic photosensitive materials.

As the zeolite, there are natural zeolite (comprising analcime, chabazite, heulandite, erionite, ferrierite, laumontite, mordenite, etc, as the component), and synthetic zeolite (in the type of A, N—A, X, Y, hydroxy sodalite, ZK-5, B, R, D, T, L, hydroxy, concrinite, W, Zeolaon, etc.). The zeolite exhibits excellent actions not only almost similar to the aforemnetioned hydrotalcite compound, but also as a metal carrier and a metal-based inorganic anti-fungus agent.

By coating the surface of zeolite with a surface-coating material similar to the hydrogtalcite compound, the dispersibility and affinity against resin are improved to improve film processing ability, physical strength, etc.

The photocatalyst used in the invention accelerates its catalytic reaction by irradiation of light, and includes a solid photocatalyst of a semiconductor which carries a metal or metal oxide. Illustrative of the semiconductors are n-type and P-type semiconductors, such as titanium oxide ($TiO_2$), iron oxide ($Fe_2O_3$), tungsten oxide ($WO_2$), tin oxide ($SnO_2$) bismuth oxide ($Bi_2O_3$), nickel oxide (NiO), copper oxide ($Cu_2O$), zinc oxide (ZnO), strontium titanate ($SnTiO_2$), silicon oxide ($SiO_2$), molybdenum sulfide ($MOS_2$), indium phosphide (InP), gallium phosphide (GaP) and indium lead (InPb). Illustrative of the metals and metal oxides carried on the semiconductor are platinum (Pt), rhodium (Rh), niobium (Nb), copper (Cu), tin (Sn), ruthenium oxide ($RuO_2$) and nickel oxide (NiO). Two or more of the photocatalysts may be combined.

The light energy, which makes the photocatalyst photoactivated, has a wavelength capable of exciting the photocatalyst (including an optional combination of metal(s) and/or metal oxide(s) carried on the semiconductor), and it is preferable to irradiate a light having visible wavelength or UV wavelength. Suitable light energy sources are natural light of sunlight, and artificial light of light of a mercury-vapor lamp, light of a filament lamp, such as halogen lamp, short arc xenon light and laser beam. An artificial light may be used together with the sunlight as an auxiliary light thereof. Two or more types of the above irradiations may be combined.

Particularly preferable photocatalysts for the invention are titanium oxide photocatalysts containing an iron compound, because of being excellent in photocatalytic action and being inexpensive.

The titanium oxide catalysts containing an iron compound are employed based on the findings that (1) by incorporating an iron compound into the inside and/or the surface of titanium oxide particles, photocatalytic functions are improved compared with titanium oxide alone and compared with a mixture of titanium compound and the iron compound, and moreover, it can be produced inexpensively, (2) by treating titanium oxide with a mineral acid, photocatalytic functions are improved, (3) by incorporating an iron compound into the inside and/or the surface of the titanium oxide particles which have been treated with a mineral acid, photocatalytic functions are further improved.

The titanium oxide photocatalyst containing an iron compound is different from a simple mixture of titanium oxide particles and the iron compound, and is composed of titanium oxide particles into the inside of which the iron compound is incorporated and/or on the surface of which the iron compound is carried. The titanium oxide includes various titanium oxides, such as anatase-type titanium oxide, rutile-type titanium oxide, amorphous titanium oxide, methatitanic acid orthotitanic acid, titanium hydroxyde, hydrous titanium oxide and hydrated titanium oxide. Among them, anatase-type titanium oxide is preferable, because of exhibiting excellent photocatalytic functions. The mean particle size of titanium oxide can be determined by calculating using the formula of Scherrer or by the observation through an electron microscope. A preferable mean particle size is 1 to 500 nm, more preferably 5 to 250 nm, the most preferably 5 to 50 nm. The iron compound includes various iron salts, such as iron oxides, iron hydroxides, iron oxyhydroxides, iron sulfates, iron chlorides, iron nitrates, iron carbonates and iron acetates, and iron ions. Typical iron compounds in the invention are divalent iron compounds and trivalent iron compounds, and in view of the improvement in photocatalytic ability of titanium oxide, iron oxide ($Fe_2O_3$, $Fe_3O_4$), iron hydroxides ($Fe(OH)_2$, $Fe(OH)_3$), iron oxyhydroxide (FeOOH) are preferred. Although the content of the iron compound can be varied arbitrarily, a suitable content is 0.0005 to 10 wt. %, preferably 0.001 to 5 wt. %, more preferably 0.001 to 3 wt. %, the most preferagbly 0.001 to 1 wt. % as Fe weight per the $TiO_2$ weight of titanium oxide particles. In the ranges less than or more than the above range, photocatalytic functions tend to decrease.

In the invention, the iron compound is preferably carried on the surface of titanium oxide particles, and in this case, a suitable carried amount of the iron compound is 0.05 to 5000 μg, preferably 0.1 to 3000 μg, more preferably 0.3 to 1000 μg, more preferably 0.3 to 1000 μg as Fe weight per 1 $m^2$ of the surface of titanium oxide particles. In the range of less than and more than the above range, the photocatalytic functions tend to decrease.

For using the titanium oxide photocatalyst containing an iron compound for various photocatalytic reactions, such as the decomposition of harmful substances for photographic photosensitive materials, it is necessary to irradiate light having a wavelength of more than the energy of band gap.

The titanium oxide photocatalyst of the invention may be used in a state of suspended in a solvent, keeping or coating on a support, powder, further pulverized powder, molded articles of the powder, or the like.

A particularly preferable method utilizes the recent flame spray coating of melting titanium oxide photocatalyst and/or a material containing titanium photocatalyst, and colliding microparticles (microns to tens microns) of the above melted matter to the side opposite to a photographic photosensitive material to be packaged of a through-view transparent synthetic resin sheet at a high speed (meters to hundreds meters/sec.) to form a membrane which is a layer of flattened microparticles to reform the outermost layer surface of the transparent sheet. The flame spray coating utilizes plasma, laser, combustion flame of gas, or the like. In the plasma spray coating, titanium oxide photocatalyst and/or a material containing titanium photocatalyst is melted and accelerated by plasma jet, and collided in the outermost surface of the transparent sheet at a high speed to form a membrane. Since the method is composed of accelerating liquid particulates (ensemble of atoms, ions, or the like), and colliding to a surface of the transparent sheet to form a laminated membrane, it is called Physical Fine Particle Deposition (PFPD).

The ability of the titanium oxide photocatalyst membrane, particularly preferably that formed from fine anatase-type titanium oxide powder by the plasma spray coating in the atmosphere, of decomposing aldehyde compound, such as acetoaldehyde and formaldehyde is 35 times greater than rutile-type titanium oxide photocatalyst by controlling plasma output. The anatase content of the titanium oxide photocatalyst membrane is greatly increased by forming granular anatase-type titanium oxide powder by high speed gas flame spray coating, and decomposition ability of aldehyde compounds is remarkably improved.

The matrix resin of the conductive light-shielding thermoplastic resin film layer may a blend resin, and a suitable resin for blending the thermoplastic elastomer is polyolefin resin which is excellent in inexpensiveness, photographic properties, disposability, recycling suitability, easy availability in the world, as well as various properties. As the polyolefin, there are homopolyethylene resin, very high molecular weight polyethylene resin, cyclic polyethylene resin, homopolybutene-1 resin, homopoly 4-methylpentene-1 resin, ethylene-α-olefin random or block copolymer resin, homopolypropylene resin, propylene-α-olefin random or block copolymer resin, acid-modified polyolefin resin, ethylene-acrylic acid copolymer resin, ethylene-methacrylic acid copolymer resin, ethylene-propylene-butene-1 copolymer resin, ethylene-acrylate ester copolymer resin such as ethylene-ethyl acrylate ester copolymer resin, ethylene-vinyl acetate copolymer resin and the like. The resin being blended with the thermoplastic elastomer may be single or a combination of two or more resins. A suitable content of the polyolefin resin is 5 wt. % or more, preferably 10 wt. % or more, more preferably 20 wt. % or more in view of moldability, heat sealing properties, physical strength, photographic properties and recycling suitability.

As the homopolyethylene resin, there are branched low density polyethylene resin having long chain branches and a density of 0.910 to 0.925 $g/cm^3$ produced by polymerizing ethylene at 150 to 300° C. at 1,000 to 3,000 $kg/cm^2$ using a free-radical initiator, such as oxygen or peroxide, linear high density polyethylene resin having a density of 0.941 to 0.985 $g/cm^3$ produced by polymerizing ethylene at 50 to 250° C. at 50 to 200 $kg/cm^2$ using Ziegler catalyst (titanium-based) or Phillips catalyst (chromium-based) for the medium, low pressure process, and medium density polyethylene resin having a density of 0.926 to 0.940 $g/cm^3$ produced by blending the above low density polyethylene resin and the high density polyethylene resin, although it can also be produced by the high pressure process or the medium, low pressure process. Furthermore, there are various density hompolyethylene resins having a narrow molecular weight distribution and composition distribution produced by using a metallocene catalyst which have recently been put to practical use.

The most preferable ethylene-α-olefin copolymer resin is L-LDPE (linear low density polyethylene) resin. The L-LDPE resin is called third polyethylene resin, and it is a low cost high strength resin, having the advantages of both low, medium density polyethylene resin and high density polyethylene resin, which meets the requirements, i.e. resource conservation and energy conservation, of the time. The L-LDPE resin has a linear structure having short branches. The number of carbon atoms of the α-olefin is 3 to 20, preferably 3 to 12, more preferably 4 to 8, the most preferably 6 to 8. Preferable α-olefins in terms of physical strength and cost, are propylene-1, butene-1, pentene-1, 3-methylpentene-1, 4-methylpentene-1, hexene-1, heptene-1, octene-1, nonen-1, decene-1, undecene-1dodecene-1, pentadecene-1, octadecene-1, etc., and the α-olefin unit content is about 0.5 to 10 mol. %. Two or more α-olefins may be combined. Ethylene-α-olefin random copolymer resins of which the α-olefin has 4 to 8 carbon atoms are preferably for the invention, but ethylene-α-olefin block copolymers and blend resins of them are also usable.

As the polymerization process of L-LDPE resin, there are the vapor process using a medium, low pressure apparatus, the solution process, the liquid slurry process and the ion polymerization process at a high temperature and a high pressure using an apparatus for the high pressure modified process and ziegler catalyst.

Very low density L-LDPE resins having a density of less than 0.915 g/cm$^3$ are also preferred which are flexible high strength resins being excellent in low temperature heat sealing properties and dispersibility of light-shielding material.

Preferable L-LDPE resins for film-shaped packaging materials requiring particularly tear strength and impact puncture strength, use an α-olefin having a number of carbon atoms of 3 to 15, preferably 4 to 10, particularly preferably 6 to 8, and are produced by the liquid slurry process or the vapor process having a melt flow rate (MFR, ASTM D-1238, Condition E, at 190° C., at a piston load of 2.16 kgf) of 0.1 to 40 g/10 minutes and a density of 0.870 to 0.940 g/cm$^3$ (ASTM D-1505). L-LDPE resins produced by the high pressure modified process are also preferred.

Manufacturing processes of L-LDPE resin using a multisite catalyst are described below.

[1] Vapor phase process

Energy quantity necessary for polymerization is small. Comonomer must be easily evaporatable single component, and therefore, restricted compared with the solution process. Recently, selectable comonomers and controlable molecular weight distribution range are being widened.

[2] Slurry process

The liquid phase polymerization process using solvent is divided into the slurry process and the solution process. The slurry process is advantageous in the production using a relatively compact equipment and easy removal of solvent because of low viscosity of liquid phase in a reaction tank due to slurry (heterogeneous system), although using solvent. On the other hand, the production of L-LDPE resin having a density of 0.930 g/cm$^3$ or less is restricted, because of the formation of high viscosity liquid phase caused by the dissolution of low molecular weight low density polymers and lumping of polymers by swelling.

[3] Solution process

Polymerization is carried out in solution. In order to maintain the state of solution, the reaction is carried out at a high temperature. In the viewpoint of quality, the allowable low density range is wide, and it is the optimal manufacturing process for the copolymerization of the α-olefin having a number of carbon atoms of 6 or more (4-methylpentene-1, hexene-1, 4-methylhexene-1, 4,4-dimethylpentene-1, Heptene-1, octene-1, decene-1, dodecene-1, tetradecene-1, hexadecene-1, octadecene-1, eicosene-1, etc.). It is also the optimal manufacturing process for the L-LDPE resin having a great α-olefin content (very low density L-LDPE resin having a density of 0.915 g/cm$^3$ or less, particularly 0.910 g/cm$^3$ or less).

[4] Modified high pressure process

By utilizing the conventional high pressure process as it is, L-LDPE resin is produced at a high temperature and a high pressure using Ziegler catalyst, and the running cost is higher than the vapor phase process, the slurry process and the solution process.

General polymerization conditions of the above processes are as follows:

|  | Pressure (Psc) | Temperature(° C.) |
| --- | --- | --- |
| Vapor phase process | 250–350 | 90–100 |
| Slurry process | 400–500 | 90–100 |
| Solution process | 450–650 | 200–250 |
| Modified high pressure process | ~20,000 | ~200 |

It is also preferable to use the L-LDPE resin having a density of 0.920 g/cm$^3$ or less, preferably 0.915 g/cm$^3$ or less, particularly preferably 0.910 g/cm$^3$ or less, produced by polymerizing using a single site catalyst represented by metallocene catalyst.

The most preferable resin used in combination with the thermoplastic elastomer is the above ethylene-α-olefin random copolymer resin produced by using a metallocene catalyst. Actually, it is L-LDPE resin produced by copolymerizing ethylene and hexene-1 which is an α-olefin of six carbon atoms by the vapor phase process. The polymerization using metallocene catalyst may be carried out by any process, and for example by the modified high pressure process, the polymerization is preferably carried out at a temperature not less than 120° C. in order to maintain the polymer in a liquid state and to improve polymerization activity and not more than 350° C. in order to restrain chain transfer reaction which causes to decrease molecular weight and not to decrease polymerization activity, preferably at a temperature of 150 to 300° C., and at a pressure of 400 kgf/cm$^2$G or more, preferably 500 to 2,000 kg/cm$^2$G. In the vapor phase polymerization process, the polymerization temperature is necessary to be 100° C. or less, because a high temperature is undesirable due to the copolymer in a powder state. The lower limit of the polymerization is not restricted, but 50° C. or more is preferable in order to improve polymerization activity. Moreover, it is also preferable to conduct the polymerization using a catalyst component preliminary polymerized with α-olefin, an organic aluminum compound and an ionized ionic compound, in order to improve polymerization activity. In the solution polymerization process, the polymerization temperature is necessary to be 120° C. or more in consideration of the copolymer being in a solution state and to improve polymerization activity. The upper limit of the polymerization temperature is not restricted, but 300° C. or less is preferable in order to restrain chain transfer reaction and not to decrease catalyst efficiency. The polymerization pressure is preferably atmospheric pressure or more and 200 kg/cm$^2$ or less in view of a balane between polymerization activity and economy.

In every case, catalyst residues influence adversely photographic properties of photographic photosensitive materials, generate rust on a mold or parts of an extruder contacting resin to degrade dimensional accuracy, and generates resin yellowing and lumps, and accordingly, the less content is more preferable. A suitable content of residual halogen gases in the packaging material of the invention is 400 ppm or less, preferably 200 ppm or less, more preferably 100 ppm or less, further more preferably 1 to 80 ppm, the most preferably 4 to 60 ppm, in order to maintain photographic properties in good conditions. A suitable residual content of each chromium, zirconium, titanium, hafnium and vanadium is 200 ppm or less, preferably 200 ppm or less, more preferably 100 ppm or less, further more preferably 60 ppm or less, the most preferably 40 ppm or less.

A representative catalyst is composed of a transition metal compound of IV family in the periodic table containing a ligand having a cyclopentadienyl skeleton and optionally a cocatalyst, an organic aluminum compound and/or a carrier. Besides, ethylene and/or α-olefin has previously been polymerized in the presence of the above catalyst, and the reaction product is served as the catalyst.

The cyclopentadienyl skeleton of the transition metal belonging to IV family in the periodic table is cyclopentadienyl group, substituted cyclopentadienyl group or the like. Illustrative of the substituted cyclopentadienyl groups are those having at least one substitutent selected from hydrocarbon groups having a number of carbon atoms of 1–10, silyl group, silyl-substituted alkyl groups, cyano group, cyanoalkyl groups, cyanoaryl groups, halogen atoms, haloalkyl groups, halosilyl groups and the like. The substituted cyclopentadienyl groups may have two or more substituents, and the substituents may be combined to form a ring.

The hydrocarbon group having a number of carbon atoms of 1 to 10 is alkyl group, cycloalkyl group, aryl group, aralkyl group or the like, and preferred ones are the alkyl groups, such as methyl group, ethyl group, n-propyl group, isopropyl group, n-butyl group, isobutyl group, sec-butyl group, t-butyl group, pentyl group, hexyl group, octyl group, 2-ethylhexyl group and decyl group, the cycloalkyl groups, such as cyclopentyl group and cyclohexyl group, the aryl groups, such as phenyl group and tolyl group, benzyl group, neophyl group, etc.

Illustrative of preferable substituted cyclopentadienyl groups are methylcyclopentadienyl group, ethylcyclopentadienyl group, n-hexylcyclopentadienyl group, 1,3-dimethylcyclopentadienyl group, 1,3-n-butylmethylcyclopentadienyl group, 1,3-n-propylmethylethylcyclopentadienyl group, and the like. Among them, the substituted cyclopentadienyl groups substituted with an alkyl group having a number o carbon atoms of 3 or more, and 1,3-substituted cyclopentadienyl groups are particularly preferred. As the substituted cyclopentadienyl group wherein substituents, i.e. hydrocarbon groups, are combined to form one or more rings, indenyl group, substituted indenyl groups substitued with a hydrocarbon group (alkyl group, etc.) having a number of carbon atoms of 1–8, naphthyl group, substituted naphthyl groups substitued with a hydrocarbon group (alkyl group, etc.) having a number of carbon atoms of 1–8, substituted fluorenyl groups substitued with a hydrocarbon group (alkyl group, etc.) having a number of carbon atoms of 1–8.

The transition metal of the transition metal compound of IV family in the periodic table is zirconium, titanium, vanadium, hafnium or the like, and zirconium is particularly preferred. The transition metal compound has, in general, 1–3 ligands having the cyclopentadienyl skeleton, and in the case of having 2 or more ligands, they may be combined with each other through a crosslinking group. Illustrative of the crosslinking groups are alkylene groups having a number of carbon atoms of 1–4, alkylsilanodiyl groups, silanodiyl group, and the like.

As representative ligands other than the ligand having cyclopentadienyl skeleton in the transition metal compound, there are hydrogen atom, hydrocarbon groups (alkyl groups, alkenyl groups, aryl groups, alkylaryl groups, aralkyl groups, polyenyl groups, etc.) having a number of carbon atoms of 1–20, halogens, metaalkyl groups, methaaryl groups, etc.

The cocatalyst makes the aforementioned transition metal compound effective as polymerization catalyst, or equilibrates ionic charge in a catalytically activated state. Illustrative of the cocatalysts are aluminoxanes which are benzene-soluble organic aluminumoxy compounds, benzene-insoluble organic aluminumoxy compounds, boron compounds, lanthanide salts, such as lanthanum oxide, tin oxide, etc. Among them, aluminoxanes are preferable.

The catalyst can be carried by an inorganic or organic carrier, preferably an inorganic or organic porous oxide, such as $SiO_2$, $Al_2O_3$, MgO, $ZrO_3$, $TiO_2$, $B_2O_3$, CaO, ZnO, BaO or $ThO_2$ or a mixture thereof, such as $SiO_2$—$Al_2O_3$, $SiO_2$—$V_2O_3$, $SiO_2$—$TiO_2$, $SiO_2$—MgO, $SiO_2$—$Cr_2O_3$, etc.

The organic aluminum compound is trialkyl aluminum, such as triethyl aluminum or triisopropyl aluminum, dialkyl aluminum halide, alkyl aluminum sesquihalide, alkyl aluminum dihalide, alkyl aluminum hydride, organic aluminum alkoxide, etc.

The ethylene-α-olefin copolymer is produced in the vapor phase process which is carried out substantially in the absence of solvent, the slurry process and the solution process which are carried out in the presence of an inactive hydrocarbon solvent, illustrated by an aliphatic hydrocarbon, such as butane, pentane, hexane or heptane, an aromatic hydrocarbon, such as benzene, toluene or xylene, or an alicyclic compound, such as cyclohexane or methylcyclohexane, in a state of substantially excluding oxygen and water. The polymerization conditions are not especially restricted, but in general, under a polymerization temperature of 15 to 350° C., preferably 20 to 200° C., particularly preferably 50 to 110° C. and a polymerization pressure of ordinary pressure to 70 kg/cm²G, preferably ordinary pressure to 20 kg,/cm²G, for the low, medium pressure process, and preferably 1,500 kg/cm²G or less for the high pressure process. A suitable polymerization time is 3 minutes to 10 hours, preferably 5 minutes to 5 hours, for the low, medium pressure process, and 1 to 30 minutes, preferably 2 to 20 minutes, for the high pressure process. The polymerization may be multistep polymerization consisting of 2 or more steps different in polymerization conditions, such as hydrogen concentration, monomer concentration, polymerization pressure, polymerization temperature and catalyst, as well as single step polymerization.

Other preferable polymerization processes are to dry a resin produced by copolymerizing ethylene and an α-olefin of 3–20 carbon atoms in the presence of various metallocene catalyst, preferably the aforementioned specified metallocene catalyst by streaming air or inactive gas at 30–150° C. at a flow rate of 0.03 to 3 m³/hr per 1 kg ethylene-α-olefin copolymer for 0.5 to 72 hours, and/or to dip the resin in hot water from 30° C. to less than the melting point of the ethylene-α-olefin copolymer with introducing air or inactive gas at a flow rate of 0.001 to 0.5 m³/hr for 0.5 to 30 hours, to make 200 or more the ratio (Q) of the total amount (converted to n-hexane) of the volatile components of 12 carbon atoms or less measured by the head space gas chromatography before drying/that after drying.

A preferable molar ratio of ethylene to α-olefin is that ethylene is 60% or more, more preferably 70% or more, particularly preferably 80% or more. When the ratio of ethylene is less than 60%, polymerization ability is degraded. Moreover, adhesiveness of the produced ethylene-α-olefin copolymer resin is great to degrade film moldability, and blocking between films is liable to occur. However, when the blending amount of L-LDPE resin is 50 parts by weight or less against 100 parts by weight of thermoplastic resin, it is preferable to combine polyolefin-based elastomer having an ethylene content of less than 70 wt. % or low crystallinity ethyelne-α-olefin copolymer resin having a crystallinity of 40% or less measured by the X-ray diffraction method is order to improve the dispersibility of light-shielding material and physical properties.

Representative examples of ethylene-α-olefin copolymer resin particularly preferable for the invention are those in plastomer type having a density of 0.860 to 0.900 g/cm³ and an α-olefin content of 20 to 40 wt. % (ethylene content of 80 to 60 wt. %), very low density type having a density of 0.901 to 0.915 g/cm³ and an α-olefin content of 10 to 20 wt. %, medium, low density type having a density of 0.916 to 0.940 g/cm³ and an α-olefin content of 5 to 10 wt. %, and high density type having a density of 0.941 g/cm³ or more and an α-olefin content of 5 wt. % or less. Resins produced by using either multisite catalyst or single site catalyst are preferable.

By restricting L-LDPE resin to very low density ones having a density of less than 0.915 g/cm², packaging materials for a photographic photosensitive material can be made excellent heat sealing properties, physical strength (especially under a low temperature at 0° C. or lower), Gelbo test strength, long term sealability, flexibility and bag making ability. Besides, very low density L-LDPE resins produced by using metallocene catalyst are particularly preferred because of being excellent in various properties.

A suitable content of very low density L-LDPE (ethylene-α-olefin resin is 5 wt. % or more, preferably 10 wt. % or more, more preferably 20 wt. % or more, further more preferably 30 wt. % or more, the most preferably 35 wt. % or more, in view of the improvement in heat sealing properties, physical strength, moldability, the dispersibility of light-shielding material, and recycling suitability.

The homopolypropylene resin has a density of 0.890 to 0.910 g/cm³ produced by polymerizing propylene at 50 to 80° C. at 5 to 35 kg/cm²G using Ziegler catalyst (titanium-based). In general, it is isotactic resin obtained by polymerizing in the presence of a solvent using an alkyl aluminum/titanium tetrachloride-based Ziegler-Natta catalyst.

The polypropylene-based resin produced by polymerizing using metallocene catalyst which is single site catalyst is particularly preferred because of being excellent in photographic properties, physical properties, and having a small molecular weight distribution and a small impurity content.

As the propylene-α-olefin copolymer resin, there are propylene-ethylene random copolymer resin, propylene-ethylene block copolymer resin, propylene-butene-1 random copolymer resin, propylene-butene-1 block copolymer resin, propylene-ethylene-butene-1 terpolymer, propylene-ethylene-diene terpolymer, propylene-hexene-1 block copolymer, and so on. A preferable α-olefin content is 0.5 to 30 wt. %, more preferably 1 to 20 wt. % in terms of a balance of rigidity, physical strength and production suitability.

The α-olefin of the propylene-α-olefin copolymer resin is similar to the α-olefin of the ethylene-α-olefin copolymer resin as mentioned previously.

Upon producing the polyolefin resin as above, it is preferable to use a polymerization catalyst containing a halogen compound or a metal compound, because of decreasing the amount of polymerization catalyst which influences adversely photographic photosensitive materials greatly. Representative polymerization catalysts containing a halogen compound or a metal compound are the Ziegler catalyst obtained as black precipitates by mixing titanium tetrachloride and triethyl aluminum in anhydrous hexane, the Ziegler-Natta catalyst obtained as black precipitates by mixing titanium trichloride and triethyl aluminum in anhydrous hexane, the stereoregular polymerization catalyst composed of an organic alkyl compound of various metal belonging to I, II or III family and a salt of metal belonging to IV, V, VI or VII family, the Natta catalyst composed of a mixture of a trialkyl aluminum and titanium trichloride. The Phillips catalyst composed of a mixture of $SiO_2$—$Al_2O_3$ and chromium oxide, the catalyst composed of the reaction product of a magnesium compound and a titanium halide and an organic aluminum, and so on. A special example, there is a catalyst composed of a solid catalyst component, which is the reaction product of an oxygen-containing oroanic magnesium compound, an oxygen-containing organic titanium compound and an aluminum halide, and an organic aluminum compound as a co-catalyst.

Illustrative of the organic aluminum compounds are triethyl aluminum, triisobutyl aluminum, tri-n-propyl aluminum, diethyl aluminum monochloride, diethyl aluminum monobromide, etc. Illustrative of the titanium compound are titanium tetrahalides, such as $TiCl_4$, $TiBr_4$, and $TiI_4$, alkoxy titanium trihalides, such as $Ti(OCH_3)Cl_3$ and $Ti(OC_2H_5)Cl_3$, dialkoxy titanium dihalides, such as $Ti(OCH_3)_2$, $Ti(OC_2H_5)_2Cl_2$ and $Ti(OC_2H_5)_2Br_2$, trialkoxy titanium monohalides such as $Ti(OCH_3)_3Cl$, $Ti(OC_2H_5)_3Cl$ and $Ti(OC_2H_5)_3$ Br, and so on. Illustrative of the organic magnesium compounds are ethyl butyl magnesium, diisobutyl magnesium, dihexyl magnesium, ethyl magnesium chloride, $MgF_2$, $MgCl_2$, $MgBr_2$, $MgI_2$, and so on. Illustrative of the vanadium compounds are vanadium tetrachloride, vanadium oxytrichloride, diethoxy vanadate monochloride, diethoxy vanadate dichloride, and so on. Although the halogen compounds and the metal compounds influence adversely photographic properties of silver halide photograhic photsensitive materials, they can be made harmless by blending a fatty acid metal salt and/or zeolite and/or a hydrotalcite compound in an amount of 0.01 to 10 wt. %, preferably 0.05 to 7 wt. %, particularly preferably 0.1 to 5 wt. % as the total amount.

In the case of molding polyolefin resin alone, the polyolefin resin has a molecular weight distribution, which is measured by the gel permeation chromatography (GPC) and represented by Mn/Mw, of 1.1 to 50, preferably 1.3 to 40, more preferably 1.4 to 30 further more preferably 1.5 to 20, the most preferably 1.6 to 10. When the molecular weight distribution is less than 1.1, resin fluidity is degraded to induce molding troubles frequently. When the molecular weight distribution exceeds 50, even using a high molecular weight polyolefin resin having a MFR of 0.5 g/10 minutes or less, film moldability and physical strength are degraded. Besides, in the case of ethylene-based resin, the MFR (ASTM D-1238, condition E, at 190° C., at a piston load of 2.16 kgf) is preferably 0.01 to 70 g/10 minutes, more preferably 0.02 to 50 g/10 minutes, more
preferably 0.02 to 30 g/10 minutes, further more preferably 0.02 to 15 g/10 minutes, the most preferably 0.03 to 10 g/10 minutes. In the range of less than 0.01 g/10 minutes, resin fluidity is degraded to induce melt fracture frequently. In the range of exceeding 70 g/10 minutes, resin fluidity is too great to degrade film moldability, and physical strength is small. Particularly, in the case of high molecular weight resin having a MFR of 0.1 g/10 minutes or less, a preferable molecular weight distribution is 10 to 50, more preferably 15 to 45, further more preferably 20 to 40, the most preferably 25 to 38, in view of the balance between physical strength and resin fluidity and film moldability. In the case of propylene-based resin, a suitable MFR (ASTM D-1238, condition L, at 230° C., at a piston load of 2.16 kgf) of 0.1 to 40 g/10 minutes, preferably 0.2 to 30 g/10 minutes, particularly preferably 0.5 to 10 g/10 minutes.

The most preferable resins as the polyolefin resin are produced by using a single site catalyst, representatives, metallocene catalyst, particularly ethylene-α-olefin copolymer resins, such as L-LDPE resin, as mentioned previously.

Preferable L-LDPE resins produced by polymerizing using single site catalyst are formed of a copolymer resin of ethylene and α-olefin of 3 to 12 carbon atoms having a molecular weight distribution of 1.3 to 10 polymerized using a single site catalyst containing one or more of zirconium-based, titanium-based, hafnium-based or vanadium-based metallocene complex. Thereby, packaging materials for a photographic photosensitive material can be made excellent in physical strength, rare adverse affects on photographic properties of photographic photosensitive materials due to their very small content of residual metal components and residual halogen-based compound components, excellent in heat sealing properties (e.g. heat seal strength, low temperature heat sealability, hot tack properties, sealability with other materials, long period elapsed heat seal strength). Moreover, it can be prevented to generate rusting and corrosion on a film molding machine (extruder, die, etc.)

Representative single site catalyst is metallocene catalyst having uniform active sites composed of a metal compound coordinated with a cyclopentadiene ring (e.g. zirconocene dichloride) and methyl aluminoxane, etc. discovered by German professor Kaminsky, and there are various patents, such as Japanese Patent KOKAI 60-35007, 60-35008, 60-35009, 3-207703, 3-234711, 4-300667, etc.

The ethylene-α-olefin copolymer resins produced by using metallocene catalyst have the following characteristics, compared with conventional ethylene-α-olefin copolymer resins.

① Having 2–3 times the impact strength and the tear strength.
② Excellent transparency and gloss.
③ Excellent antiblocking ability (low molecular weight low density components called sticky components are small).
④ Low melting point, and excellent low temperature heat sealing properties.
⑤ Excellent flexibility.
⑥ Small fuming and odor caused by low molecular weight components upon molding, because of small (narrow) molecular weight distribution.

The polymerization by using metallocene catalyst is disclosed in many patents, such as Japanese Patent KOKAI 58-19309, 60-862, 60-35006, 60-35007, 60-35008, 60-35009, 60-106008, 60-137911, 61-31404, 61-108610, 61-221207, 61-264010, 61-296008, 63-61010, 63-152608, 63-178108, 63-222177, 63-222178, 63-222179, 63-264606, 63-28070, 64-6003, 64-45406, 64-74202, 1-12407, 1-95110, 1-101315, 1-129003, 1-207248, 1-210404, 1-251405, 1-259004, 1-275609, 1-301704, 1-319489, 2-22307, 2-41303, 2-173110, 2-302410, 3-56508, 3-62806, 3-66710, 3-70708, 3-70709, 3-70710, 3-74412, 3-207703, 3-234711, 4-8704, 4-11604, 4-25514, 4-213305, 4-300887, 5-310829, 5-320242, 6-228222, 9-40793, Japanese Patent KOHYO 63-501369, U.S. Pat. No. 4,522,982, U.S. Pat. No. 4,530,914, etc.

Among the ethylene-α-olefin copolymer resins produced by polymerizing using metallocene catalyst, preferable resins contain only a small amount of catalyst residues which adversely effect photographic properties, and are produced 10,000 g or more per 1 g solid catalyst component(s) of the metallocene catalyst selected from at least one of zirconium based, hafnium based titanium based and vanadium based catalysts. A particularly preferable resin is produced by using the metallocene catalyst composed of zirconocene dichloride and methyl aluminoxane. A preferable residual halogen components content of the resin, which adversely affects photographic properties, is 400 ppm or less, particularly preferably 150 ppm or less. In order to make the halogen components content 400 ppm or less, it is preferable to extract catalyst residues by using a catalyst deactivator, and to provide a vent on a pelletizer or a film molding machine which decreases residual halogen compound components to improve rust prevention of the screw and die of an extruder and photographic properties.

The most preferable polymerization method is of using a metallocene catalyst and polymerizing at 40 to 100° C. at 5 to 50 kg/cm² by the vapor phase process to produce ethylene-α-olefin copolymer resin.

The halogen compound components, which adversely affect photographic properties and generate rust troubles on an extruder or a die, include halogenated titanium compounds, halogenated silicon compounds, halogenated vanadium compounds, halogenated aluminum compounds and halogenated boron compounds, and illustrative of the halogen compounds are silicon tetrachloride, aluminum trichloride, aluminum tribromide, titanium trichloride, boron trichloride, titanium tetrabromide, etc.

The single site catalyst, such as metallocene catalyst, contains halogen compound components as mentioned previously, and they are converted to halogen gas which exhibits various adverse affect. Accordingly, it is preferable to blend a halogen gas scavenger described below in the inner conductive thermoplastic resin layer.

Preferable compounds as the halogen gas scavenger are sulfide compounds, nitrite, semicarbazides, sulfites, hydroquinones, ethylene diamine, acetone semicarbazone, p-hydroxyphenylglycine, and the like. Particularly preferable compounds are represented by the following formula.

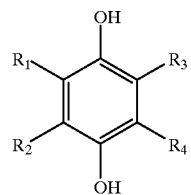

In the formula, $R_1$, $R_2$, $R_3$ and $R_4$ represents hydrogen atom or a group capable of introducing into benzene nucleus In the above general formula, preferable substituents are halogen atoms (e.g. fluorine, chlorine, bromine), alkyl groups (e.g. methyl, ethyl, n-propyl, t-butyl, n-amyl, i-amyl, n-octyl, n-dodecyl, n-octadecyl, 1 to 32 carbon atoms are preferred), alkenyl groups, aryl groups, acyl groups, cycloalkyl groups, alkoxyl groups, aryloxy groups, alkylthio groups, arylthio groups, alkylacylamino groups, arylacylamino groups, alkylcarbamoyl groups, arylcarbamoyl groups, alkylcarbonamide groups, arylcarbonamide groups, alkylsulfonamide groups, arylsulfonamide groups, alkylsulformoyl groups, arylsulfamoyl groups, alkylsulfonyl groups, arylsulfonyl groups, alkyloxycarbonyl groups, aryloxycarbonyl groups, alkylacyloxy groups, arylacyloxy groups, and the like. The above groups may be further substituted by a substituent as above.

Preferable polymerization process using metallocene catalyst is the vapor phase process because of less residues affecting adversely photographic properties. The liquid phase process, such as the suspension polymerization and the solution polymerization, is also preferable in terms of easy polymerization.

A suitable molecular weight distribution (weight average molecular weight/number average molecular weight) is 5 or less, preferably 4 or less, more preferably 1.1 to 3, the most preferably 1.3 to 2.7 measured by the GPC method, in view of the prevention of blocking, the improvement in physical strength and the like.

As the ethylene-α-olefin copolymer resin, ethylene-α-olefin random copolymer resin is preferable. Concerning the composition of the ethylene-α-olefim copolymer resin, the α-olefin component content is 1 to 99 mol. %, preferably 1 to 95 mol. %, more preferably 1 to 90 mol. %, further more preferably 2 to 80 mol. %, the most preferably 2 to 50 mol. %, and the ethylene component content is 5 to 99 mol. %, more preferably 10 to 99 mol. %, further more preferably 20 to 98 mol. %, the most preferably 50 to 98 mol. %. A suitable α-olefin has a number of carbon atoms of 3 to 20, preferably 4 to 15, more preferably 4 to 12, the most prefrably 4 to 10, and illustrative of α-olefins are propylene, butene-1, hexene-1, 4-methylpentene-1, octene-1, decene-1, dodecene-1, tetracene-1, hexadecene-1, octadecene-1, heptene-1, eicosene-1, 4-methylhexene-1, 4,4-dimethylpentene-1, and the like. Two or more α-olefins may be combined.

The acid-modified polyolefin resin is a modified resin of polyolefin resin graft-modified with unsaturated carboxylic acid compound, and includes graft-modified polyethylene resin, graft-modified polypropylene resin, and graft-modified ethylene copolymer resins, such as graft-modified ethylene-ethyl acrylate copolymer resin, graft-modified ethylene-vinyl acetate copolymer resin, graft-modified L-LDPE resin and graft-modified ethylene-methyl acrylate copolymer resin, and the like.

The unsaturated carboxylic acid compound usable as the modifier of the polyolefin resin is acrylic acid, methacrylic acid, crotonic acid, isocrotonic acid, fumaric acid, maleic acid, itaconic acid, citraconic acid, angelic acid, tetrahydrophthalic acid, sorbic acid, mesaconic acid, nudic acid (endcis-bicyclo[2,2,1]-hepto-5-en-2,3-dicarboxylic acid), maleic anhydride, itaconic anhydride, citraconic anhydride, methyl acrylate, methyl methacrylate, ethyl methacrylate, ethyl acrylate, n-butyl acrylate, glycidyl acrylate, glycidyl methacrylate, glycidyl maleate n-butyl methacrylate, maleic acid monoethyl ester, maleic acid diethyl ester, fumaric acid monoethyl ester, fumaric acid dimethyl ester, itaconic acid diethyl ester, acrylamide, methacrylamide, maleic acid monoamide, maleic acid diamide, maleic acid-N-monoethylamide, maleic acid-N,N-diethylamide , maleic acid-N-monobutylamide, maleic acid-N,N-dibutylamide, fumaric acid monoamide, fmaric acid diamide, fumaric acid-N-monoethylamide, fumaric acid-N,N-diethylamide, fumaric acid-N-monobutylamide, fumaric acid-N,N-dibutylamide maleimide, N-butylmaleimide, N-phenylmaleimide, malonyl chloride, monomethylmaleate, dimethylmaleate, dipropylmaleate, potassium acrylate, sodium acrylate, zinc acrylate, magnesium acrylate, calcium acrylate, sodium methacrylate, potassium methacrylate, or the like. Two or more unsaturated carboxylic acid compounds may be combined. Preferable unsaturated carboxylic acid compounds are acrylic acid, maleic acid, maleic anhydride and nudic acid, and maleic anhydride is particularly preferred. A suitable amount of the unsaturated carboxylic acid compounds is 0.01 to 20 parts by weight, preferably 0.2 to 5 parts by weight, per 100 parts by weight of the polyolefin base resin in view of securing adhesive strength.

The grafting modification method may be any known method, such as the method of reacting in a melted state disclosed in Japanese Patent KOKOKU No. 43-27421, the method of reacting in a solution state disclosed in Japanese Patent KOKOKU No. 44-15422, the method of reacting in a slurry state disclosed in Japanese Patent KOKOKU No. 43-18144 and the method of reacting in a vapor state disclosed in Japanese Patent KOKOKU No. 50-77493. Among them, the melting method using an extruder is preferred because of simple operation and inexpensiveness.

A peroxide is added in order to accelerate the reaction between the polyolefin base resin and the unsaturated carboyxlic acid. Suitable peroxides are organic peroxides such as benzoyl peroxide, lauroyl peroxide, dicumyl peroxide, α,α'-bis(t-butylperoxydiisopropyl)benzene, 2,5-dimethyl-2,5-di(t-butylperoxy)hexane, 2,5-dimaethyl-2,5-di(t-butylperoxy)hexyne, di-t-butyl peroxide, cumene hydroperoxide, t-butyl-hydroperoxide, t-butylperoxylaurate, t-butylperoxybenzoate, 1,3-bis(t-butylperoxyisopropyl) benzene, di-t-butyl-diperoxyphthalate, t-butylperoxymaleic acid and isopropyl percarbonate, azo compounds such as azobisisobutyronitrile, and inorganic peroxides such as ammonium persulfate. Two or more peroxides may be combined. Particularly preferred peroxides are di-t-butylperoxide, dicumylperoxide, 2,5-dimethyl-2,5-di(t-butylperoxy)hexane, 2,5-dimethyl-2,5-di(t-butylperoxy) hexyne, 1,3-bis(t-butylperoxyisopropyl)benzene and the like, which have a decomposition temperature between 170° C. and 200° C. A suitable amount of the peroxide is 0.005 to 5 parts by weight, preferably 0.01 to 1 part by weight per 100 parts by weight of the polyolefin base resin.

The acid-modified polyolefin resin wraps the surface of light-shielding material, such as carbon black or aluminum powder, fibrous filler and the like to disperse them uniformly, decreases the generation of microgrits, and improves physical strength of film In an aspect of the invention, the conductive light-shielding thermoplastic resin film layer is an inflation film molded by using a ring die having a lip clearance of 0.5 to 3.0 mm, preferably 0.6 to 2.8 mm, more preferably 0.7 to 2.6 mm, particularly preferably 0.8 to 2.5 mm, at a draw ratio of 3 to 100, preferably 5 to 80, more preferably 7 to 60, particularly preferably 10 to 50. A suitable film thickness is 10 to 250 μm, preferably 15 to 220 μm, more preferably 20 to 200 μm, particularly preferably 25 to 150 μm. The lip clearance of less than 0.5 mm is unfavorable because of great discharge pressure and the occurrence of melt fracture to degrade productivity. The lip clearance of more than 3.0 mm is also unfavorable because of great dispersion of film thickness, too great molecular orientation in the longitudinal direction due to a great draw ratio resulting in easy tearability in the longitudinal direction. The draw ratio of less than 3 is unfavorable because of great discharge pressure and the occurrence of melt fracture to degrade productivity. The draw ratio of more than 100 is also unfavorable because of great dispersion of film thickness, too great molecular orientation in the longitudinal direction due to a great draw ratio resulting in easy tearability in the longitudinal direction. The film thickness of less than 10 μm cannot ensure necessary properties as well as productivity. The film thickness of more than 250 μm brings excess properties and moreover expensiveness.

In a further aspect, the packaging material of the invention comprises the conductive light-shielding thermoplastic resin film layer and a deposited thermoplastic resin film layer composed of a Young's modulus thermoplastic resin film layer having a Young's modulus in the longitudinal direction of 60 kg/mm$^2$ or more provided with a moistureproof oxygen barrier deposit membrane.

As the thermoplastic resin usable for the Young's modulus thermoplastic resin film layer, there are the various polyolefin-based resins mentioned previously, aromatic vinyl-based resins, polystyrene-based resins, polyphenylene ether-based resins, polyphenylene sulfide-based resins, polyacrylate-based resins, copolymer resins of styrene and synthetic rubber, blend resins of polystyrene resin and synthetic rubber (including thermoplastic elastomer), acrylonitrile-butadiene-styrene ternary copolymer resins, polyamide resins, polyester resins, polyester-based liquid crystal resins, polyacetal resins, polycarbonate resins, polyvinyl alcohol resins, partially saponified polyvinyl acetate resins, polyethylene naphthalate resins, polyethylene terephthalate resins, polybutene terephthalate resins, modified polyphenylene oxide resins, polyacrylonitrile resins, methylpentene-based resins, and the like.

The Young's modulus thermoplastic resin film layer is preferably formed of at least one of the above polyolefin-based resin, polyamide-based resin, polyester-based resin, methylpentene-based resin, saponified ethylene-vinyl acetate copolymer resin, or polyvinyl alcohol resin as the principal compnent, and particularly preferably uniaxially or biaxially stretched. The Young's modulus thermoplastic resin film layer may be single layer or a multilayer structure of two or more layers. In the case of two or more layers, each layer may have a different resin composition.

A suitable thickness of the Young's modulus thermoplastic resin film layer is 5 to 150 μm, preferably 6 to 130 μm, more preferably 7 to 120 μm, the most preferably 8 to 100 μm. The thermoplastic resin film layer of less than 5 μm cannot have a sufficient physical strength to generate pinholes, etc. The thermoplastic resin film layer of more than 150 μm has a problem in flexibility. The thermoplastic resin film layer has a Young's modulus in the longitudinal direction of 60 kg/mm or more, preferably 70 kg/mm or more, more preferably 80 kg/mm or more, the most preferably 90 kg/mm or more. The thermoplastic resin film layer having a Young's modulus in the longitudinal direction of less than 60 kg/mm cannot maintain a sufficient strength, and it is possible to generate pinholes, etc.

A particularly preferable representative Young's modulus thermoplastic resin film layer is formed of at least one of HDPE resin, polypropylene-based resin, polyamide-based resin, polyester-based resin, EVOH-based resin or acrylonitrile-based resin as the principal component, and has a rupture strength (JIS K 6782) of 5 kg/mm$^2$ or more, preferably 7 kg/mm$^2$ or more, a sum of the Young's moduli in the longitudinal direction and in the lateral direction (ASTM D 882-75D) of 100 kg/mm$^2$ or more, preferably 150 kg/mm$^2$ or more, and a planar draw ratio (longitudinal draw ratio×lateral draw ratio) of 4 to 80 times preferably 8 to 70 times, stretched 1.5 to 9 times, preferably 2 to 7 times in the longitudinal direction and 1.5 to 9 times, preferably 2 to 7 times in the lateral direction. A particularly preferable one is synthetic paper containing filler and having pores or a porous layer which is improved in printing suitability and writing ability.

The moistureproof oxygen barrier deposit membrane provided with the Young's modulus thermoplastic resin film layer is formed of at least one, preferably two or more of silicon oxide, aluminum oxide, titanium oxide, tin oxide, zinc oxide, iridium oxide and magnesium oxide. A preferable thickness of the deposit membrane is 5 to 300 nm, more preferably 10 to 250 nm, particularly preferably 20 to 200 nm. The deposit membrane having thickness of less than 5 nm has a possibility of not ensuring moisture proofness and oxygen barrier sufficiently. The deposit membrane having thickness of more than 300 nm is degraded in physical strength and appearance caused by thermal degradation or thermal deformation, and moreover, productivity is also degraded.

The deposited themoplastic resin film layer preferably has a moisture permeability (JIS Z 0208, condition 8, at 40±0.5° C., at 90±2% RH) of 10 g/m$^2$·24 hours·1 atm or less, preferably 7 g/m$^2$·24 hours·1 atm or less, more preferably 5 g/m$^2$·24 hours·1 atm or less, the most preferably 3 g/m$^2$·24 hours·1 atm or less. The deposited thermoplastic resin film layer preferably has an oxygen permeability (JIS K 7126, at 20° C., at 0% RH) of 60 cm$^3$/m$^3$·24 hours·1 atm or less, more preferably 50 cm$^3$/m$^2$·24 hours·1 atm or less, the most preferably 40 cm$^3$/m$^2$·24 hours·1 atm or less.

In a further aspect, the packaging material of the invention comprises an intermediate thermoplastic resin layer and two conductive light-shielding thermoplastic resin film layers located on both sides thereof.

The intermediate thermoplastic resin layer is preferably formed of a polyolefin resin as the principal component in view of good photographic properties, good disposability, easy availability and various other excellent properties necessary as the packaging materials for a photographic photosensitive material.

The polyolefin resin is homopolyethylene resin, very high molecular weight polyethylene resin, cyclic polyethylene resin, homopolybutene-1 resin, homopoly 4-methylpentene-1 resin, ethylene-α-olefin random or block copolymer resin, hompolypropylene resin, propylene-α-olefin random or block copolymer resin, acid-modified polyolefin resin, ethylene-acrylic acid copolymer resin, ethylene-methacrylic acid copolymer resin, ethylene-propylene-butene-1 copolymer resin, ethylene-acrylate ester copolymer resin such as ethylene-ethyl acrylate ester copolymer resin, ethylene-vinyl acetate copolymer resin or the like, and details are as mentioned previously.

The intermediate thermoplastic resin layer is preferably formed of oxygen barrier thermoplastic resin. The intermediate thermoplastic resin layer formed of oxygen barrier thermoplastic resin has oxygen impermeability, improves physical strength, prevents the degradation of photographic properties which are the most important quality of the packaged photographic photosensitive materials, and as a result, high speed photosensitive material having a ISO photographic speed of 400 or more can be kept in good quality conditions for a long period of two years or more. Illustrative of the oxygen barrier thermoplastic resins are ethylene-vinyl alcohol copolymer resin, high density polyethylene resin, polypropylene resin, polyvinylidene chloride copolymer resin, polyethylene terephthalate resin, non-crystalline polyethylene terephthalate resin, polyethylene naphthalate resin, polybutylene terephthalate resin, polyamide resin, polyacrylonitrile resin, etc.

The oxygen permeability (measured according to JIS K-7126, at 20° C., 0% RH) of the intermediate thermoplastic resin layer formed of the oxygen barrier thermoplastic resin is 2,000 cm$^3$/m$^2$·24 hours·atm or less, preferably 1,500

$cm^3/m^2 \cdot 24$ hours·atm or less, more preferably 1,000 $cm^3/m^2 \cdot 24$ hours·atm or less, further more preferably 500 $cm^3/m^{2 \cdot 24}$ hours·atm or less, the most preferably 250 $cm^3/m^2 \cdot 24$ hours·atm or less.

It is preferable that the intermediate thermoplastic resin layer has a Young's modulus greater than the inner conductive light-shielding thermoplastic resin film layer and the outer conductive light-shielding thermoplastic resin film layer. By making the Young's modulus of the intermediate thermoplastic resin layer greater than the inner conductive light-shielding thermoplastic resin film layer and the outer conductive light-shielding thermoplastic resin film layer, film moldability is improved, and curling can be prevented. Moreover, impact puncture strength, bag rupture strength and resistance to pinholes are also improved. The Young's modulus (JIS K 7127) in the longitudinal direction of the intermediate thermoplastic resin layer is 30 $kgf/mm^2$ or more, preferably 50 $kgf/mm^2$ or more, more preferably 100 $kgf/mm^2$ or more, further more preferably 150 $kgf/mm^2$ or more, the most preferably 200 $kgf/mm^2$ or more. In addition, The Young's modulus in the longitudinal direction of the intermediate thermoplastic resin layer is preferably greater than the young's modulus in the longitudinal direction of the inner conductive light-shielding thermoplastic resin film layer and the outer conductive light-shielding thermoplastic resin film layer by 10 $kgf/mm^2$ or more, more preferably by 20 $kgf/mm^2$ or more, further more preferably by 40 $kgf/mm^2$ or more, the most preferably by 80 $kgf/mm^2$ or more.

The intermediate thermoplastic resin layer preferably contains a recycle resin produced from the aforementioned simultaneously coextruded multilayer film in an amount of 5 to 100 wt. %, preferably 10–100 wt. %, more preferably 20–100 wt. %, further more preferably 40–100 wt. %, because of passing the container packaging recycling law without degrading photographic properties. Furthermore, by using the recycle resin, carbon black dispersibility, film moldability, antistatic properties, light-shielding ability and photographic properties are improved, and thereby, the thickness can be thinned by 10% or more. It is considered that the improvement in photographic properties is caused by the sharp decrease of volatile components adversely affecting photographic properties due to the recycle resin experiencing heat history three times or more.

A preferable intermediate thermoplastic resin layer is the deposited thermoplastic resin film layer.

To the conductive light-shielding thermoplastic resin film layer, the Young's modulus thermoplastic resin film layer, the intermediate thermoplastic resin film layer or any other layer a light-shielding material may be added.

Representative examples of the light-shielding material are shown below.

Inorganic Compounds:

Oxides . . . silica, diatomaceous earth, alumina, titanium oxide, iron oxide (iron black), zinc oxide, magnesium oxide, antimony oxide, barium ferrite, strontium ferrite, berylium oxide, pumiice, pumice balloon, alumina fiber, etc.

Hydroxides . . . aluminum hydroxides, magnesium hydroxides, basic magnesium carbonate, etc.

Carbonates . . . calcium carbonate, magnesium carbonate, dolomite, dawsonite, etc.

Sulfates, sulfites . . . calcium sulfate, barium sulfate, ammonium sulfate, calcium sulfite, etc.

Silicates . . . talc, clay, mica, asbestos, glass fiber, glass baloon, glass bead, calcium silicate, montmorillonite, bentonite, zeolite, etc.

Carbons . . . carbon black, graphite, carbon fiber, carbon hollow bead, etc.

Others . . . lead powder, aluminum powder, boron fiber, silicon carbide fiber, potassium titanate, lead titanate zirconate, zinc borate, barium metaborate, calcium borate, sodium borate, aluminum paste, etc.

Organic Compounds:

wood flour such as pine, oak and sawdust, hsk fiber such as almond, peanut and chaff, various fibers such as cotton, jute, paper piece, non wood fibers (straw, kenaf, bamboo, esparto, bagasse, etc.), cellophane piece, nylon fiber, polypropyelen fiber, various starch (containing modified starch, surface-treated starch, etc.), aromatic polyamide fiber.

Preferable light-shielding materials are inorganic materials capable of opacifying even at a temperature of 150° C. or more due to its heat stability and rarely affecting photographic properties adversely. Particularly, carbon black, titanium nitride, graphite and iron black, which are light-absorptive, are preferable, because they are excellent in heat resistance and light-resistance and are relatively inactive materials. Suitable carbon blacks are as explained previously.

The light-shielding materials exhibiting antistatic ability are various carbon blacks having an average particle diameter of 12 to 50 m$\mu$, a DBP oil absorption value of 100 ml/100 g or more, including various conductive carbon blacks, acetylene carbon black and Ketjen carbon black, carbon fiber, metal fiber, Al dope, $TiO_2$, $SnO_2$, metallized fiber, conductive material-containing fiber, metal powder, graphite, various metal salts, metal-adsorbed fiber, polyaniline, polypyrrole, polyacetylene, polydiacetylene, polypara-phenylene, etc.

For high speed photographic photosensitive materials (ISO photographic speed of 400 or more), acetylene black having a sulfur content of 0.1% or less is preferable, because of its good dispersibility and great antistatic ability. It is also preferable to mix acetylene black and furnace carbon black so as to meet the required properties.

The form of blending light-shielding material is roughly divided as follows:

(1) Uniformly colored pellets Most common form called color compound.

(2) Dispersible powder Also called dry color, treated with various surface treating agents, dispersing assistant is added, and then, pulverized into fine particles.

(3) Paste Dispersed in plasticizer, etc.

(4) Liquid Also called liquid color, dispersed in surfactant, etc.

(5) Masterbatch pellets Light-shielding material is dispersed in a plastic to be colored in a high concentration.

(6) Wettable granule Light-shielding material is dispersed in a plastic in a high concentration, and then, processed in a form of granule.

(7) Dry powder Usual dry powder without treating.

Although, there are various blending method as above, the masterbatch method is preferred in view of cost and less contamination of the working place. The inventor also disclosed a resin composition for colored masterbatch wherein a light-shielding material is dispersed in a particular ethylene-ethylacrylate copolymer resin in Japanese Patent KOKAI 63-186740.

As the preferable light-shielding materials, inorganic pigments having a refractive index measured by the Larsen oil immersion method of not less than 1.50, various metal powders, metal flakes, metal pastes, metal fibers, and carbon fiber are next to carbon black.

Representative examples are titanium oxide of the rutile type (2.75), titanium oxide of the anatase type (2.52), silicon carbide (2.67), zinc oxide (2.37), antimony oxide (2.35), lead white (2.09), zinc white (2.02), lithopone (1.84), zircon (1.80), corundum (1.77), spinel (1.73), apatite (1.64), baryta powder (1.64), calcium carbonate (1.58), talc (1.58), calcium sulfate (1.56), silicic anhydride (1.55), silica powder (1.54), magnesium hydroxide (1.54), basic magnesium carbonate (1.52), magnesite (1.62), dolomite (1.59), alumina (1.50), and the like. The number in parenthesis indicates refractive index. Particularly preferable light-shielding materials have a refractive index of not less than 1.56, more preferably not less than 1.60.

On the other hand, since calcium silicate (1.46), diatomaceous earth (1.45), hydrous silicate (1.44) and the like have a refractive index of less than 1.50, they are unsuitable, because of a small light-shielding ability. As a result it is necessary to blend in quantity, and thereby, lump generation increases.

Recently, X-ray checking apparatus is used for baggage inspection at air port. When a high sensitivity photographic film having a sensitivity of ISO photographic speed 400 or more is passed through the X-ray checking appartus, fogging is liable to occur on the photographic film by X-ray. To blend a light-shielding material having a specific gravity of not less than 3.1, preferably not less than 3.4 particularly preferably not less then 4.0, is preferable for preventing the occurrence of fogging by the X-ray. The light-shielding material having X-ray-shielding ability as well as light-shielding ability has a specific gravity of not less than 3.1, preferably not less than 3.4, particularly preferably not less than 4.0, and the form may be any form, such as pigment, powder, flake, whisker or fiber. Examples of the light-shielding material having X-ray-shielding ability are silicon carbide, barium sulfate, molybdenum disulfide, lead oxide (lead white), iron oxide, titanium oxide, magnesium oxide, barium titanate, copper powder, iron powder, brass powder, nickel powder, silver powder, lead powder, steel powder, zinc powder, tungsten whisker, silicon nitride whisker, copper whisker, iron whisker, nickel whisker, chrominum whisker, stainless steel powder and whisker, magnesite, aptite, spinel, corundum, zircon, antimony trioxide, barium carbonate, zinc white, chromium oxide, tin powder, their mixtures, etc.

Particularly preferable ones are zircon, corundum, barium sulfate, barium chloride, barium titanate, lead powder, lead oxide, zinc powder, zinc white, tin powder, stainless steel powder, stainless steel whisker, iron black, tungsten whisker, nickel whisker, etc. Preferable light-shielding materials have a refractive index of not less than 1.50 and a specific gravity of not less than 3.1, more preferably a refractive index of not less than 1.56 and a specific gravity of not less than 3.4.

A suitable content of the X-ray-shielding light-shielding material is 0.1 to 80 wt. %, preferably 0.3 to 60 wt. %, particularly preferably 0.5 to 40 wt. %, the most preferably 1.0 to 20 wt. %, although the suitable content varies according to layer thickness, type of resin, etc.

It is preferable to coat the surface of a light-shielding material (carbon black, aluminum powder, inorganic pigment having a refractive index of not less than 1.50, inorganic pigment having a specific gravity of not less than 3.4 or inorganic pigment having an oil absorption value of not less than 50 ml/100 g are preferred.) by surface-coating material, in order to improve the dispersibility into resin and the resin fluidity to prevent the generation of lumps (agglomerates of foreign material) or microgrits which induce abrasion marks, pressure marks or abrasion on photographic photosensitive materials, to prevent the generation of volatile substances harmful to photographic properties, to decrease hygroscopicity, to prevent fouling of die lip, and the like. The surface-coating material can be selected those for the hydrotalcite compound described later, and a suitable coating amount is 0.05 to 100 parts by weight, preferably 0.1 to 90 parts by weight, more preferably 0.5 to 80 parts by weight, further more preferably 1 to 70 parts by weight, the most preferably 2 to 60 parts by weight, per 100 parts by weight of the light-shielding material. In addition, various titanate coupling agent, zircoaluminate coupling agent, silane coupling agent and polydimethylsiloxanes and modified polydimethylsiloxanes having a viscosity at 23° C. of 1,000 to 50,000 centistokes are preferable. In this case, it is preferable to coat the light-shielding material with the same amount as the coating amount of the fatty acid metal salt or the like.

One or more of hydrotalcite compounds and/or zeolite can be incorporated into the inner conductive light-shielding thermoplastic resin film layer, the outer conductive light-shielding thermoplastic resin film layer and/or the intermediate thermoplastic resin layer. By incorporating hydrotalcite compound and/or zeolite, they neutralize catalyst residues and absorb halogen compounds, such as hydrochloric acid, to render the materials adversely affecting photographic properties harmless and to prevent resin yellowing troubles, etc.

The content of the hydrotalcite compound and/or zeolite is preferably 0.1 to 30 wt. %, more preferably 0.2 to 20 wt. %, further more preferably 0.3 to 10 wt. %, the most preferably 0.4 to 5 wt. %. The content of less than 0.1 wt. % results in insufficient blending effects. On the other hand, when the content exceeds 30 wt. %, blending effects by the excess amount is small, and nevertheless lumps tends to generate.

Hydrotalite compound has a general formula of

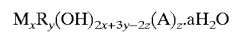
$$M_xR_y(OH)_{2x+3y-2z}(A)_z \cdot aH_2O$$

In the formula, M represents Mg, Ca or Zn, R represents Al, Cr or Fe, A represents $CO_3$, or $HPO_4$, and x, y, z and a are positive numbers, respectively.

, and examples are $Mg_6Al_2(OH)_{16}CO_3 \cdot 4H_2O$, $Mg_8Al_2(OH)_{20} CO_3 \cdot 5H_2O$, $Mg_5Al_2(OH)_{14}CO_3 \cdot Mg_{10}Al_2(OH)_{22}(CO_3)_2 \cdot 4H_2 O$, $Mg_6Al_2(OH)_{16}HPO_4 \cdot 4H_2O$, $Ca_6Al_2(OH)_{16}CO_3 \cdot 4H_2O$, $Zn_6Al_2(OH)_{16}CO_3 \cdot 4H_2O$, $Mg_{4.5}Al_2(OH)_{13}CO_3 \cdot 3.5H_2O$, etc.

Other preferable hydrous double sat compounds include hydrotalcite compounds having, a refractive index (Larsen Oil Immersion method) of 1.40 to 1.60, preferably 1.45 to 1.55, and having, a general formula of

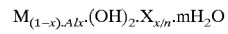
$$M_{(1-x)}Al_x(OH)_2 \cdot X_{x/n} \cdot mH_2O$$

In the formula, M represents an alkaline earth metal or Zn, X represents n valent anion, and x and m satisfy $0 < x < 0.5$ and $0 \leq m \leq z$ and n=1-4 (integral number)

, wherein examples of the n valent anion are $Cl^-$, $Br^-$, $I^-$, $NO_3^-$, $ClO_4^-$, $SO_4^{2-}$, $CO_3^{2-}$, $SiO_3^{2-}$, $HPO_4^{2-}$, $HBO_3^{2-}$, $PO_4^{3-}$, $Fe(CN)_6^{3-}$, $Fe(CN)_4^{4-}$, $CH_3COC^-$, $C_6H_4(OH)COO^-$, , and examples are

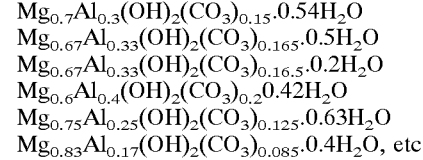

$Mg_{0.7}Al_{0.3}(OH)_2(CO_3)_{0.15} \cdot 0.54H_2O$
$Mg_{0.67}Al_{0.33}(OH)_2(CO_3)_{0.165} \cdot 0.5H_2O$
$Mg_{0.67}Al_{0.33}(OH)_2(CO_3)_{0.165} \cdot 0.2H_2O$
$Mg_{0.6}Al_{0.4}(OH)_2(CO_3)_{0.2} \cdot 0.42H_2O$
$Mg_{0.75}Al_{0.25}(OH)_2(CO_3)_{0.125} \cdot 0.63H_2O$
$Mg_{0.83}Al_{0.17}(OH)_2(CO_3)_{0.085} \cdot 0.4H_2O$, etc.

The hydrotalcite compound may be natural or synthetic. The main components of the hydrotalcite compounds are magnesium, aluminum, etc., and are excellent in the ability of adsorbing to render harmless halogen ions such as chloride ion which are causative agent of adverse effects on photographic photosensitive materials or of rust generation of metal used in a molding machine. Moreover, it is presumed to adsorb various materials which adversely affect photographic properties, such as monomers and volatile components of various additives in the resin composition. The hydrotalcite compound exhibits unexpectedly to neutralize phosphorous acid, which adversely affects photographic properties, generated upon thermal decomposition of phosphorous-containing antioxidant added for preventing thermal degradation or thermal decomposition of thermoplastic resin and additives, to improve photographic properties (decrease of fog). The synthetic methods disclosed in Japanese Patent KOKOKU 46-2280 and 50-30039 can be used therefor.

As natural hydrotalcite compounds, there are hydrotalcite, stichtite, pyroaurite, etc. The hydrotalcite compound may be use as a single material or combined two or more. Particularly, it is preferable to use together with the antioxidant or the fatty acid metal salt. The particle size of the hydrotalcite compound is not limited, but in view of processibility, dispersibility, properties, etc., a suitable mean secondary particle size is 20 $\mu$m or less, preferably 10 $\mu$m or less, particularly preferably 5 $\mu$m or less, and as to BET specific surface area, suitably 50 $m^2/g$ or less, preferably 40 $m^2/g$ or less, particularly preferably 30 $m^2/g$ or less.

It is preferable to treat the hydrotalcite compound by a surface coating material. By coating with the surface, dispersibility and miscibility against resin are further improved, injection moldability film processibility physical strength, and the like are also improved.

Particularly preferable surface-coating materials are higher fatty acid metal salts, such as sodium laurate, potassium laurate, sodium oleate, potassium oleate, calcium oleate, magnesium stearate, sodium stearate, potassium stearate, sodium palmitate, potassium palmitate, sodium caprate, potassium caprate, sodium myristate, potassium myristate, sodium linolate and potassium linolate, higher fatty acids, such as lauric acid, palmitic acid, oleic acid, stearic acid, capric acid, myristic acid and linolic acid, organic sulfonic acid metal salts, such as calcium dodecylbenzene sulfonate and sodium dodecylbenzene sulfonate, coupling agents, such as isopropyltriisostearoyl titanate, Isopropyltris (dioctylpyrophosphate) titanate, tetraisopropylbis (dioctylphosphite) titanate, vinyltriethoxysilane, gamma-methacryloxypropyltrimethoxysilane and gamma-glycidoxypropyltrimethoxysilane, and various lubricants, such as higher fatty acid amides, higher fatty acid esters, silicones and waxes.

The surface-coating using the surface-coating material can be conducted, for example, by adding an aqueous solution of a higher fatty acid alkali metal salt to the hydrotalcite compound suspended in hot water with stirring, or by adding a melted higher acid or a coupling agent solution dropwise to a hydrotalcite compound stirred by a Henschel mixer. A suitable amount of the surface-coating material is, in general, 0.01 to 50 parts by weight, preferably 0.05 to 35 parts by weight, more preferably 0.1 to 20 parts by weight, the most preferably 0.5 to 10 parts by weight, per 100 parts by weight of hydrotalcite compound. Moreover, a small amount of impurities, such as other metal oxides, may contain so far as not degrading the effects of the invention.

Moreover, in order to improve dispersibility of the hydrotalcite compound, one or more of a higher fatty acid, a fatty acid amide lubricant, a silicone oil, a sorbitan fatty acid ester, such as sorbitan monostearate, and a glycerine fatty acid ester, such as glycerine monostearate may be added to the resin composition (e.g. the inner conductive themoplastic resin layer, the outer conductive thermoplastic resin layer, the intermediate thermoplastic resin layer) as dispersing agent in an amount as the total of 0.01 to 10 wt. %, preferably 0.05 to 8 wt. %, more preferably 0.08 to 5 wt. %, the most preferably 0.1 to 3 wt. %. By combining with the hydrotalcite compound, synergistic effects are exhibited, such as prevention against degradation of photographic properties, processing stability, rust prevention of a molding machine, and anticorrosion are improved. Moreover, resin degradation, decrease of physical strength is prevented, and lump generation and coloring troubles caused by resin yellowing is prevented. It is particularly preferable to combine one or more stabilizers selected from the group consisting of phenolic antioxidants, phosphorus-containing (phosphite) antioxidants and fatty acid metal salts, because of rare degradation of photographic properties of photographic photosensitive materials and increase of antioxidation effect.

In this case, in order not to affect adversely photographic performance of photographic photosensitive materials, ① to blend 0.001 to 1.5 wt. %, preferably 0.005 to 0.7 wt. %, particularly preferably 0.01 to 0.45 wt. %, of a phenolic antioxidant, ② to blend 0.001 to 1.5 wt. %, preferably 0.005 to 0.7 wt. %, particularly preferably 0.01 to 0.45 wt. %, of a phosphorus-containing antioxidant, ③ to blend 0.01 to 5 wt. %, preferably 0.03 to 4 wt. %, more preferably 0.05 to 3 wt. %, particularly preferably 0.06 to 2 wt. %, of a hydrotalcite compound andlor a fatty acid metal salt (metallic soap), in the innermost layer (on the photographic photosensitive material side), e.g. the inner conductive thermoplastic resin layer, and the total blending amount of ①+②+③ becomes 0.0015 to 6 wt. %, preferably 0.002 to 5 wt. %, more preferably 0.003 to 4 wt. %, the most preferably 0.005 to 3 wt. % of the packaging material for a photographic photosensitive material. In any event, it is preferable to blend a minimum amount capable of preventing resin degradation in view of not degrading photographic performance and inhibiting increase of cost.

It is preferable to combine phosphorus-containing antioxidant with the hydrotalcite compound, in order to improve photographic properties.

The fatty acid metal salt not only exhibits excellent effects similar to the hydrotalcite compound, but also exhibits as lubricant and the dispersing agent of light-shielding material.

Representative examples of the fatty acid metal salt are combination of a fatty acid, such as lauric acid, stearic acid, lactic acid, succinic acid, caproic acid, caprylic acid, capric acid, myristic acid, behenic acid, linolic acid, stearyl lactic acid, phthalic acid, benzoic acid, hydroxystearic acid, ricinoleic acid, naphthenic acid, oleic acid, montanic acid, erucic acid, palmitic acid or the like and Li, Na, Mg, Ca, Sr, Ba, Zn, Cd, Al, Sn, Pb or the like. Preferable fatty acid metal salts are magnesium stearate, calcium stearate, sodium stearate, zinc stearate, zinc oleate, magnesium oleate, calcium oleate, and the like.

A suitable blending amount of the fatty acid metal salt is 0.001 to 5 wt. %, preferably 0.005 to 4 wt. %, more preferably 0.01 to 3 wt. %, particularly preferably 0.02 to 2 wt. %. When the blending amount is 0.001 wt. %, the blending effect is insufficient. When the blending amount exceeds 5 wt. %, blending effect by the excess amount is small, and lumps occur.

Zeolite is explained previously.

To the conductive light-shielding thermoplastic resin film layer, the Young's modulus thermoplastic resin film layer, the intermediate thermoplastic resin film layer or any other layer, a lubricant may be addeed, and thereby similar effects as mentioned previously can be obtained.

The packaging material for a photographic photosensitive material of the invention may be formed of a single layer composed of the conductive light-shielding thermoplastic resin film layer or a multilayer, e.g. a coextruded multilayer film comprising two or more layers of conductive light-shielding thermoplastic resin film layer or conductive light-shielding thermoplastic resin film layer and another thermoplastic resin layer. One or more flexible sheets may be laminated to the conductive light-shielding thermoplastic resin film layer or the above coextruded multilayer film directly or through an adhesive layer. Moreover, one or more flexible sheets may be incorporated into the packaging material comprising the conductive light-shielding thermoplastic resin film layer and the deposited thermoplastic resin film layer or the packaging material comprising the deposited thermoplastic resin film layer and two conductive light-shielding thermoplastic resin film layers located on both sides of the deposited thermoplastic resin film layer.

As the flexible sheet, there are various thermoplastic resin films such as various polyethylene resin films, ethylene copolymer resin films, polypropylene resin films, propylene copoymer resin films, polyvinyl chloride resin films, polyamide rein films, polyacrylonitrile resin films, ethylene-vinyl alcohol copolymer resin films, polycarbonate resin films, polyester (PET, PBT, A-PET, PEN, etc.) resin films, their modified resin films and uniaxially or biaxially stretched films thereof. As other flexible sheets, there are medtallized films such as aluminum-metallized film, cellulose triacetate film, cellophane, regenerated cellulose film, paper, synthetic paper, metal foil such as aluminum foil and nonwoven fabric, inorganic material deposited films, metallized papers, etc. Preferable flexible sheets are various neutral or acidic papers having an areal weight of 20 to 400 g/m$^2$, not adversely affecting photographic photosensitive materials, such as waste paper, regenerated paper, unbleached kraft paper, semibleached kraft paper, bleached kraft paper, twisting paper, Clupak paper, duostress paper, white cardboard, photo base paper, wood-free paper, medium grade paper using high yield pulp, coated paper, pure white roll paper, simili and glassine paper nowoven fabric, synthetic paper, uniaxially or biaxially stretched (including molecular oriented) thermoplastic resin films, and uniaxially or biaxially stretched (including molecular oriented) inorganic oxide-deposited thermoplastic resin films.

Two or more of the above flexible sheets may be combined. It is preferable to use a flexible sheet having a melting point higher than the layer to be heat-sealed by 10° C. or more, in view of the improvement in bag-making ability, in view of the resistance to wrinkling and breakage and in view of the improvement in appearance. Particularly preferred is biaxially stretched thermoplastic resin films having a thickness of 5 to 70 μm, preferably 7 to 50 μm, particularly preferably 10 to 35 μm. The Young's modulus of the flexible sheet is preferably not less than 50 kg/mm$^2$, more preferable not less than 70 kg/mm$^2$, further more preferably not less than 90 kg/mm$^2$, particularly preferably not less than 100 kg/mm$^2$, and more than the intermediate thermoplastic resin layer.

The metal foil is aluminum foil, lead foil, iron foil, tin foil, zinc foil, electrolytic iron foil, copper foil stainless steel foil and the like. A suitable metal foil thickness is 5 to 100 μm, and taking economical viewpoint, handling, ensuring properties and the like into consideration, preferably 7 to 50 μm, particularly preferably 9 to 20 μm. Metallized flexible sheets of a thermoplastic resin film or a dustfree flexible sheet, such as dustfree paper, synthetic paper, nonwoven fabric, glassine paper, cellophane, surface sized paper and surface coated paper, provided with a metal membrane layer are also preferable. Furthermore, inorganic oxide membrane deposited flexible sheets provided with an inorganic oxide membrane layer, such as glass or alumina are also preferable. In order to prevent fog on high speed photographic film by X-ray irradiation for checking personal baggages, it is preferable to laminate lead foil, iron foil, electrolytic iron foil, or the like, having a thickness of 10 to 200 μm as the flexible sheet.

The adhesive used as the adhesive layer is selected by considering both layers to be joined, and includes thermoplastic resin melting type adhesive (extrusion laminating type adhesive), hot melt type gum adhesives and solution type adhesives. The thermoplastic resin melting type adhesives are polyolefin resin adhesives, such as various polyethylene (LDPE, L-LDPE, MDPE, HDPE) resins and various polypropylene, ethylene copolymer resins, such as ethylene-propylene copolymer resins, ethylene-vinyl acetate copolymer resins, ethylene-ethyl acrylate copolymer resins, ethylene-acrylic acid copolymer resins, various ionomers and acid-modified ethylene copolymer resins. In addition there are melting type rubber-based adhesives. As the solution type adhesives, there are wet lamination type adhesives which are in emultsion-type or latex-type. Examples of the emulsion-type adhesives are polyvinyl acetate emulsion, the emulsion of vinyl acetate-ethylene copolymer, the emulsion of vinyl acetate-acrylate ester copolymer, the emulsion of vinyl acetate-maleate ester copolymer, the emulsion of acrylic copolymer and the emulsion of ethylene-acrylic acid copolymer. Examples of the latex-type adhesives are rubber latexes, such as natural rubber latex, styrene-butadiene rubber (SBR) latex, acrylonitrile-butadiene rubber (NBR) latex and chloroprene rubber (CR) latex. The adhesive for dry lamination has a great heat resistance and delamination resistance, good easy openability and is thinable to 7 μm or less, and there are two component curing type, solvent type, nonsolvent type, aqueous type, two component solvent type, one component nonsovent type, emulsion type and the like, and there are acryl-based adhesives, polyether-based adhesives, polyether-based and polyurethane-based blend adhesives, polyester-based and polyurethane-based blend adhesives, polyester-based and isocyanate-based blend adhesives, aromatic polyester-based adhesives, aliphatic polyester-based adhesives, aromatic polyether-based adhesives, aliphatic polyether-based adhesives, polyester-based adhesives, isocyanate-based adhesives, urethane-based adhesives, and so on.

Characteristics of the adhesive for dry lamination are ⑤ good wetting against base materials because of dissolving into a solvent and being served to use, ② usable for various materials, such as paper, thermoplastic resin film, nonwoven fabric, synthetic paper, cellophane, and the like, ③ stable reaction and strong adhesive force, ④ good easy openability caused by a great edelamination resistance of 400 g/15 mm width or more, ⑤ excellent heat resistance, ⑥ the presence of pot life after mixing chief material/curing agent and solvent, because of being reaction type, ⑦ thinability of coating amount in solid matter of 1 to 7 g/m$^2$, preferably 2 to 5 g/m$^2$. However, aging for 1 to 5 days at 30 to 60° C. is necessary for complete curing.

In addition, adhesives for hot melt lamination which is a blend of paraffin wax, microcrystalline wax, ethylene-vinyl acetate copolymer ethylene-α-olefin resin, tackifier resin, ethylene-ethyl acrylate copolymer, etc., pressure-sensitive adhesives, and temperature-sensitive adhesives are also usable.

Preferable adhesives are extrusion lamination type polyolefin resin adhesives, and illustrative of them are various density homopolyethylene resins, polypropylene resins, polybutylene resins, ethylene copolymer (EVA, EEA, etc.) resins, copolymers of ethylene and another monomer, such as L-LDPE resin, ionomer resins (ionic copolymers), and acid-modified polyolefin resins. Recently, UV-curing type adhesives have also been used.

Particularly, L-LDPE resin or a blend of LDPE resin and L-LDPE resin are preferable because of being excellent in laminating properties as well as inexpensiveness. In the case of improving adhesive strength, acid-modified resins are preferable. Blend resins to two or more of the aforementioned resins blended so as to compensate defects of each resin are also particularly preferable because of being excellent in laminating properties. Particularly, an arbitrary adhesive strength can be obtained by blending acid-modified polyolefin resin with LDPE resin or L-LDPE resin at a suitable blending ratio. In order to improve easy openability by making delamination resistance of a laminated film 350 g/15 mm width or more, the polyolefin type adhesives containing 5 wt. % or more of acid-modified polyolefin resin for dry lamination are preferable.

The acid-modified polyolefin resin is as explained previously.

A suitable thickness of the adhesive layer in extrusion laminating type is 7 to 50 μm, preferably 9 to 40 μm, particularly preferably 11 to 30 μm but it is designed based on cost, adhesive strength, laminating speed, total thickness of laminated, and therefore, not restricted thereto.

Recently, nonsolvent adhesives for lamination are highlighted as an adhesive coping with pollution problem. There is a method of heating a solid of 100% urethane-based nonsolvent adhesive to decrease viscosity, applying it to a base material, and then pressing another base material thereonto by a heating roll to laminate them.

① Since no solvent is used, a dryer, an explosion-proof equipment, an exhauster and a ventilator are not necessary. However, a heating apparatus for adhesive and a feeder are necessary.

② Since reaction inhibition by solvent does not occur because of nonsolvent, not life is very short.

③ Since the molecular weight of the adhesive is smaller than the solvent-type adhesive, coagulation force is small and initial adhesive strength is small.

④ Although there is a disadvantage of requiring time for completing reaction, the adhesive is particularly preferable of good photographic properties, no anxiety about residual solvent, and a small solid coating amount of 0.1 to 3.5 g/m$^2$.

The packaging material for a photographic photosensitive material of the invention has preferably an oxygen permeability (measured according to JIS K 7126, at 20° C., at 0% RH) of 50 ml/m$^2$·24 hours 1 atm or less, more preferably 40 ml/m$^2$·24 hours·1 atm or less, particularly preferably 30 ml/m$^2$·24 hours·1 atm or less. When the oxygen permeability exceeds 50 ml/m$^2$·24 hours·1 atm, photographic photosensitive materials packaged are adversely affected. The oxygen permeability is ensured as the whole of the packaging material. For example, when the packaging material is composed of the conductive light-shielding thermoplastic resin film layer and the deposited thermoplastic resin film layer, it is arranged so that the oxygen permeability can be ensured by the total of the conductive light-shielding thermoplastic resin film layer and the deposited thermoplastic resin film layer. In the case of further composed of a flexible sheet layer and an adhesive layer it is arranged so that the oxygen permeability can be ensured by the total of the conductive light-shielding thermoplastic resin film layer and the deposited thermoplastic resin film layer and the flexible sheet layer and the adhesive layer.

The packaging material for a photographic photosensitive material of the invention has preferably a moisture permeability (measured according to JIS Z 0208, condition B, at 40±0.5° C., at 90±2° C.) of 10 g/m$^2$·24 hours or less, more preferably 7 g/m$^2$·24 hours or less, further more preferably 5 g/m$^2$·24 hours or less, the most preferably 3 g/m$^2$·24 hours or less. When the moisture permeability exceeds 10 g/m$^2$·24 hours, photographic photosensitive materials packaged are adversely affected. The moisture permeability is ensured as the whole of the packaging material. For example, when the packaging material is composed of the conductive light-shielding thermoplastic resin film layer and the deposited thermoplastic resin film layer, it is arranged so that the moisture permeability can be ensured by the total of the conductive light-shielding thermoplastic resin film layer and the deposited thermoplastic resin film layer. In the case of further composed of a flexible sheet layer and an adhesive layer it is arranged so that the moisture permeability can be ensured by the total of the conductive light-shielding thermoplastic resin film layer and the deposited thermoplastic resin film layer and the flexible sheet layer and the adhesive layer.

Illustrative of the applications of the packaging material for a photographic photosensitive material of the invention are as follows:

① Moistureproof sealing bag for packaging a film unit with a lens: Clear, colored or with print (Japanese Patent KOKOKU No. 7-1380, Japanese Patent KOKAI Nos. 5-197087, 7-72593, 8-248573, 8-254793, 8-334869, 9-15796, 9-54395, 9-120119, 9-244187, 9-274288, 10-186586, 10-197994, etc.)

② Moistureproof sealing bag for assembly packaging 2 or more of photographic films (JIS 135 film, APS film, microfilm, etc.) put in a plastic container: Clear, colored or with print (Japanese Patent KOKAI No. 8-254793, etc.)

③ Moistureproof·sealing·light-shielding bag for sheet-shaped photographic photosensitive materials, such as photographic photosensitive materials, such as photographic paupers, films for printing, cut films for photographing, X-ray films, PS plates, etc. (Japanese Patent KOKOKU No. 2-2700, Japanese Patent KOKAI Nos. 8-254793, 5-5972, etc.)

④ Light-shielding film for a package of a photographic photosensitive web material (Japanese Patent KOKAI Nos. 2-72347, 6-2214350, Japanese Utility Model KOKOKU Nos. 5-29471, 7-50743, 6-8583, 8-10812, etc.)

⑤ Moistureproof·sealing light-shielding bag for a roll of photographic photosensitive material, such as photographic paper, movie film, positive microfilm film for printing or heat development diffusion transfer paper (Japanese Patent KOKAI No. 6-67358)

⑥ Moistureproof·light-shielding, film or leader film for light room loading package of photosensitive web material, such as photographic paper or photographic film (Japanese Patent KOKAI Nos. 62-172344, 2-72347, 5-72672, 5-216176, 6-75341, 6-214350, 6-148820, 7-257510, 7-92618, 8-40468, 10-97030 Japanese Utility Model KOKOKU 56-16608,. 6-8593, 8-9725, etc.)

⑦ Moistureproof-light-shielding film for packaging bulk roll of photographic photosensitive material (Japanese Patent KOKAI 3-53243, etc.).

⑧ Instant film pack (Japanese Patent KOKAI 8-62782, 10-228079, 10-228080, etc.)

⑨ Light-shielding paper for photographic film (U.S. Pat. No. 5,790,912, Japanese Patent KOKAI 48-22020, 50-67644, 52-150016, 55-140835, 58-17434, 58-186744, 59-68238, 60-35728, 61-36216, 63-169642, 4-136842, 4-296849, 5-281666, 9-80695, 9-152685, 9-185151, 10-104803, 10-254102, 10-254103, 10-312042, 10-312043, 10-319545, 10-325993, etc.)

⑩ Light-shielding bag for instant film pack (Japanese Patent KOKAI 10-186504, 10-221814, 10-228079, 10-228080, 10-293359, 10-301199, etc.)

As the form the above various sealing bags, there are bottom-sealed bag of tubular film, two-sided fin seal bag, three-sided fin seal bag, four-sided fin seal bag, gusset bag, etc.

The packaging material of the invention can also be used for various wrappers. For example, it can be used for the moistureproof light-shielding film for light room loading package of a strip-shaped photosensitive material disclosed in Japanese Patent KOKAI 6-148820, 6-214350, 7-257510, 7-287350, Japanese Utility Model KOKOKU 7-50743, 8-7398, 8-9723, 8-9724, 8-10812, etc., the wrapper of carton or tray, the wrapper of caramel type package, the wrapper of snack type package, the wrapper of cigarette type package, the wrapper of roll package, the wrapper of bar-shaped package, the wrapper of twist wrapping, etc., and various packages described in "Hoso Gijutsu Binran", pp 754–774, Nippon Hoso Gijutsu Kyokai, 1995.

The packaging material for a photographic photosensitive material of the invention is applicable to the following photosensitive materials.

Silver halide photographic photosensitive materials: films for printing, color and monochromatic photographic papers, color and monochromatic negative films, master papers for printing, DTR (diffusion transfer process) photosensitive materials, films and papers for computerized type-setting system, color and monochromatic positive films, color reversal films, microfilms, films for movie, self-developing type photographic photosensitive materials, direct positive films and papers, etc. (Japanese Patent KOKAI 4-136838, 4-172339, 5-113623, 9-325450, 10-62901, 10-62903, 10-62904, 10-62905, 10-62906, 10-62921, 10-142731, etc.)

Heat developing photosensitive materials: heat developing color photosensitive materials, heat developing monochromatic photosensitive materials, e.g. disclosed in Japanese Patent KOKOKU Nos. 43-4921, 43-4924, "Shashinkogaku-no Kiso (Fundamentals of Photographic Engineering), Vol. Silver Salt Photograph", pp 553-555, Corona, 1979, "Research Disclosure", pp 9-15 (RD-17029), June, 1978, transfer-type heat developing color photosensitive materials disclosed in Japanese Patent KOKAI Nos. 59-12431, 60-2950, 61-52343, 7-13295, 10-62898, 10-62899, U.S. Pat. Nos. 3,457,075, 3,574,627, 4,042,394, 4,584,267, Photosensitive heatsensitive recording materials: recording materials using photothermography (photosensitive heatsensitive image forming method) disclosed in Japanese Patent KOKAI No. 3-72358.

Diazonium photographic photosensitive materials: 4-morpholinobenzene diazonium microfilms, microfilms, copying films, form plates for printing, etc.

Azide, diazide photographic photosensitive materials: photosensitive materials containing paraazidobenzoate, 4,4'-diazidostilbene, etc., such as copying films and form plates for printing etc.

Quinone diazide photographic photosensitive materials: photosensitive materials containing ortho-quinone diazide compounds or ortho-naphthoquinone diazido compounds such as benzoquinone-(1,2)-diazido-(2)-4-sulfonic acid phenyl ether, such as form plates for printing, copying films and contact printing film, etc.

Photo polymers: photosensitive materials, form plates for printing, contact printing films, containing vinyl compound monomer, etc.

Polyvinyl cinnamate esters: printing films, photoresists for IC, etc.

A preferable package of a photosensitive material is made by packaging the photosensitive material in a sealed, light-shielding state using the packaging material for a photographic photosensitive material of the invention having a moisture permeability (JIS Z 0208, condition B, at 40±0.5° C., at 90±2% RH) of 8 $g/m^2 \cdot 24$ hours or less, an optical density of 6.0 or more, a thickness of 30 $\mu$m or more. Moreover, it is also preferable to package by a sealing light-shielding bag made of the above packaging material provided with an easy openability in the longitudinal direction.

Particularly, in the case that the photographic photosensitive material is chemically sensitized or dye sensitized one, unless the moisture permeability is made 10 $g/m^2 \cdot 24$ hours or less, preferably 7 $g/m^2 \cdot 24$ hours or less, particularly preferably 3 $g/m^2 \cdot 24$ hours, abnormal sensitivity, abnormal coloring or the like occurs.

In the photographic photosensitive material which is chemically sensitized or dye sensitized, the photosensitive layer is formed of silver halide particles dispersed in a binder. In the case of chemically sensitized, photosensitive silver halide particles are chemically sensitized by the sulfur sensitization, selenium sensitization, tellurium sensitization, noble metal sensitization or reduction sensitization. In the case of dye sensitized, photosensitive silver halide particles are sensitized by a sensitizing dye.

A representative binder is polymer latex, and, polymers used in the polymer latex according to the invention include acryl resins, vinyl acetate resins, polyester resins, polyurethane resins, rubbery resins, vinyl chloride resins, vinylidene chloride resins, polyolefin resins, and copolymers thereof. Illustrative examples of the polymer latex which can be used as the binder of the photosensitive layer of the invention include latices of methyl methacrylate/ethyl acrylate/methacrylic acid copolymers, latices of methyl methachrylate/2-ethylhexl acrylate/styrene/acrylic acid copolymers, latices of styrene/butadiene/acrylic acid copolymers, latices of styrene/butadiene/divinyl benzene/methacrylic acid copolymers, latices of methyl methacrylate/vinyl chloride/acrylic acid copolymers, and latices of vinylidene chloride/ethyl acrylate/acrylonitrile/methacrylic acid copolymers.

In the photosensitive layer of the invention, the polymer latex or water dispersion of thermoplastic polymer preferably consitutes at least 50%, especially at least 70% by weight of an entire binder. If desired, a hydrophilic polymer is added in an amount of less than 50%, preferably less than 30% by weight of the entire binder. The hydrophilic polymer may be selected from gelatin, polyvinyl alcohol (PVA), methyl cellulose, hydroxypropyl cellulose, carboxymethyl cellulose, and hydroxypropylmethyl cellulose.

The photosensitive layer of the invention is formed by applying an aqueous coating solution to form a coating and drying the coating. The "aqueous" system indicates that water consitutes at least 30% by weight of the solvent or dispersing medium of the coating solution. The remainder of the solvent or dispersing medium may be a water-miscible organic solvent such as methyl alcohol, ethyl alcohol, isopropyl alcohol, methyl cellosolve, ethyl cellosolve, dimethylformamide (DMF), and ethyl acetate. Exemplary compositions of the solvent include water/methanol=90/10, water/methanol=70/30, water/ethanol=90/10, water/isopropanol=90/10, water/DMF=95/5, water/methanol/DMF=80/15/5, water/methanol/DMF=90/5/5 (mix ratios are by weight).

Preferably the photosensitive layer of the invention contains a binder in a total coverage of 0.2 to 30 g/m$^2$, more preferably 1 to 15 g/m$^2$.

In addition to the silver halide and the binder, an organic silver salt, reducing agent therefor, toner, antifoggant, matte agent, lubricant, crosslinking agent, surfactant, dyestuff and other suitable additives may be added to the photosensitive layer of the invention.

Some of components contained in photosensitive, non-photosensitive and other layers of the photothermographic material of the invention have been described above. The remaining components are described below.

According to the invention, chemically sensitized silver halide is preferably used as a photosensitive silver salt. A method for forming a photosensitive silver salt is well known in the art. Any of the methods disclosed in Research Disclosure No. 17029 (June 1978) and U.S. Pat. No. 3,700,458, for example, may be used. Illustrative methods which can be used herein are a method of preparing an organic silver salt and adding a halogen-containing compound to the organic silver salt to convert a part of silver of the organic silver salt into photosensitive silver halide and a method of adding a silver-providing compound and a halogen-providing compound to a solution of gelatin or another polymer to form photosensitive silver halide grains and mixing the grains with an organic silver salt. The latter method is preferred in the practice of the invention. The photosensitive silver halide should preferably have a smaller grain size for the purpose of minimizing white turbidity after image formation. Specifically, the grain size is preferably up to 0.20 μm, more preferably 0.01 μm to 0.15 μm, most preferably 0.02 μm to 0.12 μm. The term grain size designates the length of an edge of a silver halide grain where silver halide grains are regular grains of cubic or octahedral shape. Where silver halide grains are tabular, the grain size is the diameter of an equivalent circle having the same area as the projected area of a major surface of a tabular grain. Where silver halide grains are not regular, for example, in the case of spherical or rod-shaped grains, the grain size is the diameter of an equivalent sphere having the same volume as a grain.

The shape of silver halide grains may be cubic, octahedral, tabular, spherical, rod-like and potato-like, with cubic and tabular grains being preferred in the practice of the invention. Where tabular silver halide grains are used, they should preferably have an average aspect ratio of from 100:1 to 2:1, more preferably from 50:1 to 3:1. Silver halide grains having rounded corners are also preferably used. No particular limit is imposed on the plane indices (Miller indices) of an outer surface of silver halide grains. Preferably silver halide grains have a high proportion of {100} plane featuring high spectral sensitization efficiency upon adsorption of a spectral sensitizing dye. The proportion of {100} plane is preferably at least 50%, more preferably at least 65%, most preferably at least 80%. Note that the proportion of Miller Index {100} plane can be determined by the method described in T. Tanl, J. Imaging Scl., 29, 165 (1985), utilizing the adsorption dependency of {111} plane and {100} plane upon adsorption of a sensitizing dye.

The halogen composition of photosensitive silver halide is not critical and may be any of silver chloride, silver chlorobromide, silver bromide, silver iodobromide, silver iodochlorobromide, and silver iodide. Silver bromide or silver iodobromide is preferred in the practice of the invention. Especially preferred is silver iodobromide preferably having a silver iodide content of 0.1 to 40 mol %, especially 0.1 to 20 mol %. The halogen composition in grains may have a uniform distribution or a non-uniform distribution wherein the halogen concentration changes in a stepped or continuous manner. Preferred are silver iodobromide grains having a higher silver iodide content in the interior. Silver halide grains of the core/shell structure are also useful. Such core/shell grains preferably have a multilayer structure of 2 to 5 layers, more preferably 2 to 4 layers.

Preferably the photosensitive silver halide grains used herein contain at least one complex of a metal selected from the group consisting of rhodium, rhenium, ruthenium, osmium, iridium, cobalt, and iron. The metal complexes may be used alone or in admixture of two or more complexes of a common metal or different metals. The metal complex is preferably contained in an amount of 1 nmol to 10 mmol, more preferably 10 nmol to 100 μmol per mol of silver. Illustrative metal complex structures are those described in JP-A 225449/1995. Preferred among cobalt and iron complexes are hexacyano metal complexes. Illustrative, non-limiting examples include a ferricyanate ion, ferrocyanate ion, and hexacyanocobaltate ion. The distribution of the metal complex in silver halide grains is not critical. That is, the metal complex may be contained in silver halide grains to form a uniform phase or at a high concentration in either the core or the shell.

Photosensitive silver halide grains may be desalted by any of well-known water washing methods such as noodle and flocculation methods although silver halide grains may be either desalted or not according to the invention.

The photosensitive silver halide grains used herein should preferably be chemically sensitized. Preferred chemicaly sensitization methods are sulfur, selenium, and tellurium sensitization methods which are well known in the art. Also useful are a noble metal sensitization method using compounds of gold, palladium, and iridium and a reduction sensitization method. In the sulfur, selenium, and tellurium sensitization methods, any of compounds well known for the purpose may be used. For example, sulfur sensitizing agents include sulfur-containing compounds capable of reacting with active gelatin and silver, such as thiosulfates, thioureas, mercapto compounds, and rhodanines. Selenium sensitizing agents include unstable selenium compounds and non-unstable selenium compounds. Exemplary unstable selenium compounds are described in JP-B 15748/1969 and 13489/1968, Japanese Patent Application Nos. 130976/1990 and 229300/1990. Exemplary non-unstable selenium compounds are described in JP-B 4553/1971, 34492/1977, and 34491/1977. Exemplary tellurium sensitizing agents include diacyltellurides, bis(oxycarbonyl)tellurides, bis (carbamoyl) tellurides, bis(oxycarbonyl)ditellurides, bis (carbamoyl) ditellurides, compounds having a P=Te bond, tellurocarboxylic salts, Te-organyltellurocarboxylic esters, di(poly) tellurides, tellurides, telluroles, telluroacetals, tellurosulfonates, compounds having a P—Te bond, Te-containing heterocyclics, tellurocarbonyl compounds, inorganic tellurium compounds, and colloidal tellurium.

The preferred compounds used in the noble metal sensitization method include chloroauric acid, potassium chloroaurate, potassium aurithiocyanate, gold sulfide, and gold selenide as well as the compounds described in U.S. Pat. No. 2,448,060 and UKP 618,061.

Illustrative examples of the compound used in the reduction sensitization method include ascorbic acid, thiourea dioxide, stannous chloride, aminoiminomethane-sulfinic acid, hydrazine derivatives, boran compounds, silane compounds, and polyamine compounds. Reduction sensitization may also be accomplished by ripening the emulsion while maintaining it at pH 7 or higher or at pAg 8–3 or lower. Reduction sensitization may also be accomplished by introducing a single addition portion of silver ion during grain formation.

The chemical sensitization methods mentioned above may be used alone or in combination. It is preferred to combine at least one of the sulfur, selenium and tellurium especially the sulfur sensitization method with another sensitization method.

In the practice of the invention, photosensitive silver halide is preferably used in an amount of 0.01 mol to 0.5 mol, more preferably 0.02 mol to 0.3 mol, most preferably 0.03 mol to 0.25 mol per mol of the non-photosensitive silver salt, typically organic silver salt.

With respect to a method and conditions of mixing the separately prepared photosensitive silver halide and organic silver salt, there may be used a method of mixing the separately prepared photosensitive silver halide and organic silver salt in a high speed agitator, ball mill, sand mill, colloidal mill, vibratory mill or homogenizer or a method of preparing an organic silver salt by adding the already prepared photosensitive silver halide at any timing during preparation of an organic silver salt. Any desired mixing method may be used insofar as the benefits of the invention are fully achievable.

A preferable preparation of silver halide the halidation wherein a part of the silver in an organic silver salt is halogenated by an organic or inorganic halide. The organic halide used herein may be any one capable of reacting with the organic silver salt to produce silver halide, and illustrative thereof are N-halogenoimides (N-bromosuccinimide, etc.), halogenated quaternary nitrogen compounds (bromotetrabutyl ammonium, etc.), associated bodies of a halogenated quaternary nitrogen salt and halogen molecule (s) (perbromobromopyridinium, etc.) and the like. The inorganic halide may also be any one capable of reacting with the organic silver salt to produce silver halide, and illustrative thereof are alkali metal or ammonium halides (sodium chloride, lithium bromide, potassium iodide, ammonium bromide, etc.), alkaline earth metal halides (calcium bromide, magnesium chloride, etc.), transition metal halides (ferric chloride, cupric bromide, etc.), metal complexes having halogen ligand(s) (sodium iridate bromide, ammonium rhodate chloride, etc.), halogen molecules (bromine, chlorine, iodine, etc.), and the like. Moreover, a desired organic, inorganic halide may be combined.

A preferable amount of the halide to be added on the halidation is 1 mmol. to 500 mmol. as halogen atom per 1 mol organic silver salt, more preferably 10 mmol. to 250 mmol.

In the practice of the invention, a sensitizing dye may be used in the photothermographic material, there may be used any of sensitizing dyes which can spectrally sensitize silver halide grains in a desired wavelength region when adsorbed to the silver halide grains. The sensitizing dyes used herein include cyanine dyes, merocyanine dyes, complex cyanine dyes, complex merocyanine dyes, holopolar cyanine dyes, styryl dyes, hemicyanine dyes, oxonol dyes, and hemioxonol dyes. Useful sensitizing dyes which can be used herein are described in Research Disclosure. Item 17643 IV-A (December 1978, page 23), ibid., Item 1831 X (August 1979, page 437) and the references cited therein. A choice may be advantageously made among sensitizing dyes having spectral sensitivity adequate for spectral characteristics of a light source of various laser imagers, scanners, image setters and lithographic cameras.

Exemplary sensitizing dyes for spectral sensitization to red light may be advantageously selected from compounds 1-1 to 1-38 described in JP-A 18726/1979, compounds 1-1 to 1-35 described in JP-A 75322/1994, and compounds 1-1 to 1-34 described in JP-A 287338/1995 for He-Ne laser light sources; and dyes 1 to 20 described in JP-B 39818/1980, compounds 1-1 to 1-37 described in JP-A 284343/1987, and compounds 1-1 to 1-34 described in JP-A 287338/1995 for LED light sources.

Silver halide grains can be spectrally sensitized in any wavelength region in the range of 750 to 1400 nm. More specifically, photosensitive silver halide can be spectrally advantageously sensitized with various known dyes including cyanine, merocyanine, styryl, hemicyanine, oxonol, hemioxonol and xanthene dyes. Useful cyanine dyes are cyanine dyes having a basic nucleus such as a thiazoline, oxazoline, pyroline, pyridine, oxazole, thiazole, selenazole and imirhodanine, oxazolidinedione, thiazolinedione, barbituric acid, thiazolinone, malononitrile, and pyrazolone nucleus in addition to the above-mentioned basic nucleus. Among the above-mentioned cyanine and merocyanine dyes, those having an imino or carboxyl group are especially effective. A suitable choice may be made of well-known dyes as described, for example, in U.S. Pat. Nos. 3,761,279, 3,719,495, and 3,877,943, UKP 1,466,201, 1,469,117, and 1,422,057, JP-B 10391/1991 and 52387/1994, JP-A 341432/1993, 194781/1994, and 301141/1994. Especially preferred dye structures are cyanine dyes having a thioether bond, examples of which are the cyanine dyes described in JP-A 58239/1987, 138638/1991, 138642/1991, 255840/1992, 72659/1993, 72661/1993, 222491/1994, 230506/1990, 258757/1994, 317868/1994, and 324425/1994, and Publication of International Patent Application no. 500926/1995, U.S. Pat. No. 5,441,899, dyes having a carboxylic acid group, examples of which are described in Japanese Patent KOKAI 3-163440, 6-301141, U.S. Pat. No. 5,441,899, merocyanine dyes, polynuclear merocyanine dyes and polynuclear cyanine dyes, examples of which are described in Japanese Patent KOKAI 47-6329, 49-105524, 51-127719, 52-80829, 54-61517, 59-214846, 60-6750, 63-159841, 6-35109, 6-59381, 7-146537, 7-146537, Japanese Patent KOHYO 55-50111, GB 1,467,638, U.S. Pat. No. 5,281,515. In addition, dyes forming a J-bard are described in U.S. Pat. No. 5,510,236, U.S. Pat. No. 3,871,887 in Example 5, Japanese Patent KOKAI 2-96131, 59-48753, which are also preferable to the invention.

These sensitizing dyes may be used alone or in admixture of two or more. A combination of sensitizing dyes is often used for the purpose of supersensitization. In addition to the sensitizing dye, the emulsion may contain a dye which itself has no spectral sensitization function or a compound which does not substantially absorb visible light, but is capable of supersensitization. Useful sensitizing dyes, combinations of dyes showing supersensitization, and compounds showing supersensitization are described in Research Disclosure, Vol. 176, 17643 (December 1978), page 23, IV J and JP-B 25500/1974 and 4933/19678, JP-A 19032/1984 and 192242/1984.

The sensitizing dyes may be used in admixture of two or more in the practice of the invention. The sensitizing dye is added to a silver halide emulsion by directly dispersing the dye in the emulsion or by dissolving the dye in a solvent and adding the solution to the emulsion. The solvent used herein includes water, methanol, ethanol, propanol, acetone, methyl cellosolve, 2,2,3,3-tetrafluoropropanol, 2,2,2-trifluoroethanol, 3-methoxy-1-propanol, 3-methoxy-1-butanol, 1-methoxy-2-propanol, N,N-dimethylformamide and mixtures thereof.

Also useful are a method of dissolving a dye in a volatile organic solvent, dispersing the solution in water or hydrophilic colloid and adding the dispersion to an emulsion as disclosed in U.S. Pat. No. 3,469,987, a method of dissolving a dye in an acid and adding the solution to an emulsion or forming an aqueous solution of a dye with the aid of an acid or base and adding it to an emulsion as disclosed in JP-B 23389/1969 and 27555/1969 and 22091/1982, a method of forming an aqueous solution or colloidal dispersion of a dye with the aid of a surfactant and adding it to an emulsion as disclosed in U.S. Pat. No. 3,822,135 and 4,006,025, a method of directly dispersing a dye in hydrophilic colloid and adding the dispersion to an emulsion as disclosed in JP-A 102733/1978 and 105141/1983, and a method of dissolving a dye using a compound capable of red shift and adding the solution to an emulsion as disclosed in JP-A 74624/1976. It is also acceptable to apply ultrasonic waves to a solution.

The time when the sensitizing dye is added to the silver halide emulsion according to the invention is at any step of an emulsion preparing process which has been acknowledged effective. The sensitizing dye may be added to the emulsion at any stage or step before the emulsion is coated, for example, at aa stage prior to the silver halide grain forming step and/or desalting step, during the desalting step and/or a stage from desalting to the start of chemical ripening as disclosed in U.S. Pat. Nos. 2,735,766, 3,628,960, 4,183,756, and 4,225,666, JP-A 184142/1983 and 196749/1985, and a stage immediately before or during chemical ripening and a stage from chemical ripening to emulsion coating as disclosed in JP-A 113920/1983. Also as disclosed in U.S. Pat. No. 4,225,666 and JP-A 7629/1983, an identical compound may be added alone or in combination with a compound of different structure in divided portions, for example, in divided portions during a grain forming step and during a chemical ripening step or after the completion of chemical ripening, or before or during chemical ripening and after the completion thereof. The type of compound or the combination of compounds to be added in divided portions may be changed.

A suitable amount of the sensitizing dye is designed so as to meet the desired performance, such as sensitivity, fog, etc, and preferably, it is $10^{-6}$ to 1 mole per 1 mole of silver halide in the photosensitive layer, more preferably $10^{-4}$ to $10^{-1}$ mole.

It is sometimes advantageous to add an additive known as a "toner" for improving images in addition to the aforementioned components. It is preferable that the toner is present in an amount of 0.1 to 50 mol % per 1 mole silver, more preferably 0.5 to 20 mol. %. The toner is well known in the photographic art as described in U.S. Pat. Nos. 3,080,254, 3,847,612, and 4,123,282.

Examples of the toner include phthalimide and N-hydroxyphthalimide; cyclic imides such as succinimide, pyrazoline-5-one, quinazoline, 3-phenyl-2-pyrazolin-5-one, 1-phenylurazol, quinazoline and 2,4-thiazolizinedione; naphthalimides such as N-hydroxy-1,8-naphthalimide; cobalt complexes such as cobalt hexamine trifluoroacetate; mercaptans as exemplified by 3-mercapto-1,2,4-triazole, 2,4-dimercaptopyrimidine, 3-mercapto-4,5-diphenyl-1,2,4-triazole, and 2,5-dimercapto-1,3,4-thiadiazole;

N-(aminomethyl) aryldicarboxyimides such as (N,N-dimethylaminomethyl)phthalimide and N,N-(dimethylaminomethyl)naphthalene-2,3-dicarboxyimide;

blocked pyrazoles, isothiuronium derivatives and certain optical fading agents such as N,N'-hexamethylenebis (1-carbamoyl-3,5-dimethylpyrazole), 1,8-(3,6-diazaoctane)bis(isothiuroniumtrifluoroacetate) and 2-tribromomethylsulfonyl-benzothiazole;

3-ethyl-5-{(3-ethyl-2-benzothiazolinylidene)-1-methylethylidene}-2-thio-2,4-oxazolidinedione;

phthalazinone, phthalazinone derivatives or metal salts, or derivatives such as 4-(1-naphthyl)phthalazinone, 6-chlorophthalazinone, 5,7-dimethoxyphthalazinone and 2,3-dihydro-1,4-phthalazinedione;

combinations of phthalazinone with phthalic acid derivatives (e.g., phthalic acid, 4-methylphthalic acid, 4-nitrophthalic acid, and tetrachlorophthalic anhydride); phthalazine, phthalazing derivatives or metal salts, or derivatives such as 4-(1-naphthyl) phthlazine, 6-chlorophthalazine, 5,7-dimethoxyphthalazine and 2,3-dihydrophthlazine;

combinations of phthalazine with phthalic acid derivatives (e.g., phthalic acid, 4-methylphthalic acid, 4-nitrophthalic acid, and tetrachlorophthalic anhydride);

quinazolinedione, benzoxazine or naphthoxazine derivatives; rhodium complexes which function not only as a tone regulation agent, but also as a source of halide ion for generating silver halide in situ, for example, ammonium hexachororhodinate (III), rhodium bromide, rhodium nitrate and potassium hexachlororhodinate (III); inorganic peroxides and persulfates such as ammonium peroxide disulfide and hydrogen peroxide; benzoxazine-2,4-diones such as 1,3-benzoxazine-2,4-dione, 8-methyl-1,3-benzoxazine-2,4-dione, and 6-nitro-1,3-benzoxazine-2,4-dione; pyrimidine and asymtriazines such as 2,4-dihydroxypyrimidine and 2-hydroxy-4-aminopyrimidine; azauracil and tetraazapentalene derivatives such as 3,6-dimercapto-1,4-diphenyl-1H,4H-2,3a,5,6a-tetraazapentalene, and 1,4-(o-chlorophenyl)-3,6-dimercapto-1H,4H-2,3a,5,6a-tetraazapentatene.

The toner can be added in an form of solution, powder, dispersion of solid microparticles or the like. The dispersion of solid microparticles is produced by a known pulverizing means (e.g. ball mill, oscillating ball mill, sand mill, calloid mill, jet mill, roller mill, etc.). A dispersing assistant may be used upon dispersing the solid microparticles.

Using anti-foggants, stabilizers, and stabilizer precursors, the silver halide emulsion and/or organic silver salt according to the invention may be further protected against generation of additional fog and stabilized against a drop of sensitivity during shelf storage. The anti-foggants, stabilizers, and stabilizer precursors which can be used alone or in combination include thiazonium salts as described in U.S. Pat. Nos. 2,131,038 and 2,694,716, azaindenes as described in U.S. Pat. Nos. 2,886,437 and 2,444,605, mercury salts as described in U.S. Pat. No. 2,728,663, urazols as described in U.S. Pat. No. 3,287,135, sulfocatechols as described in U.S. Pat. No. 3,235,652, oximes, nitrons, and nitroindazoles as described in UKP 623,448, polyvalent metal salts as described in U.S. Pat. No. 2,839,405, thiuronium salts as described in U.S. Pat. No. 3,220,839, palladium, platinum and gold salts as described in U.S. Pat. Nos. 2,566,263 and 2,597,915, halogenated organic compounds as described in U.S. Pat. Nos. 4,108,665, 4,442,202, 3,874,946, and 4,756,999, triazines as described in U.S. Pat. Nos. 4,128,557, 4,137,079, 4,138,365, and 4,459,350, and phosphorus compounds as described in U.S. Pat. No. 4,411,985.

Preferable anti-foggants are organic halides, such as disclosed in Japanese Patent KOKAI 50-119624, 50-120328, 51-121332, 54-58022, 56-70543, 56-99335, 59-90842, 61-129642, 62-129845, 6-208191, 7-5621, 7-2781, 8-15809, U.S. Pat. No. 5,340,712, U.S. Pat. No. 5,369,000, U.S. Pat. No. 5,464,737.

The anti-foggant can be added in an form of solution, powder, dispersion of solid microparticles or the like. The dispersion of solid microparticles is produced by a known pulverizing means (e.g. ball mill, oscillating ball mill, sand mill, calloid mill, jet mill, roller mill, etc.). A dispersing assistant may be used upon dispersing the solid microparticles.

Although not essential, it is possible to be advantageous that a mercury (II) salt is added to the emulsion layer as anti-foggant. Preferable mercury (II) salts therefor are mercury acetate and mercury fromide. A suitable amount of mercury is 1 nmol. to 1 mmol., preferably 10 nmol. to 100 $\mu$mol.

A benzoic acid compound may be incorporated into the photothermographic material for the purpose of making high photographic speed or the prevention of fog. Although the benzoic acid compound may be any benzoic acid derivative, illustrative of preferable structures are described in U.S. Pat. No. 4,784,939, U.S. Pat. No. 4,152,160, Japanese Patent KOKAI 8-151242, 8-151241, 8-98051, etc. The benzoic acid compound may be added to any portion, preferably to a layer facing the photosensitive layer, more preferably to the layer containing the organic silver salt. The benzoic acid compound may be added in any process for preparing a coating solution. In the case of adding it to the layer containing the organic silver salt, the benzoic acid compound may be added in any process from the preparation of the organic silver salt to the preparation of a coating solution, preferably from after the preparation of the organic silver salt to immediate before coating. The benzoic acid compound may be added in any form of powder, solution, particulate dispersion. It may be added as a solution containing other additives, such as sensitizing dye, reducing agent are toner. A suitable blending amount of the benzoic acid compound is 1 $\mu$mole to 2 mole, preferably 1 mmole to 0.5 mole, per 1 mole silver.

In the photothermographic material of the invention, mercapto, disulfide and thion compounds may be added for the purposes of retarding or accelerating development to control development, improving spectral sensitization efficiency, and improving storage stability before and after development.

Where mercapto compounds are used herein, any structure is acceptable. Preferred are structures represented by Ar—SM and Ar—S—S—Ar wherein M is a hydrogen atom or alkali metal atom, and Ar is an aromatic ring or fused aromatic ring having at least one nitrogen, sulfur, oxygen, selenium or tellurium atom. Preferred hetero-aromatic rings are benzimidazole, naphthimidazole, benzothiazole, naphthothiazole, benzoxazole, naphthoxazole, benzoselenazole, benzotellurazole, imidazole, oxazole, pyrrazole, triazole, thiadiazole, tetrazole, triazine, pyrimidine, pyridazine, pyrazine, pyridine, purine, quinoline and quinazoline rings. These hereto-aromatic rings may have a substituent selected from the group consisting of halogen (e.g., Br and Cl), hydroxy, amino, carboxy, alkyl groups (having at least 1 carbon atom, preferably 1 to 4 carbon atoms), and alkoxy groups (havin at least 1 carbon atom, preferably 1 to 4 carbon atoms). Illustrative, non-limiting examples of the mercapto-substituted heteroaromatic compound include 2-mercaptobenzimidazole, 2-mercaptobenzoxazole, 2-mercaptobenzothiazole, 2-mercapto-5-methylbenzimidazole, 6-ethoxy-2-mercaptobenzothiazole, 2,2'-dithiobis(benzothiazole), 3-mercapto-1,2,4-triazole, 4,5-diphenyl-2-imidazolethiol, 2-mercaptoimidazole, 1-ethyl-2-mercaptobenzimidazle, 2-mercaptoquinoline, 8-mercaptopurine, 2-mercapto-4(3H)-quinazolinone, 7-trifluoromethyl-4-quinoline thiol, 2,3,5,6-tetrachloro-4-pyridinethiol, 4-amino-6-hydroxy-2-mercaptopyrimidine monohydrate, 2-amino-5-mercapto-1, 3,4-thiadiazole, 3-amino-5-mercapto-1,2,4-triazole, 4-hydroxy-2-mercaptopyrimidine, 2-mercaptopyrimidine, 4,6-diamino-2-mercaptopyrimidine, 2-mercapto-4-methylpyrimidine hydrochloride, 3-mercapto-5-phenyl-1,2, 4-triazole, and 2-mercapto-4-phenyloxazole.

These mercapto compounds are preferably added to the emulsion layer in amounts of 0.00 lto 1.0 mol. more preferably 0.0 1 to 0.3 mol per mol of silver.

In the photosensitive layer according to the invention, polyhydric alcohols (for example, glycerins and diols of the type described in U.S. Pat. No. 2,960,404), fatty acids and esters thereof as described in U.S. Pat. Nos. 2,588,765 and 3,121,060, and silicone resins as described in UKP 955,061 may be used as a plasticizer and lubricant.

A super contrast enhancer can be used for forming super contrast images, which are hydrazine derivatives described in U.S. Pat. No. 5,464,738, U.S. Pat. No. 5,496,695, U.S. Pat. No. 6,512,411, U.S. Pat. No. 5,536,622, Japanese Patent Application 7-228627, 8-215822, 8-130842, 8-148113, 8-156378, 8-148111,8-148116, the compounds having quaternary nitrogen atom described in Japanese Patent Application 8-83566, and acrylonitrile compounds described in U.S. Pat. No. 5,545,515. Illustrative of the compounds are Compounds 1 to 10 in U.S. Pat. No. 5,464,736, II-1 to II-28 in U.S. Pat. No. 5,496,695, I-1 to I-86 in Japanese Patent Application 8-215822, II-1 to II-62 in Japanese Patent Application 8-130842, I-1 to I-21 in Japanese Patent Application 8-148113, 1 to 50 in Japanese Patent Application 8-148111, 1 to 40 in Japanese Patent Application 8-148116, P-1 to P-26 and T-1 to T-18 in Japanese Patent Application 8-83566, CN-1 to CN-13 in U.S. Pat. No. 5,545,515, etc.

A contrast enhancing accelerator can be used together with the super contrast enhancer in order to form super contrast images. Illustrative of the contrast enhancing accelerators are amine compounds, e.g. Am-1 to Am-5 described in U.S. Pat. No. 5,545,505, hydroxamic acids, e.g. HA-1 to HA-11 described in U.S. Pat. No. 5,545,507, acrylonitriles, e.g. CN-1 to CN-13 described in U.S. Pat. No. 5,545,507, hydrazine compounds, e.g. CA-1 to CA-6 described in U.S. Pat. No. 5,558,983, onium salts, e.g. A-1 to A-42, B-1 to B-27, C-1 to C-14 described in Japanese Patent Application 8-132836, etc.

The synthesis, blending, and amount of the super contrast enhancer and contrast enhancing accelerator can be carried out as disclosed in the above patents.

A surface protective layer may be provided in the photosensitive material according to the present invention for the purpose of preventing adhesion of an image forming layer.

The binder of the surface protective layer may be any polymer, preferably to contain a polymer having carboxylic acid residue in an amount of 100 mg/m$^2$ to 5 g/m$^2$. Illustrative of the polymers containing carboxyl residue are natural polymers (Gelatine, alginic acid, etc.), modified natural polymers (carboxymethyl cellulose, phthalated gelatin, etc.), synthetic polymers (polymethacrylate, polyacrylate, polyalkylmethacrylate/acrylate copolymer, polystyrene/polymethacrylate copolymer, etc.) and the like. A preferable carboxyl residue content of the polymer is 10 mmole to 1.4 mole per 100 g polymer. The carboxylic acid residue may be in a salt of alkali metal ion, alkaline earth metal ion, organic cation or the like.

The surface protective layer may be formed of any adhesion-preventing material. Examples of the adhesion-preventing material include wax, silica particles, styrene-containing elastomeric block copolymers (e.g., styrene-butadiene-styrene and styrene-isoprene-styrene), cellulose acetate, cellulose acetate butyrate, cellulose propionate and mixtures thereof.

In the emulsion layer or a protective layer therefor according to the invention, there may be used light absorbing substances and fiter dyes as described in U.S. Pat. Nos. 3,253,921, 2,274,782, 2,527,583, and 2,956,879. The dyes may be mordanted as described in U.S. Pat. No. 3,282,699. The filter dyes are preferably used in such amounts as to provide an absorbance of 0.1 to 3, more preferably 0.2 to 1.5 at the exposure wavelength.

FIGS. 1 through 7 are partial sections illustrating a layer construction of a packaging material for a photographic photosensitive material of the invention.

The packaging material for a photographic photosensitive material of FIG. 1 is a single layer film consisting of a conductive light-shielding thermoplastic resin film layer 1a.

Figure 2:
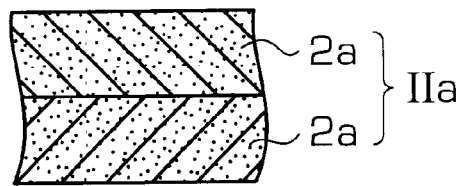

The packaging material for a photographic photosensitive material of FIG. 2 is a coextruded double layer film 1a consisting of a conductive light-shielding thermoplastic resin film layer la and a thermoplastic resin film layer 2a containing a light-shielding material.

Figure 3:
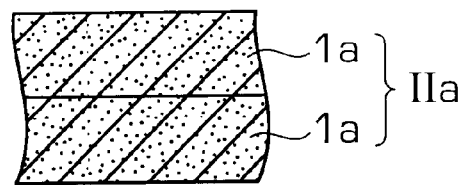

The packaging material for a photographic photosensitive material of FIG. 3 is a coextruded double layer film Ia consisting of two conductive light-shielding thermoplastic resin film layers 1a, 1a.

Figure 4:
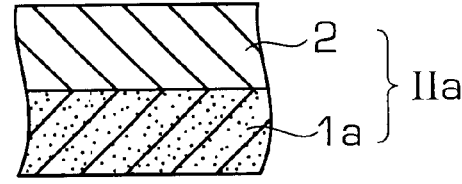

The packaging material for a photographic photosensitive material of FIG. 4 is the same as the film of FIG. 2, except that the thermoplastic resin film layer 2 does not contain a light-shielding material.

Figure 5:
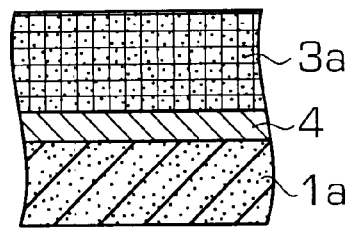

The packaging material for a photographic photosensitive material of FIG. 5 is a laminated film consisting of the above conductive light-shielding Athermoplastic resin film layer la and a flexible sheet layer 3a containing a light-shielding material laminated through an adhesive layer 4.

Figure 6:
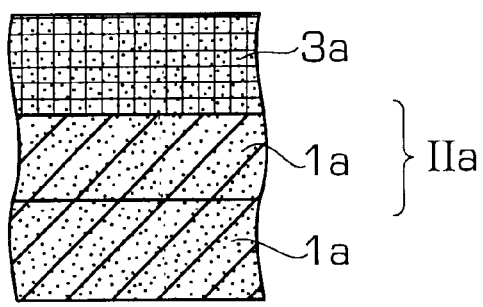

The packaging material for a photographic photosensitive material of FIG. 6 is a coextruded triple layer film IIIa consisting of two conductive light-shielding thermoplastic resin film layers 1a, 1a and a flexible sheet 3a containing a light-shielding material.

Figure 7:
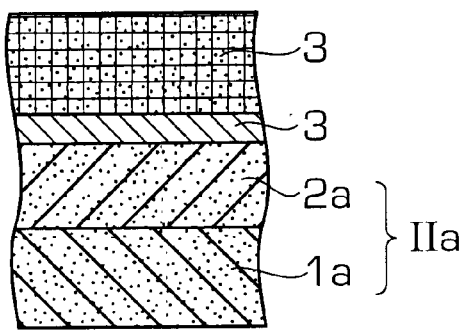

The packaging material for a photographic photosensitive material of FIG. 7 is a laminated film consisting of a coextruded double layer film IIa consisting of a conductive light-shielding thermoplastic resin film layer 1a and a thermoplastic resin film layer 2a containing a light-shielding material and a flexile sheet 3 not containing a light-shielding material laminated on the thermoplastic resin film layer 2a side through an adhesive layer 4.

Some packaging bags of a photographic photosensitive material are shown in FIGS. 8 through 11.

Figure 8:
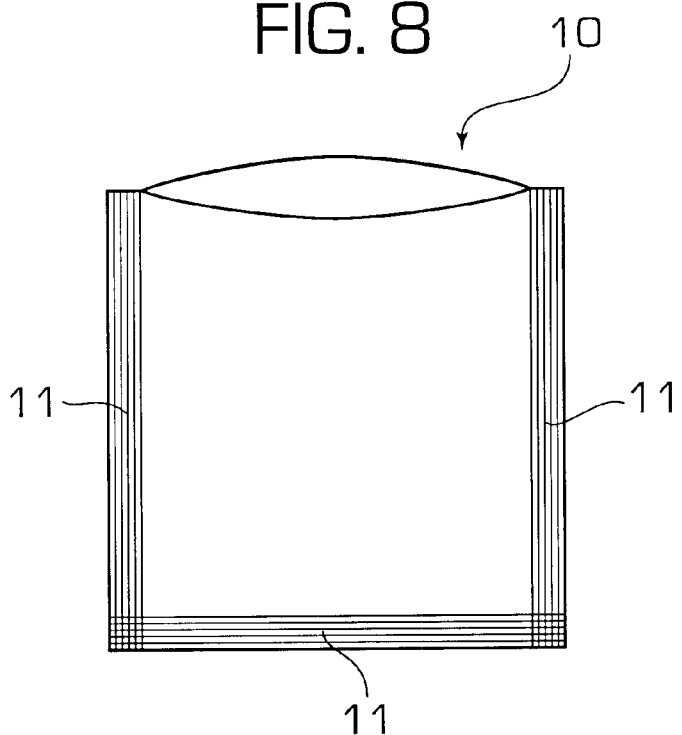
FIGS. 8 through 11 are plan views of a package of a photographic photosensitive material of the invention, respectively.

The packaging bag of FIG. 8 is a three-sided fin seal bag having heat-sealed portions 11 on both sides and bottom. A sealed package is made by inserting a photographic photo-sensitive material through the opening, folding the opening to seal, and fixing the folded portion by an adhesive tape, such as cellophane tape.

Figure 9:
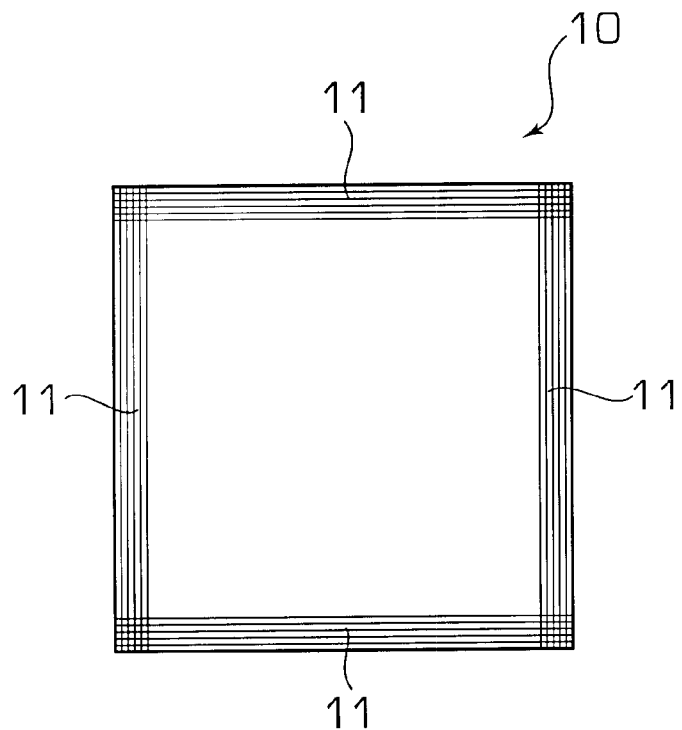

The packaging bag of FIG. 9 is a four.sided fin seal bag having heat-sealed portions 11 on both sides, bottom and top.

Figure 10:
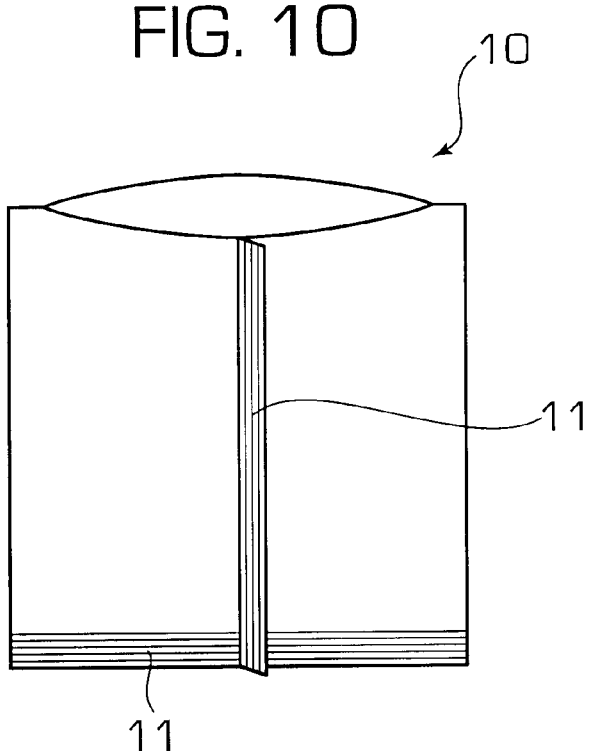

The packaging bag of FIG. 10 is a center fin seal bag having heat-sealed portions 11 at the center and bottom. A sealed package is made by inserting a photographic photo-sensitive material through the opening, folding the opening to seal, and fixing the folded portion by an adhesive tape, such as cellophane tape.

Figure 11:
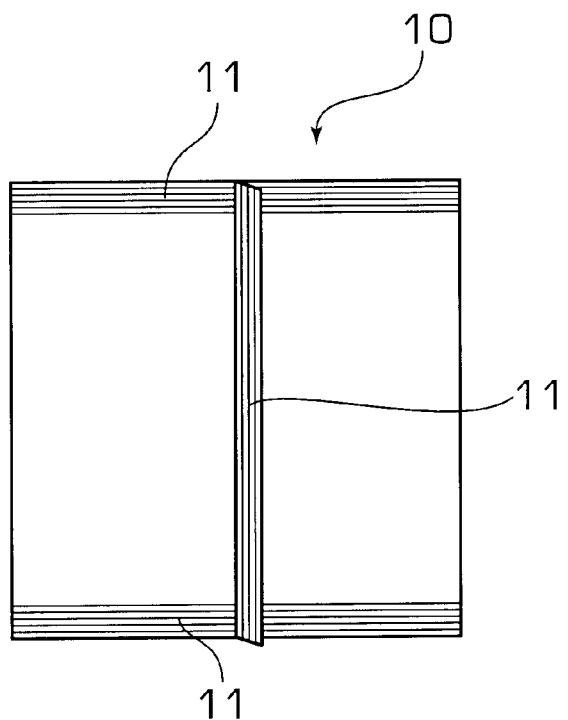

The packaging bag of FIG. 11 is also a center fin seal bag having heat-sealed portions 11 at a center, bottom and top.

Figure 12:
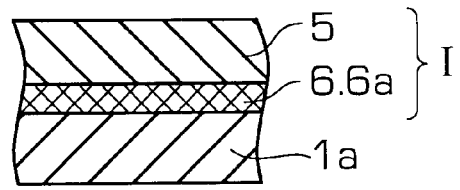
FIGS. 12 though 18 are partial sectional views illustrating layer construction of the packaging material for photographic photosensitive material of the invention further comprising a deposited thermoplastic resin film layer, respectively.

FIGS. 12 though 18 are partial sectional views illustrating layer construction of the packaging material for photographic photosensitive material of the invention further comprising a deposited thermoplastic resin film layer, respectively.

The packaging material for a photographic photosensitive material of FIG. 12 consists of a conductive light-shielding thermoplastic resin film layer 1a and a deposited thermoplastic resin film layer 1 consisting of a Young's modulus thermoplastic resin film layer 5 not containing a light-shielding material and a deposited membrane 6,6a directly laminated thereto.

Figure 13:
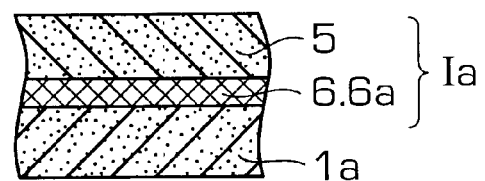

The packaging material for a photographic photosensitive material of FIG. 13 is the same as the packaging material of FIG. 12, except that the Young's modulus thermoplastic resin film layer 5a contains a light-shielding material.

Figure 14:
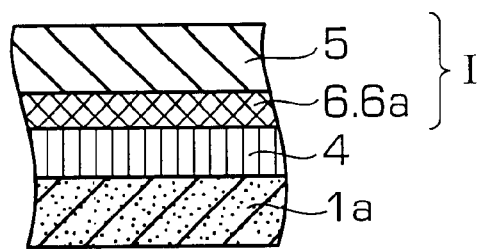

The packaging material for a photographic photosensitive material of FIG. 14 is the same as the packaging material of FIG. 12, except that the depostied thermoplastic resin film layer I is laminated through an adhesive layer 4.

Figure 15:
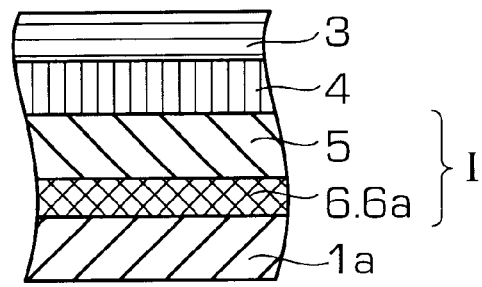

The packaging material for a photographic photosensitive material of FIG. 15 consists of the packaging material of FIG. 12 and a flexible sheet layer 3 laminated on the side of the Young's modulus thermoplastic resin film layer 5 through an adhesive layer 4.

Figure 16:
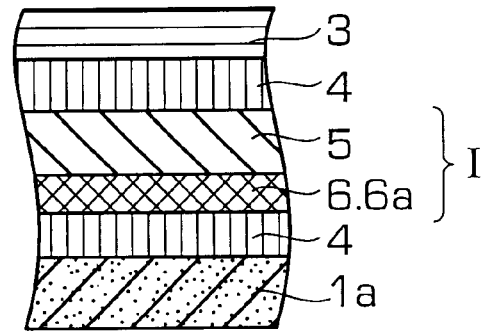

The packaging material for a photographic photosensitive material of FIG. 16 consists of the packaging material of FIG. 14 and a flexible sheet layer 3 laminated on the side of the Young's modulus thermoplastic resin film layer 5 through an adhesive layer 4.

Figure 17:
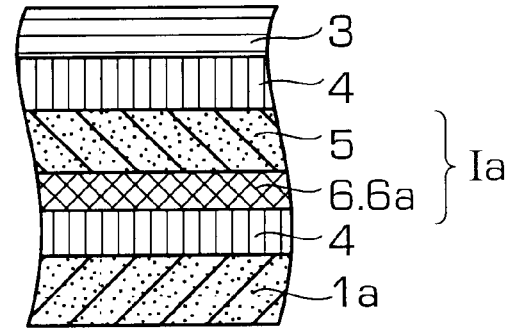

The packaging material for a photographic photosensitive material of FIG. 17 is the same as the packaging material of FIG. 16, except that the Young's modulus thermoplastic resin film layer 5a contains a light-shielding material.

Figure 18:
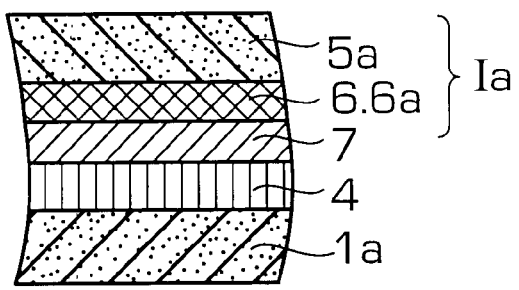

The packaging material for a photographic photosensitive material of FIG. 18 consists of a conductive light-shielding thermoplastic resin film layer, an intermediate layer 7 laminated through an adhesive layer 4 and a deposited thermoplastic resin film layer 1a directly laminated to the intermediate layer 7.

FIGS. 19 through 30 are partial sectional views illustrating layer construction of the packaging material for photographic photosensitive material of the invention comprising a thermoplastic resin film layer and two layers of the conductive light-shielding thermoplastic resin film layer located on both sides thereof.

Figure 19:
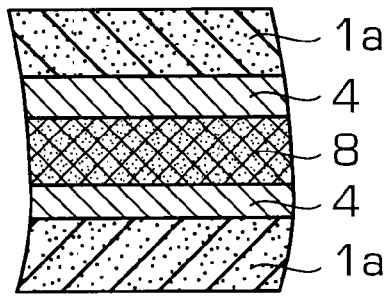
FIGS. 19 through 30 are partial sectional views illustrating layer construction of the packaging material for photographic photosensitive material of the invention comprising a thermoplastic resin film layer and two layers of the conductive light-shielding thermoplastic resin film layer located on both sides thereof.

The packaging material for a photographic photosensitive material of FIG. 19 consists of an inner conductive light-shielding thermoplastic resin film layer 1a, an intermediate thermoplastic resin layer 8a containing a light-shielding material, and an outer conductive light-shielding thermoplastic resin film layer 1a, laminated in this order each through an adhesive layer 4.

Figure 20:
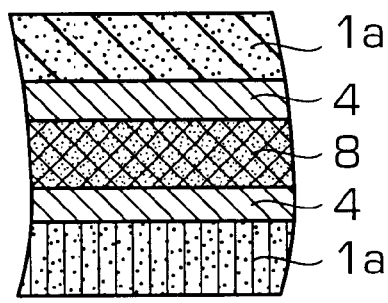

The packaging material for a photographic photosensitive material of FIG. 20 is the same as the packaging material of FIG. 19, except that the intermediate thermoplastic resin layer 8 does not contain a light-shielding material.

Figure 21:
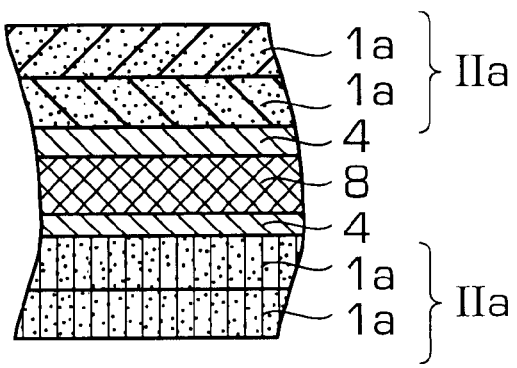

The packaging material for a photographic photosensitive material of FIG. 21 is in the packaging material of FIG. 19, that the conductive light-shielding thermoplastic resin film layers 1a of both of the inner layer and the outer layer are replaced by coextruded light-shielding double layer films 1a consisting of two conductive light-shielding thermoplastic resin film layers 1a, 1a.

Figure 22:
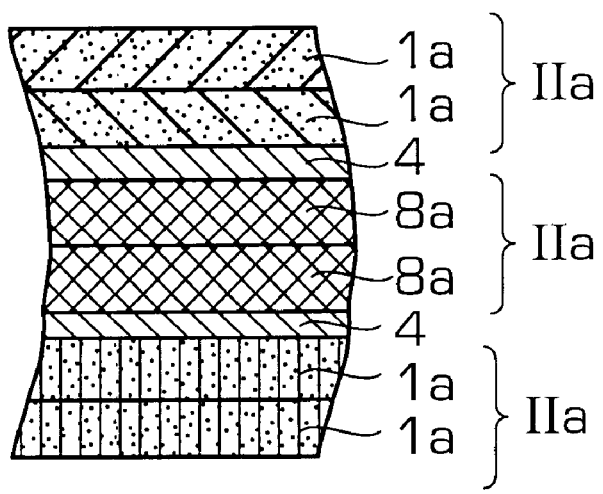

The packaging material for a photographic photosensitive material of FIG. 22 is in the packaging material of FIG. 21 that the intermediate thermoplastic resin layer 8a is replaced by a coextruded light-shielding double layer film IIa consisting of two intermediate thermoplastic resin layers 8a, 8a.

Figure 23:
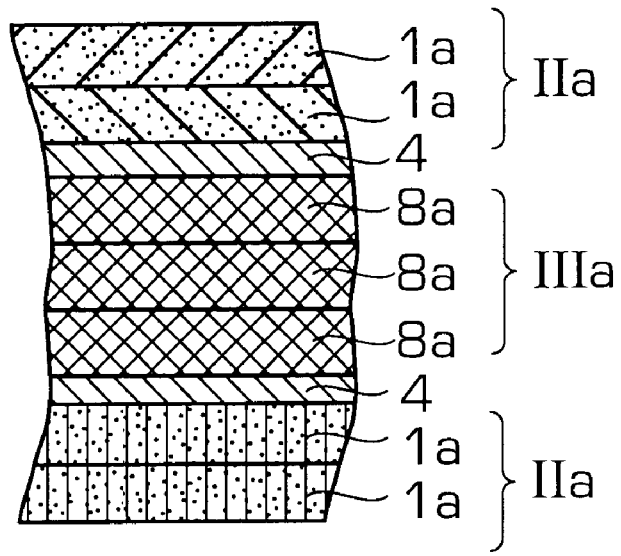

The packaging material for a photographic photosensitive material of FIG. 23 is in the packaging material of FIG. 21 that the intermediate thermoplastic resin layer 8a is replaced by a coextruded light-shielding triple layer film IIIa consisting of three intermediate thermoplastic resin layers 8a, 8a, 8a.

Figure 24:
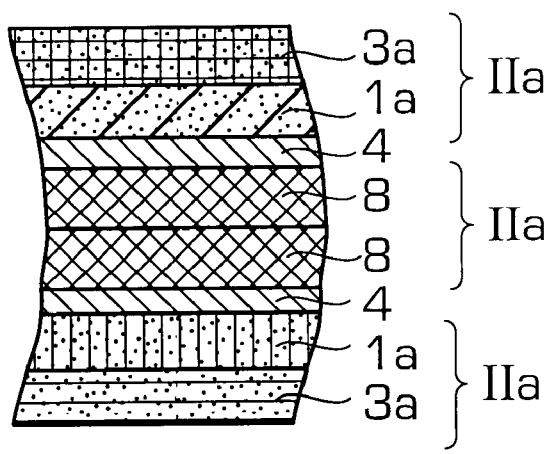

The packaging material for a photographic photosensitive material of FIG. 24 is in the packaging material of FIG. 22 that the conductive light-shielding thermoplastic resin film layers 1a, 1a on the surface side of both of the coextruded light-shielding double layer films IIa, IIa are replaced by flexible sheet layers 3a, 3a containing a light-shielding material.

Figure 25:
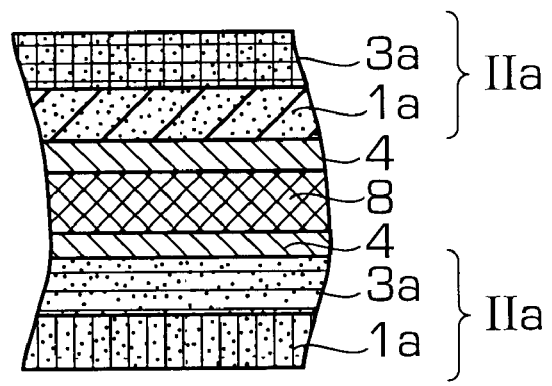

The packaging material for a photographic photosensitive material of FIG. 25 consists of a coextruded light-shielding double layer film IIa consisting of an inner conductive light-shielding thermoplastic resin film layer 1a and a flexible sheet layer 3a containing a light-shielding material, an intermediate thermoplastic resin layer 8, and a coextruded light-shielding double layer film IIa consisting of an outer conductive light-shielding thermoplastic resin film layer 1a and a flexible sheet layer 3a containing a light-shielding material, laminated in this order each through an adhesive layer 4.

Figure 26:
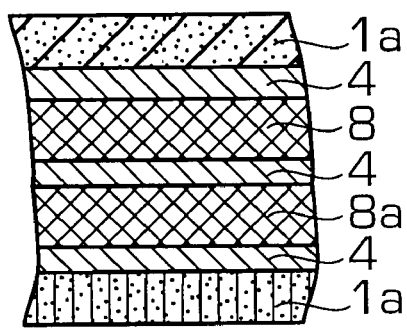

The packaging material for a photographic photosensitive material of FIG. 26 consists of an inner conductive light-shielding thermoplastic resin film layer 1a, an intermediate thermoplastic resin layer 8a containing a light-shielding material, an intermediate thermoplastic resin layer 8a not containing a light-shielding material, and an outer conductive light-shielding thermoplastic resin film layer 1a, laminated in this order each through an adhesive layer 4.

Figure 27:
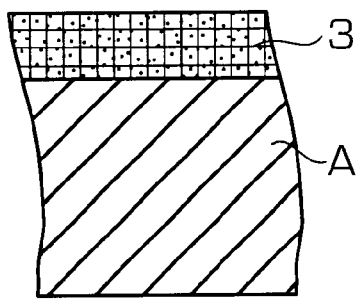

The packaging material for a photographic photosensitive material of FIG. 27 consists of a packaging material A as shown in FIGS. 19–26 and an outer flexible sheet layer 3 laminated directly thereto by melting, coating, printing or the like.

Figure 28:
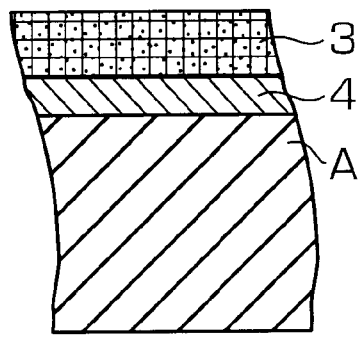

The packaging material for a photographic photosensitive material of FIG. 28 consists of a packaging material A as shown in FIGS. 19–26 and an outer flexible sheet layer 3 laminated through an adhesive layer 4.

Figure 29:
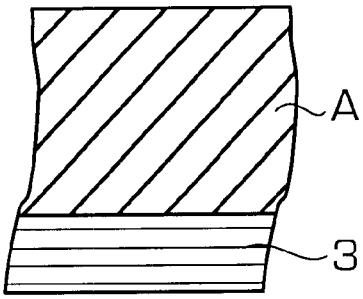

The packaging material for a photographic photosensitive material of FIG. 29, consists of a packaging material A as shown in FIGS. 19–26 and an inner flexible sheet layer 3 laminated directly thereto by melting, coating, printing or the like.

Figure 30:
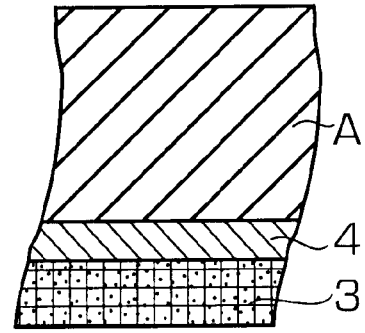

The packaging material for a photographic photosensitive material of FIG. 30 consists of a packaging material A as shown in FIGS. 19–26 and an inner flexible sheet layer 3 laminated through an adhesive layer 4.

The packaging material for a photographic photosensitive material of the invention has advantages that:

i) The dispersion of carbon black is improved to decrease the generation of lumps and microgrits and to raise light-shielding ability.

ii) Heat sealing properties (heat seal strength, elapsed heat seal strength, hot tack properties, etc. are improved.

iii) The degradation of physical strength is reduced, and accordingly, thinning of the packaging material is possible compared with conventional packaging materials.

iv) Since compatibility with various thermoplastic resins is improved, recycling suitability and incineration suitability are improved.

v) Since the decrease of physical strength and film moldability are small even by incorporating conductive material in quantity, conductivity can be improved by blending conductive material in quantity.

vi) Low temperature resistance to bag rupture is improved.

The packaging material further comprising a deposited thermoplastic resin film layer has further advantages that:

vii) Photographic properties are particularly excellent, caused by omitting aluminum foil which is liable to contain denatured or thermal decomposition products of rolling oil produced during annealing which adversely affect photographic properties viii) Moistureproofness and oxygen barrier are excellent.

ix) Long term sealing, light-shielding ability is excellent.

x) Gelbo test strength is excellent.

xi) Bag-making ability is excellent.

xii) It fits the container, Packaging Recycling law.

xiii) In expensive.

xiv) Transparency, translucency can be ensured.

xv) Easy openability can be ensured.

xvi) Dust-free ability is excellent.

xvii) Resistance to curling is excellent.

In the packaging material comprising a deposited thermoplastic resin film layer and two conductive light-shielding thermoplastic resin film layers located on both sides thereof, when using recycle resin produced by palletizing the whole packaging material of the invention for the intermediate thermoplastic resin layer, thinning by 10% or more is possible, because of being excellent in antistatic ability, moistureproofness, photographic properties, the dispersion of carbon black, light-shielding ability and film moldability. When using oxygen barrier thermoplastic resin for the intermediate thermoplastic resin layer, physical strength and oxygen barrier are improved, and a high photographic speed photosensitive material having a photographic speed of ISO 400 or more can be stored 2 years or more with good quality.

EXAMPLES

Example 1

The packaging material of Example 1 is a single layer packaging material for a photographic photosensitive material consisting of the conductive light-shielding thermoplastic resin film layer.

The resin composition used consisted of 15 wt. % propylene-ethylene copolymer elastomer having a butene-1 content of 40 mol %, a MFR of 3 g/10 minutes and a crystallinity measured by the X-ray diffraction method of 8%, 20 wt. % homopolyethylene resin having a MFR of 2.5 g/10 minutes, a crystallinity measured by the X-ray diffraction method of 68% and a density of 0.925 g/cm$^3$ produced by the high pressure radical polymerization process, 47.7 wt.

% ethylene-hexene-1 random copolymer resin having an MFR of 4 g/10 minutes, a density of 0.915 g/cm³, a crystallinity measured by the X-ray diffraction method of 35% and a hexene-1 content of 6 mol % produced by using metallocene catalyst (main component: zirconium compound), 15 wt. % acetylene black having a sulfur content of 0.02%, 0.2 wt. % zinc stearate and 0.05 wt. % bis fatty amide as lubricant, 0.05 wt. % tetrakis [methylene-3-(3,5-di-t-butyl-4-hydroxyphenyl) propionate]methane as hindered phenolic antioxidant, and 2 wt. % nonionic anti-static agent masterbatch ("Elestmaster LL-10", Kao).

The above resin composition was molded into a single layer conductive light-shielding thermoplastic resin film 80 μm in thickness by the inflation film molding process. Inflation film molding conditions:

Cooling:Air cooling (20° C.)

Screw:Mixing type

L/D:25

Lip clearance:1.0 mm

Blowratio:1.5

Resin temperature:175° C.

Draw ratio:8

Example 2

The packaging material of Example 2 is a single layer packaging material for a photographic photosensitive material consisting of the conductive light-shielding thermoplastic resin film layer.

The resin composition used consisted of 15 wt. % ethylene-butene-1 random copolymer elastomer having a MFR of 5 g/10 minutes, a density of 0.890 g/cm³ and a crystallinity measured by the X-ray diffraction method of 16%, 25 wt. % homopolyethylene resin having a MFR of 20 g/10 minutes, a crystallinity measured by the X-ray diffraction method of 63% and a density of 0.920 g/cm³, 44.8 wt. % ethylene-hexene-1 random copolymer resin having an MFR of 2.5 g/10 minutes, a density of 0.920 g/cm³, a crystallinity measured by the X-ray diffraction method of 46%, 15 wt. % acetylene black and 0.2 wt. % zinc stearate.

The above resin composition was molded into a single layer conductive light-shielding thermoplastic resin film 80 μm in thickness by the inflation film molding process. The inflation film molding conditions are the same as Example 1.

Comparative Example 1

The resin composition used consisted of 25 wt. % homopolyethylene resin having a MFR of 20 g/10 minutes, a crystallinity measured by the X-ray diffraction method of 63% and a density of 0.920 g/cm³, 59.8 wt. % ethylene-hexene-1 random copolymer resin having an MFR of 2.5 g/10 minutes, a density of 0.920 g/cm³, a crystallinity measured by the X-ray diffraction method of 46% and a hexene-1 content of 6 mol %, 15 wt. % the same acetylene black as Example 1 and 0.2 wt. % calcium stearate.

The above resin composition was molded into a single layer light-shielding polyolefin resin film 80 μm in thickness by the inflation film molding process. The inflation film molding conditions are the same as Example 1.

Comparative Example 2

The packaging material of this example was a single layer light-shielding polyolefin resin film 80 μm in thickness which is the same as Example 1, except that three resins in the total content of 82.7 wt. % was replaced by 82.7 wt. % low density homopolyethylene resin having a crystallinity measured by the X-ray diffraction method of 68%, a MFR of 2.5 g/10 minutes and a density of 0.925 g/cm³.

The packaging material of Example 1 and Example 2 were excellent in the dispersion of acetylene black compared with comparative Example 1 and Comparative Example 2, and the generation of lumps and microgrits was remarkably less than the comparative examples.

Example A

The packaging material of this example was a coextruded light-shielding double layer inflation film IIa consisting of a conductive light-shielding thermoplastic resin film layer 1a and a light-shielding thermoplastic resin film layer 2a, corresponding to FIG. 2.

The conductive light-shielding thermoplastic resin film layer 1a was composed of the same polyolefin resin composition as Example 1, and had a thickness of 50 μm.

The light-shielding thermoplastic resin film layer 2a was composed of 60 wt. % high density polyethylene resin having a MFR of 0.05 g/10 minutes, a density of 0.951 g/cm³, a molecular weight distribution of 25, a crystallinity measured by the X-ray diffraction method of 79%, 10 wt. % homopolyethylene resin having a density of 0.920 g/cm³, a MFR of 20 g/10 minutes and a crystallinity measured by the X-ray diffraction method of 66%, 24.8 wt. % ethylene-hexene-1 copolymer resin having a MFR of 4.0 g/10 minutes, and a crystallinity measured by the X-ray diffraction method of 40% produced by the vapor phase process using a single site catalyst, 5 wt. % acetylene black, 0.15 wt. % calcium stearate, and 0.05 wt. % hindered phenolic antioxidant, and had a thickness of 30 μm.

The packaging material composed of the coextruded light-shielding double layer inflation film IIa 80 μm in thickness were superior to the packaging materials composed of a single layer light-shielding low crystallinity resin film 80 μm in thickness of Examples 1, 2 in bag rupture strength, light-shielding ability, film moldability, appearance, bag-making properties and sealing bag-making properties and melt fracture (irregular streaks formed on the film surface) was not generated, even raising molding speed, and productivity is excellent. Furthermore, since the polyolefin resin composition was stable against heat and had light-shielding ability, the packaging material was excellent in photographic properties and recycling suitability.

Examnple B

The packaging material of this example was coextruded a light-shielding double layer inflation film IIa consisting of two conductive light-shielding thermoplastic resin film layers 1a, 1a corresponding to FIG. 3.

Each of the conductive light-shielding thermoplastic resin film layer 1a, 1a was composed of the same polyolefin resin composition as Example 2, and had a thickness of 40 μm.

Although the packaging material composed of the coextruded light-shielding double layer inflation film IIa 80 μm in thickness had the same resin composition and thickness as Example 2, since the packaging material was the coextruded double layer inflation film composed of two film layers each 40 μm in thickness, no inspection continuous molding is possible, because, when pinholes or thinning is generated on one film layer, they are compensated by the other layer to prevent thinning and reduction of light-shielding ability. The blow speed of resin composition entering a ring die orifice becomes a half of Example 2, and parallel flow lines are easily formed in a die land. As a result, melt fracture did not occur at all. Thus, the molded film was excellent in uneven gloss, appearance, and had a high market value. The film productivity was improved caused by the improvement in film moldability and film molding speed.

Furthermore, abrasion and pressure marks did not occur on photographic photosensitive material at all, and unexpectedly, light-shielding ability and physical strength were superior to Example 2. Since melt fracture did not occur even by lowering resin temperature than Example 2 by 10° C. or more, complete sealing was possible even by decreasing heat sealing temperature. By lowering resin temperature, thermal deterionration and thermal decomposition of resin and additives were sharply decreased to decrease aldehyde compounds which induce noxious odor and adverse affects upon photographic properties. Thus, the packaging material of this example has less odor and excellent photographic properties Examnple 3

The packaging material of this example corresponds to FIG. 14.

The conductive light-shielding thermoplastic resin film layer 1*a* was composed of a polyethylene-based resin composition consisting of 100 parts by weight of a polyethylene-based resin consisting of 60 parts by weight of low density homopolyethylene resin having a density of 0.920 g/cm$^3$ and a MFR of 2.5 g/10 minutes and 40 parts by weight of very low density ethylene-hexene-1 copolymer elastomer having a density of 0.870 g/cm$^3$, a MFR of 5.0 g/10 minutes, a crystallinity of 12% and a molecular weight distribution of 2.5 produced by the vapor phase process using a metallocene compound containing quadrivalent transition metal zirconium as the polymerization catalyst, 20 parts by weight of acetylene black as the conductive material, 0.1 part by weight of calcium stearate and 0.05 part by weight of erucic amide as the lubricant, 0.1 part by weight of A-type synthetic zeolite as the antiblocking agent, 0.05 part by weight of tetrakis[methylene-3-(3,5-di-t-butyl-4-hydroxyphenyl) propionate]methane and 0.1 part by weight of tocophenol dimer as the hindered phenol antioxidant, and 0.2 part by weight of a hydrotalcite compound as the halogen gas neutralizer. The resin composition was prepared by blending masterbatch pellets composed of 40 parts by weight of the acetylene black and 60 parts by weight of the very low density ethylene-hexene-1 copolymer elastomer with the low density homopolyethylene resin pellets for dilution using an automatic weighing mixer. The conductive light-shielding themoplastic resin film layer 1*a* was molded by the inflation molding process using a single shaft extruder having a L/D of 25 under the molding conditions of a lip clearance of a ring die of 1.2 mm, a resin temperature of 185° C. and a draw ratio of 20, and had a thickness of 60 μm and a volume resistivity of 1.1×10$^6$ Ω·cm.

The Young's modulus thermoplastic resin film layer 5 of the deposited thermoplastic resin film layer 1 was a biaxially stretched coextruded triple layer polyethylene terephthalate resin film 12 μm in thickness composed of a base layer which was a high melting point polyethylene terephthalate resin film 12 μm in thickness and two surface layers of low melting point polyethylene terephthalate resin films, and had been stretched 4.5 times in the longitudinal direction 5.5 times in the lateral direction.

After treating with corona discharge the Young's modulus thermoplastic resin film layer 5 was allowed to travel through an electron beam heating type vacuum deposition apparatus provided with a 100 KW electron gun, to form an inorganic deposited membrane 6 having a thickness of 25 nm composed of 55 parts by weight of silicon dioxide and 45 parts by weight of aluminum oxide.

The above deposited thermoplastic resin film layer 1 had a Young's modulus in the longitudinal direction of 450 kg/mm$^2$, a Young's modulus in the lateral direction of 570 kg/mm$^2$, a moisture permeability (measured according to JIS Z 0208, condition B, at 40±0.5° C., at 90±2% RH) of 1.3 g/m$^2$·24 hours, and an oxygen permeability measured according to JIS K 7126, at 20° C., at 0% RH) of 2.0 ml/m$^2$·24 hours.

On the inorganic deposited membrane 6, two component-type polyurethane-based adhesive (Takeda Pharmacenticals) was applied by dry lamination to form an adhesive layer 4 having a thickness of 5 g/m$^2$. The conductive light-shielding thermoplastic resin film layer 1*a* 60 μm in thickness was laminated to the adhesive layer 4 by dry lamination, and aged for 3 days to obtain a packaging material for a photographic photosensitive material composed of the moistureproof oxygen barrier light-shielding laminated film.

The packaging material was superior to conventional packaging materials in moistureproofness, oxygen barrier, antistatic properties, light-shielding ability, heat sealing properties, physical strength, dust free ability, bag-making properties, appearance, the dispersion of carbon black, incineration suitability, photographic properties, and the like. Particularly, sealing, light-shielding bags made by the packaging material for silver halide photographic photosensitive materials containing additives having sensitizing function, such as gold sensitizing, dye sensitizing or selenium sensitizing, could keep good qualities for 2 years or more, and were particularly suitable therefor.

The packaging material was very excellent in the dispersion of light-shielding materials and conductive materials, and the equal light-shielding ability could be obtained even by decreasing the blending amount of light-shielding material by 15 wt. % or more. The equal antistatic ability could be obtained even by decreasing conductive material by 10 wt. % or more.

Example 4

The packaging material of this example corresponds to FIG. 14.

The Young's modulus thermoplastic resin film layer 5 was a biaxially stretched nylon 6 film 15 μm in thickness produced by supplying nylon 6 resin produced from ε-caprolactum as the principal raw material after vacuum drying at 185° C. to a single shaft extruder having a L/D of 25, extruding from a T die in a melted state at 255° C., casting on a cooling drum to form a drawn film, stretching by the sequential biaxial stretching using a tenter in the longitudinal direction 3.5 times at 50° C., and then, in the lateral direction 4.5 times at 125° C., and then heat-setting at 225° C.

After treating with corona discharge, to the biaxially stretched nylon 6 resin film, an anchor coat layer 0.15 μm in thickness composed of a mixture of two component-type polyester coating agent and an isocyanate crosslinking agent. On the anchor coat layer, the same inorganic deposited membrane 25 nm in thickness was formed by the same method as Example 3.

The above deposited thermoplastic resin film layer 1 had a Young's modulus in the longitudinal direction of 155 kg/mm$^2$, a Young's modulus in the lateral direction of 135 kg/mm$^2$, a moisture permeability (measured according to JIS Z 0208, condition B, 40±0.5° C., at 90±2% RH) of 6 g/m²·24 hours, and an oxygen permeability measured according to JIS K 7126, at 20–C, at 0% RH) of 1.1 ml/m²·24 hours.

The conductive light-shielding thermoplastic resin film layer 1a and the adhesive layer 4 were the same as Example 3.

The packaging material was superior to the packaging material of Example 3 is oxygen barrier, Gelbo test strength, and bag rupture strength, and was particularly preferable as a packaging material for a photographic photosensitive material.

Example 5

The packaging material of this example had a seven layer construction 80 μm in thickness, as shown in FIG. 21.

The outer conductive thermoplastic resin layer 1 a 10 μm in thickness composed of a light-shielding conductive polyolefin resin composition consisting of 100 parts by weight of polyolefin resin consisting of 40 parts by weight of high density polyethylene resin having a MFR of 0.6 g/10 minutes, a density of 0.950 g/cm³, a molecular weight distribution of 12 and a crystallinity of 80% produced by using Ziegler catalyst, 40 parts by weight of ethylene-hexene-1 copolymer resin having a MFR of 4 g/10 minutes, a density of 0.920 g/cm³, a crystallinity of 48% and a molecular weight distribution of 2.5 produced by the vapor phase process using metallocene catalyst and 20 parts by weight of low crystallinity ethylene-butene-1 copolymer elastomer having a MFR of 3 g/10 minutes, a density of 0.900 g/cm³, a molecular weight distribution of 2.1 and a crystallinity of 25%, 15 parts by weight of acetylene carbon black having a DBP oil absorption value of 168 cc/100 g, a mean particle size of 40 mμ, pH 7.0, a free sulfur content of 0.02% and a volatile components content of 0.2%, 5 parts by weight of surface-coated titanium dioxide, 0.2 part by weight of calcium stearate, 0.1 part by weight of polydimethylsiloxane having a viscosity at 25° C. of 20,000 centistokes, 0.1 part by weight of octadecyl-3-(3,5-di-t-butyl-4-hydroxyphenyl) propionate having a molecular weight of 530, and 1 part by weight of synthetic A-type zeolite having a specific surface area of 170 m²/g and a mean particle size of 1 mμ and carrying silver ions.

The intermediate thermoplastic resin layer 8a 20 μm in thickness composed of a polyolefin resin composition consisting of 100 parts by weight polyolefin resin consisting of 35 parts by weight of high density polyethylene resin having a MFR of 0.06 g/10 minutes, a density of 0.951 g/cm³, a molecular weight distribution of 25 and a crystallinity of 70% produced by using Ziegler catalyst, and 65 parts by weight of ethylene-butene-1 copoymer resin having a MFR of 2 g/10 minutes, a density of 0.920 g/cm³, a molecular weight distribution of 3.7 and a crystallinity of 51% produced by using Ziegler catalyst, 3 parts by weight of furnace carbon black having a DBP oil absorption value of 124 cc/100 g, a mean particle size of 20 nm (mμ), pH 8.4, a free sulfur content of 0.05% and a volatile components content of 0.8%, 0.1 part by weight of calcium stearate, 0.05 part by erucic amide, 0.1 part by weight of hindered phenolic antioxidant ("Irganox 1010", Ciba Geigy) and 0.5 part by weight of synthetic silica.

The inner conductive thermoplastic resin layer 1a 10 μm in thickness was the same as the outer conductive thermoplastic resin layer 1a, except of changing the amount of the high density polyethylene resin from 40 parts by weight to 10 parts by weight and the amount of the ethylene-hexene-1 copolymer resin from 40 parts by weight to 70 parts by weight. The type of the resins, the additives and their amounts were unchanged.

The adhesive layers 4 were high pressure process low density homopolyethylene resin layers 10 μm in thickness.

The packaging material of this example was excellent in film moldability, antistatic properties, light-shielding ability, physical strength, appearance, recycling suitability, heat sealing properties, sealability, bag rupture strength, the dispersion of carbon black, incineration suitability and moistureproofness, and it could be used for the packaging material for a high speed photographic photosensitive material of ISO photographic speed of 100 or more, as it is. Compared with conventional packaging materials for a photographic photosensitive material having a metal layer, manufacturing cost could be decreased by 30% or more, and the thickness could be thinned from 130 μm to 80 μm.

By palletizing the whole body of the packaging material and recycling to the intermediate thermoplastic resin layer 8a, blending suitability, antistatic properties and light-shielding ability could be further improved.

Example 6

The packaging material of this example had a five layer construction 50 μm in thickness, as shown in FIG. 20.

The inner conductive light-shielding thermoplastic resin film layer 1a and the outer conductive light-shielding thermoplastic resin film layer 1a were same as Example 5.

The intermediate thermoplastic resin layer 8 was a biaxially stretched resin film layer 10 μm in thickness composed of nylon 6 resin as the principal component, and had oxygen barrier ability.

The adhesive layer 4 was formed of modified ethylene-α-olefin copolymer resin produced of ethylene-4-methylpentene-1 copolymer resin having a MFR of 2 g/10 minutes, a density of 0.935 g/cm³, a molecular weight distribution of 3.7 and a crystallinity of 58% modified by grafting 0.3 wt. % maleic anhydride in a melted state, had a thickness of 10 μm.

The packaging material of this example was superior to the packaging material of Example 5 in oxygen barrier, bag rupture strength, Gelbo test strength (resistance to pinholes), Young's modulus, impact puncture strength, and could keep the quality of a high speed photographic photosensitive material of ISO photographic speed of 400 or more and a photographic photosensitive material using gold sensitizing or a sensitizing dye for 2 years or more.

By palletizing the whole body of the packaging material and recycling to the intermediate thermoplastic resin layer 8a, blending suitability, antistatic properties and light-shielding ability could be further improved.

Example 7

The packaging material of this example was the same as the packaging material of Example 5, except that the outer conductive light-shielding thermoplastic resin film layer 1a was used as the inner conductive light-shielding thermoplastic resin film layer 1a. That is, the packaging material of this example has a symmetric structure consisting the same two conductive light-shielding thermoplastic resin film layers 1a, 1a and the intermediate thermoplastic resin layer 8a interposed therebetween.

Since the packaging material of this example had the same conductive light-shielding thermoplastic resin film layers on both sides, losses and stocks could be decreased.

Manufacturing cost was inexpensive, and curling was rare. Physical strength was improved, and this packaging material was superior to Example 5, except heat sealing properties.

What is claimed is:

1. A packaging material for a photographic photosensitive material having a conductive light-shielding thermoplastic resin film layer which comprises a resin composition comprising 3 to 49 wt. % of an olefin-based thermoplastic elastomer having a crystallinity of 40% or less measured by the X-ray diffraction method, a melt flow rate of 0.5 to 20 g/10 minutes, a density of 0.87 to 0.91 g/cm$^3$, and a content of 16 mol % or more of α-olefin having 4 or more carbon atoms, 0.01 to 10 wt. % of lubricant, and 1 to 70 wt. % of carbon black which is acetylene carbon black or furnace carbon black.

2. The packaging material of claim 1 wherein said thermoplastic elastomer is an olefin-based elastomer having a Shore hardness of 50 to 95 A.

3. The packaging material of claim 1 wherein said conductive light-shielding thermoplastic resin film layer contains at least a conductive material or an antistatic agent in addition to the carbon black.

4. The packaging material of claim 1 wherein said conductive light-shielding thermoplastic resin film layer contains at least synthetic zeolite or synthetic silica.

5. The packaging material of claim 1 wherein said conductive light-shielding thermoplastic resin film layer is a conductive light-shielding thermoplastic resin inflation film having a thickness of 10 to 250 μm formed by using a ring die having a lip clearance of 0.5 to 3 mm and at a draw ratio of 3 to 100.

6. The packaging material of claim 5 which further comprises a deposited thermoplastic resin film layer composed of a Young's modulus thermoplastic resin film layer having a Young's modulus in the longitudinal direction of 60 kg/mm$^2$ or more provided with a moistureproof oxygen barrier deposit membrane.

7. The packaging material of claim 6 which comprises said deposited thermoplastic resin film layer and two layers of said conductive light-shielding thermoplastic resin film layer located on both sides of the deposited thermoplastic resin film layer.

8. The packaging material of claim 5 wherein said conductive light-shielding thermoplastic resin film layer has a volume resistivity of $1 \times 10^{12}$ Ω·cm or less.

9. The packaging material of claim 1 further comprising a thermoplastic resin comprising 20 wt. % or more of polyolefin.

10. The packaging material of claim 1 which has a moisture permeability of 10 g/m$^2$·24 hours or less.

11. The packaging material of claim 1 which further comprises a paper layer which is located on the opposite side to the photographic photosensitive material being packaged and is provided with a print layer on said opposite side.

12. The packaging material of claim 1 which further comprises 2 thermoplastic resin film layers laminated on both sides of said conductive light-shielding thermoplastic resin film layer each through an adhesive layer.

13. The packaging material of claim 1 wherein said carbon black which is acetylene carbon black or furnace carbon black has a sulfur content of 0.1% or less, a free sulfur content of 0.01% or less, a mean particle size of 12 to 50 nm, a DBP oil absorption value of 100 ml/100 g or more, and a pH of 6 to 9.

14. A packaging material for a photographic photosensitive material having a conductive light-shielding thermoplastic resin film layer which comprises a resin composition comprising 3 to 49 wt. % of a thermoplastic elastomer having a crystallinity of 40% or less measured by the X-ray diffraction method, 0.01 to 10 wt. % of lubricant, and 1 to 70 wt. % of carbon black which is acetylene carbon black or furnace carbon black and a deposited thermoplastic resin film layer composed of a Young's modulus thermoplastic resin film layer having a Young's modulus in the longitudinal direction of 60 kg/mm$^2$ or more provided with a moistureproof oxygen barrier deposit membrane, wherein said conductive light-shielding thermoplastic resin film layer is a conductive light-shielding thermoplastic resin inflation film having a thickness of 10 to 250 μm formed by using a ring die having a lip clearance of 0.5 to 3 mm and at a draw ratio of 3 to 100, wherein said moistureproof oxygen barrier deposit membrane is formed of a member selected from the group consisting of silicon oxide, aluminum oxide, titanium oxide, tin oxide, zinc oxide, iridium oxide and magnesium oxide, and has a thickness of 5 to 300 nm.

15. The packaging material of claim 14 wherein said deposited membrane is a photocatalyst which catalyzes oxidation-reduction reaction by UV energy.

16. A packaging material for a photographic photosensitive material having a conductive light-shielding thermoplastic resin film layer which comprises a resin composition comprising 3 to 49 wt. % of a thermoplastic elastomer having a crystallinity of 40% or less measured by the X-ray diffraction method, 0.01 to 10 wt. % of lubricant, and 1 to 70 wt. % of carbon black which is acetylene carbon black or furnace carbon black, wherein said conductive light-shielding thermoplastic resin film layer contains at least a formaldehyde scavenger or a hydrogen cyanide scavenger.

* * * * *